US012693756B2

(12) United States Patent
Lim

(10) Patent No.: US 12,693,756 B2
(45) Date of Patent: Jul. 28, 2026

(54) ELECTRONIC DEVICE WITH IMPROVED SENSING SENSITIVITY THROUGH NOISE REDUCTION

(71) Applicant: SAMSUNG DISPLAY CO., LTD., Yongin-si (KR)

(72) Inventor: Sanghyun Lim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/829,604

(22) Filed: Sep. 10, 2024

(65) Prior Publication Data

US 2025/0138664 A1 May 1, 2025

(30) Foreign Application Priority Data

Nov. 1, 2023 (KR) ........................ 10-2023-0149007

(51) Int. Cl.
G06F 3/041 (2006.01)
G06F 3/044 (2006.01)

(52) U.S. Cl.
CPC ...... G06F 3/04162 (2019.05); G06F 3/04164 (2019.05); G06F 3/04182 (2019.05); G06F 3/0441 (2019.05); G06F 3/0446 (2019.05); G06F 2203/04106 (2013.01); G06F 2203/04111 (2013.01)

(58) Field of Classification Search
CPC .............. G06F 3/04162; G06F 3/0441; G06F 3/04182; G06F 3/0446; G06F 3/04164; G06F 2203/04106; G06F 2203/04111
See application file for complete search history.

(56) References Cited

U.S. PATENT DOCUMENTS

| | | | |
|---|---|---|---|
| 8,884,921 B2 | 11/2014 | Kim et al. | |
| 9,075,259 B2 | 7/2015 | Kim | |
| 9,772,716 B2 | 9/2017 | Lee et al. | |
| 2016/0041677 A1 | 2/2016 | Tahara | |
| 2020/0409491 A1* | 12/2020 | Maharyta | .............. G06F 3/0446 |
| 2023/0059891 A1 | 2/2023 | Oh et al. | |

FOREIGN PATENT DOCUMENTS

| | | | |
|---|---|---|---|
| JP | 5819565 B1 | 11/2015 | |
| KR | 1614057 B1 | 4/2016 | |
| KR | 10-1971147 B1 | 4/2019 | |
| KR | 10-2044476 B1 | 11/2019 | |
| KR | 10-2023-0029061 A | 3/2023 | |

* cited by examiner

*Primary Examiner* — Lisa S Landis
(74) *Attorney, Agent, or Firm* — F CHAU & ASSOCIATES, LLC

(57) ABSTRACT

Provided is an electronic device including a sensor layer, and a sensor driver configured to drive the sensor layer and selectively operate in a first mode for sensing touch inputs or a second mode for sensing pen inputs. The sensor layer includes a plurality of first electrode groups arranged along a first direction, and a plurality of second electrode groups arranged along a second direction crossing the first direction and crossing the plurality of first electrode groups. Each of the plurality of second electrode groups include a first cross electrode and a second cross electrode, and in the second mode, the sensor driver is configured to receive a first signal from the first cross electrode and a second signal from the second cross electrode.

35 Claims, 37 Drawing Sheets

ELECTRONIC DEVICE WITH IMPROVED SENSING SENSITIVITY THROUGH NOISE REDUCTION

CROSS-REFERENCE TO RELATED APPLICATION(S)

This U.S. non-provisional patent application claims priority under 35 U.S.C. § 119 of Korean Patent Application No. 10-2023-0149007, filed on Nov. 1, 2023, the entire contents of which are incorporated by reference herein.

TECHNICAL FIELD

The present disclosure relates to an electronic device capable of sensing inputs from both a pen and a touch.

DISCUSSION OF RELATED ART

Multimedia electronic devices such as televisions, mobile phones, tablet computers, laptops, navigation systems, and game consoles are provided with display devices for displaying images. These electronic devices may be provided with sensor layers (or input sensors) capable of providing a touch-based input mode that enables users to readily, intuitively, and conveniently enter information or commands, in addition to typical input modes such as buttons, keyboards, and mouses. These sensor layers may sense touch or pressure applied by users. Meanwhile, there is a rising demand for a pen to provide detailed touch inputs for users who are familiar with using a writing instrument to input information or for a specific application program (e.g., an application program for sketch or drawing).

SUMMARY

Embodiments of the present disclosure provide an electronic device capable of sensing inputs from a pen with reduced noise.

An embodiment of the inventive concept provides an electronic device including a sensor layer, and a sensor driver configured to drive the sensor layer and selectively operate in a first mode for sensing touch inputs or a second mode for sensing pen inputs, wherein the sensor layer includes a plurality of first electrode groups arranged along a first direction, and a plurality of second electrode groups arranged along a second direction crossing the first direction and crossing the plurality of first electrode groups. Each of the plurality of second electrode groups includes a first cross electrode and a second cross electrode. In the second mode, the sensor driver senses the pen inputs based on a first signal received from the first cross electrode and a second signal received from the second cross electrode.

In an embodiment, the first cross electrode may include a plurality of first sensing patterns arranged in the first direction, the second cross electrode may include a plurality of second sensing patterns arranged in the first direction, and at least one of the plurality of first sensing patterns and at least one of the plurality of second sensing patterns may be alternately arranged.

In an embodiment, the sensor layer may further include a first cross trace line electrically connected to the first cross electrode and a second cross trace line electrically connected to the second cross electrode, the first cross trace line may be directly connected to one first sensing pattern among the plurality of first sensing patterns, and the second cross trace line may be directly connected to one second sensing pattern among the plurality of second sensing patterns.

In an embodiment, at least one second sensing pattern among the plurality of second sensing patterns may be disposed between a portion of the first cross trace line and the one first sensing pattern, and at least one first sensing pattern among the plurality of first sensing patterns may be disposed between a portion of the second cross trace line and the one second sensing pattern.

In an embodiment, at least one of the plurality of first sensing patterns or the plurality of second sensing patterns may cross at least one first electrode group among the plurality of first electrode groups.

In an embodiment, the plurality of first sensing patterns may have the same width in the first direction.

In an embodiment, some of widths of the plurality of first sensing patterns in the first direction may be different from others.

In an embodiment, the sensor driver may include a differential amplifier, and the second mode may include a pen sensing drive mode, and in the pen sensing drive mode, an inverting terminal of the differential amplifier may be electrically connected to the first cross electrode, and a non-inverting terminal of the differential amplifier may be electrically connected to the second cross electrode.

In an embodiment, the sensor driver may include a first differential amplifier, a second differential amplifier, and a third differential amplifier, the second mode may include a pen sensing drive mode, and in the pen sensing drive mode, the first differential amplifier and the second differential amplifier may receive signals from the plurality of second electrode groups, an inverting terminal of the third differential amplifier may receive signals output from the first differential amplifier, and a non-inverting terminal of the third differential amplifier may receive signals output from the second differential amplifier.

In an embodiment, the plurality of second electrode groups may include a (2-1)-th electrode group and a (2-2)-th electrode group spaced apart from the (2-1)-th electrode group in the second direction, in the pen sensing drive mode, an inverting terminal of the first differential amplifier may be electrically connected to the first cross electrode of the (2-1)-th electrode group, and a non-inverting terminal of the first differential amplifier may be electrically connected to the second cross electrode of the (2-1)-th electrode group, and in the pen sensing drive mode, an inverting terminal of the second differential amplifier may be electrically connected to the first cross electrode of the (2-2)-th electrode group, and a non-inverting terminal of the second differential amplifier may be electrically connected to the second cross electrode of the (2-2)-th electrode group.

In an embodiment, the plurality of second electrode groups may include a (2-1)-th electrode group and a (2-2)-th electrode group spaced apart from the (2-1)-th electrode group in the second direction, in the pen sensing drive mode, an inverting terminal of the first differential amplifier may be electrically connected to the first cross electrode of the (2-1)-th electrode group, and a non-inverting terminal of the first differential amplifier may be electrically connected to the first cross electrode of the (2-2)-th electrode group, and in the pen sensing drive mode, an inverting terminal of the second differential amplifier may be electrically connected to the second cross electrode of the (2-1)-th electrode group, and a non-inverting terminal of the second differential amplifier may be electrically connected to the second cross electrode of the (2-2)-th electrode group.

In an embodiment, the sensor driver may include a plurality of differential amplifiers and an analog-to-digital converter, in the second mode, the plurality of differential amplifiers may be connected in one-to-one correspondence with the plurality of first cross electrodes and the plurality of second cross electrodes of the plurality of second electrode groups, the analog-to-digital converter may receive a plurality of signals from the plurality of differential amplifiers, and the sensor driver may be configured to perform a differential operation on data output from the analog-to-digital converter.

In an embodiment, each of the plurality of first electrode groups may include a third cross electrode and a fourth cross electrode, and in the second mode, the sensor driver may be configured to receive a third signal from the third cross electrode and a fourth signal from the fourth cross electrode.

In an embodiment, the first cross electrode may include a plurality of first sensing patterns, a first bridge line, and a first bridge pattern, the second cross electrode may include a plurality of second sensing patterns, a second bridge line, and a second bridge pattern, the third cross electrode may include a plurality of third sensing patterns, a third bridge line, a third bridge pattern, and a first connection pattern, the fourth cross electrode may include a plurality of fourth sensing patterns, a fourth bridge line, a fourth bridge pattern, and a second connection pattern, the plurality of first sensing patterns, the plurality of second sensing patterns, the plurality of third sensing patterns, the plurality of fourth sensing patterns, the first bridge line, the second bridge line, the third bridge line, and the fourth bridge line may be disposed on the same layer, and the first bridge pattern, the second bridge pattern, the third bridge pattern, the fourth bridge pattern, the first connection pattern, and the second connection pattern may be disposed on the same layer.

In an embodiment, the plurality of first sensing patterns may include a plurality of (1-1)-th sensing patterns and a plurality of (1-2)-th sensing patterns spaced apart from the plurality of (1-1)-th sensing patterns in the second direction, the plurality of (1-1)-th sensing patterns may be connected to the first bridge line, the plurality of (1-2)-th sensing patterns may be connected to the first bridge pattern, and the first bridge line and the first bridge pattern may be electrically connected, and the first bridge line may be disposed between two second sensing patterns spaced apart in the second direction among the plurality of second sensing patterns.

In an embodiment, the plurality of third sensing patterns may include a plurality of (3-1)-th sensing patterns spaced apart in the second direction and a plurality of (3-2)-th sensing patterns spaced apart from the plurality of (3-1)-th sensing patterns in the first direction, the plurality of (3-1)-th sensing patterns may be connected to the third bridge pattern, the plurality of (3-2)-th sensing patterns may be connected to the third bridge line, and the third bridge line and the third bridge pattern may be electrically connected, the first connection pattern may overlap the first bridge line or the second bridge line and may be connected to two third sensing patterns spaced apart with the first bridge line or the second bridge line therebetween among the plurality of third sensing patterns, and the third bridge line may be disposed between two fourth sensing patterns spaced apart in the first direction among the plurality of fourth sensing patterns.

In an embodiment, the sensor layer may further include a plurality of auxiliary electrodes overlapping the plurality of first electrode groups, respectively, and a connection trace line connecting the plurality of auxiliary electrodes.

In an embodiment, the sensor layer further may include a plurality of first trace lines electrically connected to the plurality of first electrode groups in one-to-one correspondence, and the plurality of first trace lines may be spaced apart from the connection trace line with the plurality of first electrode groups therebetween.

In an embodiment, the first cross electrode may include a plurality of first sensing patterns, a first bridge line, and a first bridge pattern, the second cross electrode may include a plurality of second sensing patterns, a second bridge line, and a second bridge pattern, each of the plurality of first electrode groups may include a plurality of third sensing patterns and a connection pattern, the plurality of first sensing patterns, the plurality of second sensing patterns, the plurality of third sensing patterns, the first bridge line, and the second bridge line may be disposed on the same layer, and the first bridge pattern, the second bridge pattern, the connection pattern, and the plurality of auxiliary electrodes may be disposed on the same layer.

In an embodiment, the plurality of third sensing patterns may overlap one corresponding auxiliary electrode among the plurality of auxiliary electrodes, and at least one hole surrounding the connection pattern may be defined in the one auxiliary electrode.

In an embodiment, the sensor layer further may include a plurality of loop trace lines electrically connected to the plurality of auxiliary electrodes, the second mode may include a charging drive mode and a pen sensing drive mode, the sensor driver may be configured to apply a first signal to at least one of the connection trace line or the plurality of loop trace lines and to apply a second signal to at least another one in the charging drive mode, and the plurality of loop trace lines may all be configured to float in the pen sensing drive mode.

In an embodiment, the sensor driver may include a differential amplifier, and in the first mode, an inverting terminal of the differential amplifier may be electrically connected to the first cross electrode, and a non-inverting terminal of the differential amplifier may be electrically connected to the second cross electrode.

In an embodiment, the sensor driver may include a differential amplifier, and in the first mode, an inverting terminal of the differential amplifier may be electrically connected to the first cross electrode and the second cross electrode.

In an embodiment, in the first mode, the sensor driver may provide in-phase signals to the first cross electrode and the second cross electrode and receive signals provided from the plurality of first electrode groups.

In an embodiment, in the first mode, the sensor driver may provide a signal of a first phase to the first cross electrode, provide a signal of a second phase, which is a reverse phase of the first phase, to the second cross electrode, and receive signals provided from the plurality of first electrode groups.

In an embodiment, the first cross electrode may include a plurality of first sensing patterns, a first bridge line, and a first bridge pattern, the second cross electrode may include a plurality of second sensing patterns, a second bridge line, and a second bridge pattern, the plurality of first sensing patterns may include a plurality of (1-1)-th sensing patterns spaced apart in the first direction and a plurality of (1-2)-th sensing patterns spaced apart from the plurality of (1-1)-th sensing patterns in the second direction, the plurality of (1-1)-th sensing patterns may be connected to the first bridge line, the plurality of (1-2)-th sensing patterns may be connected to the first bridge pattern, and the first bridge line and the first bridge pattern may be electrically connected, the first bridge line may be disposed between two second sensing patterns spaced apart in the second direction among the plurality of second sensing patterns, and the first bridge pattern may overlap the first bridge line and the two second sensing patterns.

In an embodiment, the first cross electrode may include a plurality of first sensing patterns arranged in the first direction, and the second cross electrode may include a plurality of second sensing patterns arranged in the first direction, and a first sensing pattern among the plurality of first sensing patterns and a second sensing pattern among the plurality of second sensing patterns adjacent to each other may be shaped to engage each other.

In an embodiment, the first sensing pattern may include a first protruding portion protruding toward the second sensing pattern, the second sensing pattern may include a second protruding portion protruding toward the first sensing pattern, a first concave edge surrounding at least a portion of the second protruding portion may be defined in the first sensing pattern, and a second concave edge surrounding at least a portion of the first protruding portion may be defined in the second sensing pattern.

In an embodiment of the inventive concept, an electronic device includes a sensor layer, and a sensor driver for driving the sensor layer, wherein the sensor layer includes a plurality of electrode groups, and a plurality of trace lines electrically connected to the plurality of electrode groups, at least one of which includes a first cross electrode and a second cross electrode, the plurality of trace lines include a first cross trace line connected to the first cross electrode and a second cross trace line connected to the second cross electrode, and the first cross trace line is spaced from the second cross trace line in a first direction.

In an embodiment, the first cross electrode may include a plurality of first sensing patterns arranged in the first direction, the second cross electrode may include a plurality of second sensing patterns arranged in the first direction, and at least one of the plurality of first sensing patterns and at least one of the plurality of second sensing patterns may be alternately arranged, the first cross trace line may be directly connected to one first sensing pattern among the plurality of first sensing patterns, the second cross trace line may be directly connected to one second sensing pattern among the plurality of second sensing patterns, at least one second sensing pattern among the plurality of second sensing patterns may be disposed between a portion of the first cross trace line and the one first sensing pattern, and at least one first sensing pattern among the plurality of first sensing patterns may be disposed between a portion of the second cross trace line and the one second sensing pattern.

In an embodiment, the sensor driver may be configured to selectively operate in a first mode for sensing touch inputs or in a second mode including a pen sensing drive mode for sensing pen inputs, the sensor driver may include a differential amplifier, and in the pen sensing drive mode, an inverting terminal of the differential amplifier may be electrically connected to the first cross electrode, and a non-inverting terminal of the differential amplifier may be electrically connected to the second cross electrode.

In an embodiment of the inventive concept, an electronic device includes a sensor layer, and a sensor driver for driving the sensor layer, wherein the sensor layer includes a plurality of electrode groups, and a plurality of trace lines electrically connected to the plurality of electrode groups, at least one of the plurality of electrode groups includes a first cross electrode and a second cross electrode, the first cross electrode includes a plurality of first sensing patterns arranged in a first direction, the second cross electrode includes a plurality of second sensing patterns arranged in the first direction, and at least one of the plurality of first sensing patterns and at least one of the plurality of second sensing patterns are alternately arranged, and one of the plurality of first sensing patterns is disposed at a first end of the at least one electrode group, and one of the plurality of second sensing patterns is disposed at a second end of the at least one electrode group.

In an embodiment, the plurality of trace lines may include a first cross trace line connected to the first cross electrode and a second cross trace line connected to the second cross electrode, and the first cross trace line may be disposed adjacent to the first end and connected to another one of the plurality of second sensing patterns, and the second cross trace line may be disposed adjacent to the second end and connected to another one of the plurality of first sensing patterns.

In an embodiment of the inventive concept, an electronic device includes a sensor layer, and a sensor driver electrically connected to the sensor layer and configured to selectively operate in a first mode for sensing touch inputs and a second mode for sensing pen inputs. The sensor layer includes a plurality of first electrodes extending along a first direction, and a plurality of second electrodes extending along a second direction crossing the first direction. At least one of the plurality of second electrodes includes a first sub-electrode and a second sub-electrode, and in the second mode, the sensor driver senses the pen inputs based on a first signal from the first sub-electrode and a second signal from the second sub-electrode.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings:

FIG. 23 is an equivalent circuit diagram showing a relationship between one channel and a pen according to an embodiment of the inventive concept;

FIG. 27 is a plan view showing a portion of a sensor layer according to an embodiment of the inventive concept;

FIG. 28 is a plan view showing a portion of a sensor layer according to an embodiment of the inventive concept;

DETAILED DESCRIPTION

Figure 1A:
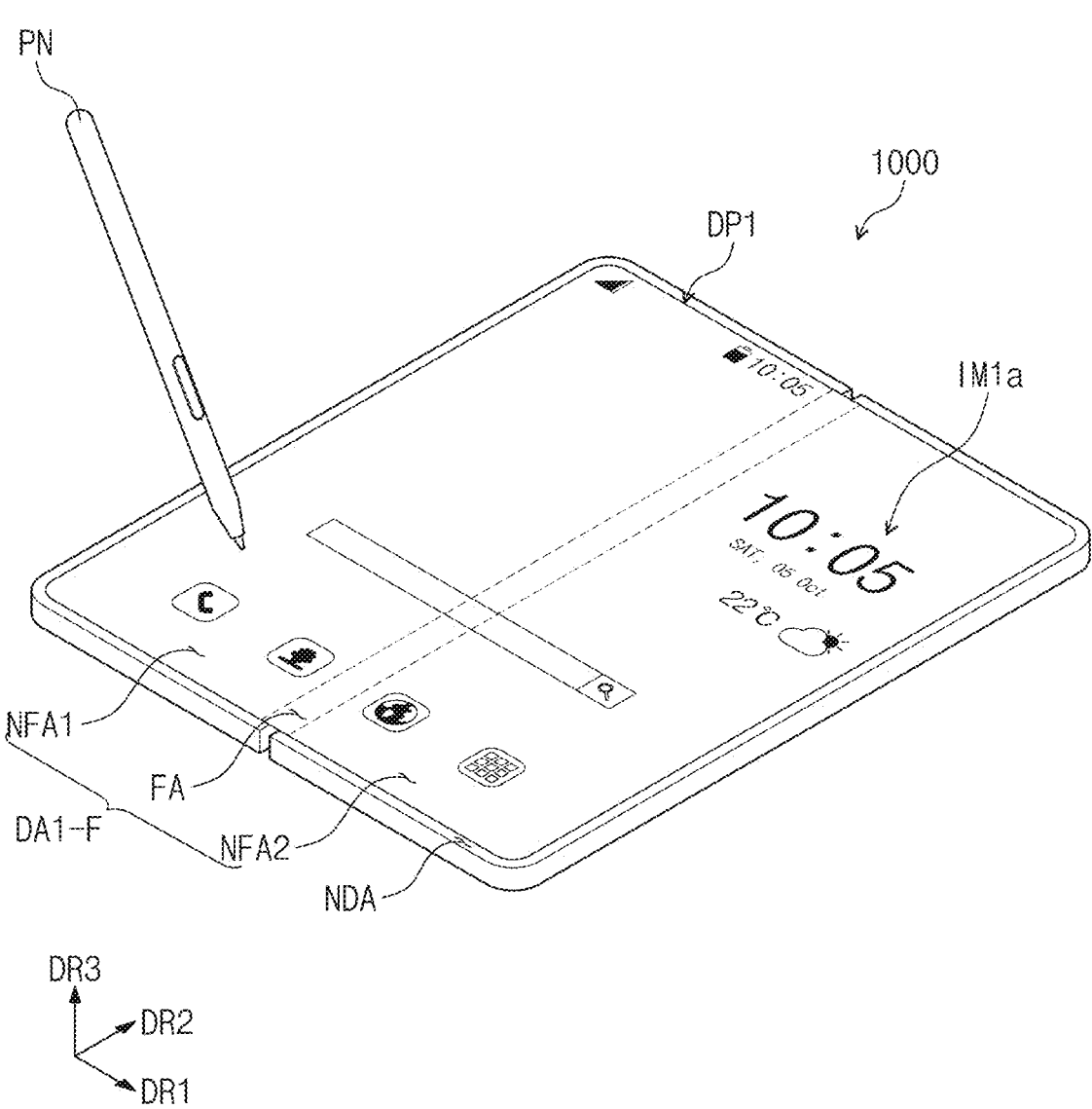
FIG. 1A is a perspective view of an electronic device according to an embodiment of the inventive concept.

As used herein, when an element (or a region, a layer, a portion, and the like) is referred to as being "on," "connected to," or "bonded to" another element, it means that the element may be directly disposed on/connected to/bonded to the other element, or that a third element may be disposed therebetween.

Like reference numerals refer to like elements. In addition, in the drawings, the thickness, the ratio, and the dimensions of elements are exaggerated for an effective description of technical contents. The term "and/or," includes all combinations of one or more of which associated configurations may define.

It will be understood that, although the terms first, second, and the like may be used herein to describe various elements, these elements should not be limited by these terms. These terms are only used to distinguish one element from another element. For example, a first element may be referred to as a second element, and similarly, a second element may be referred to as a first element without departing from the teachings of the present disclosure. The singular forms are intended to include the plural forms as well, unless the context clearly indicates otherwise.

Also, terms of "below", "on lower side", "above", "on upper side", or the like may be used to describe the relationships of the components shown in the drawings. The terms are used as a relative concept and are described with reference to the direction indicated in the drawings.

It should be understood that the terms "comprise", or "have" are intended to specify the presence of stated features, integers, steps, operations, elements, components, or combinations thereof in the disclosure, but do not preclude the presence or addition of one or more other features, integers, steps, operations, elements, components, or combinations thereof.

Unless otherwise defined, all terms (including technical and scientific terms) used herein have the same meaning as commonly understood by one of ordinary skill in the art to which the present disclosure pertains. It is also to be understood that terms defined in commonly used dictionaries should be interpreted as having meanings consistent with the meanings in the context of the related art, and are expressly defined herein unless they are interpreted in an ideal or overly formal sense. Also, terms, such as those defined in commonly used dictionaries, should be interpreted as having a meaning that is consistent with their meaning in the context of the relevant art and should not be interpreted in an idealized or overly formal sense unless expressly so defined herein.

The terms "part" and "unit" refer to a software component or a hardware component that performs a specific function. A hardware component may include, for example, a field-programmable gate array (FPGA) or an application-specific integrated circuit (ASIC). A software component may refer to executable code and/or data used by the executable code in an addressable storage medium. Thus, software components may be, for example, object-oriented software components, class components, and task components, and may include processes, functions, attributes, procedures, subroutines, segments of program code, drivers, firmware, micro codes, circuits, data, a database, data structures, tables, arrays, or variables.

Hereinafter, embodiments of the inventive concept will be described with reference to the drawings.

Figure 1B:
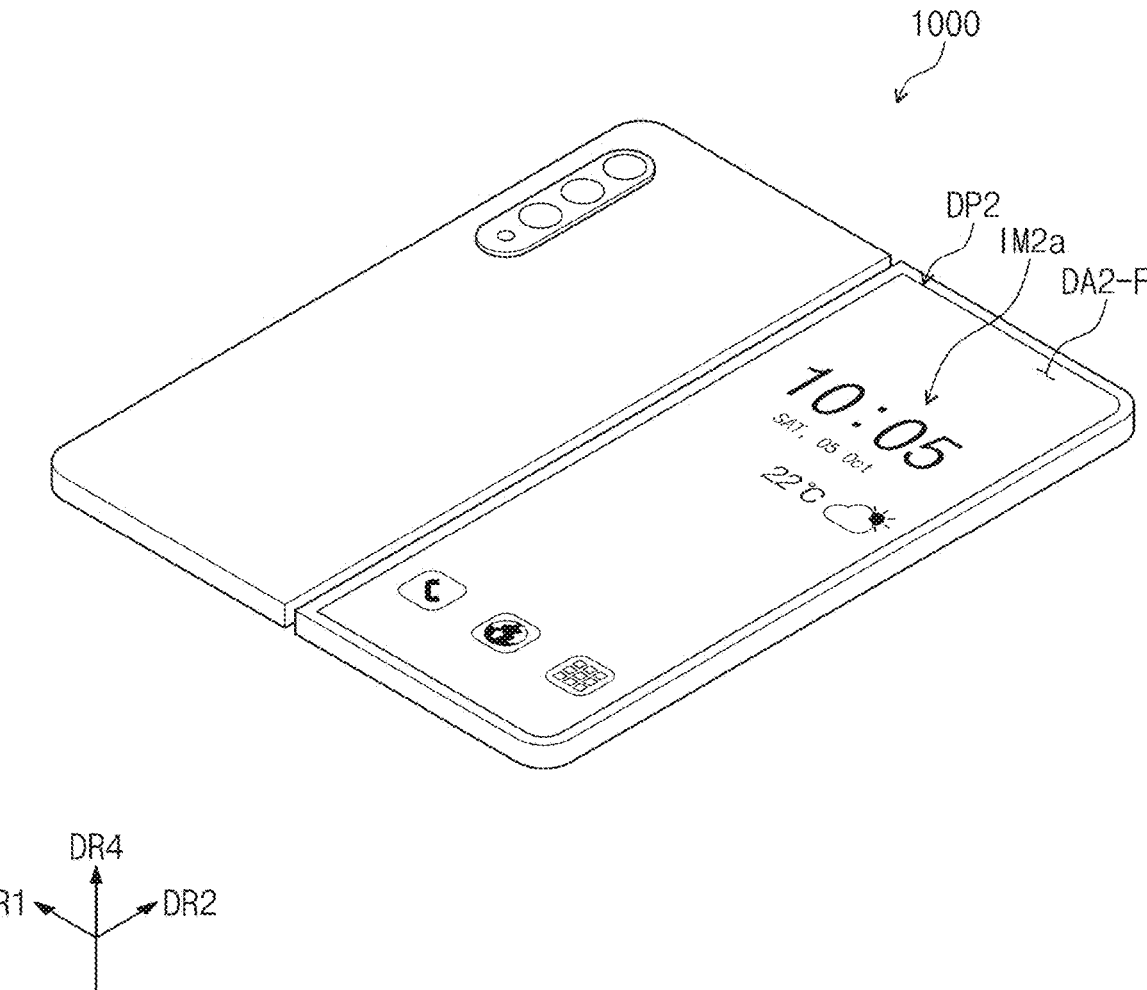
FIG. 1B is a rear perspective view of an electronic device according to an embodiment of the inventive concept.

FIG. 1A is a perspective view of an electronic device 1000 according to an embodiment of the inventive concept. FIG. 1B is a rear perspective view of an electronic device 1000 according to an embodiment of the inventive concept.

Referring to FIGS. 1A and 1B, the electronic device 1000 may be a device activated according to electrical signals. For example, the electronic device 1000 may display images and sense external inputs applied from the outside. The external inputs may be user inputs. The user inputs may include various types of external inputs such as a part of a user's body ("touch inputs"), a pen PN, light, heat, pen, or pressure.

The electronic device 1000 may include a first display panel DP1 and a second display panel DP2. The first display panel DP1 and the second display panel DP2 may be separate panels. The first display panel DP1 may be referred to as a main display panel, and the second display panel DP2 may be referred to as an auxiliary display panel or an external display panel.

The first display panel DP1 may include a first display portion DA1-F, and the second display panel DP2 may include a second display portion DA2-F. An area of the second display panel DP2 may be smaller than an area of the first display panel DP1. Corresponding to the sizes of the first display panel DP1 and the second display panel DP2, an area of the first display portion DA1-F may be larger than an area of the second display portion DA2-F.

When the electronic device 1000 is unfolded, the first display portion DA1-F may have a plane substantially parallel to a first direction DR1 and a second direction DR2. A thickness direction of the electronic device 1000 may be parallel to a third direction DR3 crossing the first direction DR1 and the second direction DR2. Therefore, a front surface (or an upper surface) and a rear surface (or a lower surface) of members constituting the electronic device 1000 may be defined with respect to the third direction DR3.

The first display panel DP1 or the first display portion DA1-F may include a folding region FA that may be folded and unfolded, and a plurality of non-folding regions NFA1 and NFA2 spaced apart with the folding region FA therebetween. The second display panel DP2 may overlap any one of the plurality of non-folding regions NFA1 and NFA2. For example, the second display panel DP2 may overlap the first non-folding region NFA1.

A display direction of a first image IM1*a* displayed on a portion of the first display panel DP1, for example, the first non-folding region NFA1, and a second image IM2*a* displayed on the second display panel DP2 may be opposite to each other. For example, the first image IM1*a* may be displayed in the third direction DR3, and the second image IM2*a* may be displayed in a fourth direction DR4, which is opposite to the third direction DR3.

The folding region FA may be bent with respect to a folding axis extending in a direction parallel to a long side of the electronic device 1000, for example, in a direction parallel to the second direction DR2. When the electronic device 1000 is folded, the folding region FA has a predetermined curvature and radius of curvature. The first non-folding region NFA1 and the second non-folding region NFA2 may face each other, and the electronic device 1000 may be inner-folded such that the first display portion DA1-F is not exposed to the outside.

In an embodiment of the inventive concept, the electronic device 1000 may be outer-folded such that the first display portion DA1-F is exposed to the outside. In an embodiment of the inventive concept, the electronic device 1000 may be capable of both being inner-folded and outer-folded when is unfolded, but is not limited thereto.

In FIG. 1A, an embodiment in which one folding region FA is defined in the electronic device 1000 is shown as an example, but the embodiment of the inventive concept is not limited thereto. For example, in an electronic device 1000-1, a plurality of folding axes and a plurality of folding regions corresponding thereto may be defined, and the electronic device 1000 may be inner-folded or outer-folded when is unfolded in each of the plurality of folding regions.

At least one of the first display panel DP1 or the second display panel DP2 may sense inputs from a pen PN even without including a digitizer. Accordingly, the digitizer for sensing the pen PN is not provided, and thus the electronic device 1000 may not have greater thickness and weight and reduced flexibility resulting from the provision of the digitizer. Accordingly, the first display panel DP1 as well as the second display panel DP2 may be designed to sense the pen PN.

Figure 2:
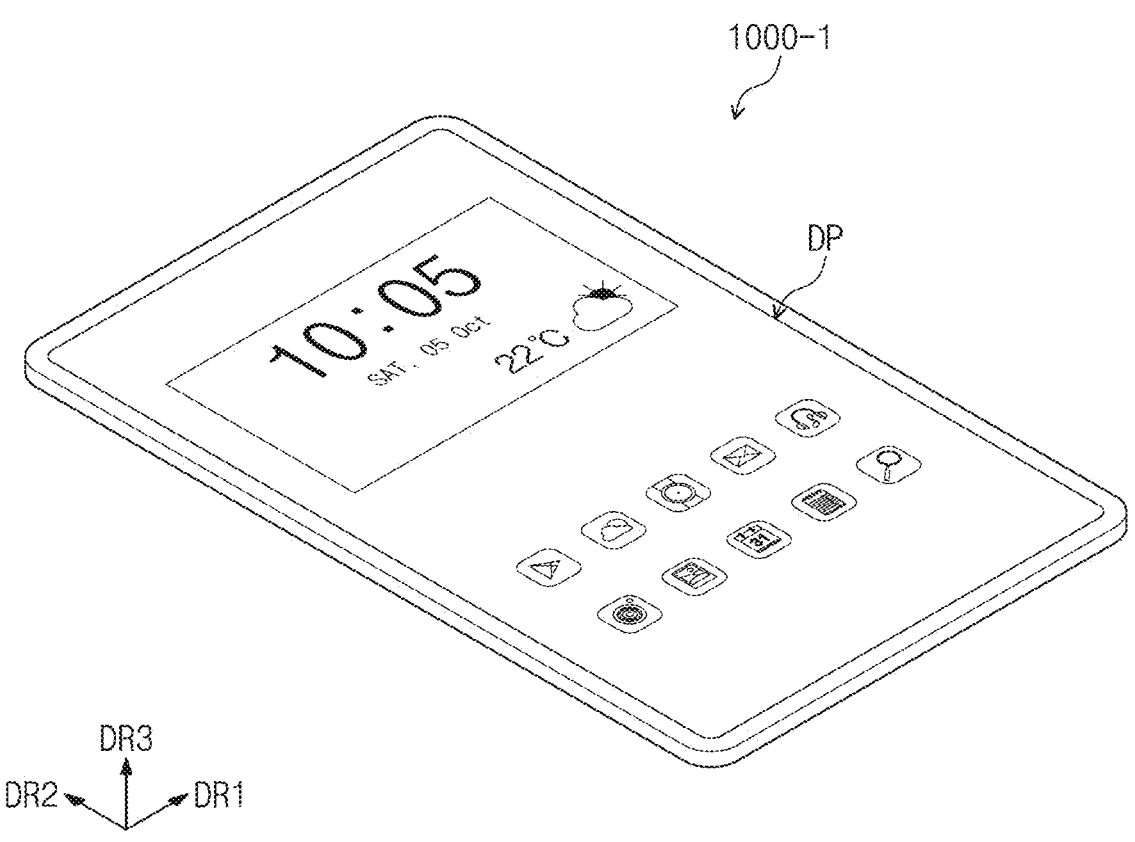
FIG. 2 is a perspective view of an electronic device according to an embodiment of the inventive concept.

FIG. 2 is a perspective view of an electronic device 1000-1 according to an embodiment of the inventive concept.

FIG. 2 shows that the electronic device 1000-1 is a mobile phone as an example, and the electronic device 1000-1 may include a display panel DP.

The display panel DP may sense externally applied inputs. The external inputs may be user inputs. The user inputs may include various types of external inputs such as a part of a user's body (touch inputs), a pen PN (see FIG. 1A), light, heat, pen, or pressure.

The display panel DP may sense inputs from the pen PN even without including a digitizer. Accordingly, the digitizer for sensing the pen PN is not provided, and thus a greater thickness and weight resulting from the provision of the digitizer may be avoided for the electronic device 1000-1.

In FIG. 1A, a foldable electronic device 1000 is shown as an example, and in FIG. 2, a bar-type electronic device 1000-1 is shown as an example, but an embodiment of the inventive concept which will be described later is not limited thereto. For example, descriptions which will be described later may apply to various electronic devices such as a rollable electronic device, a slidable electronic device, and a stretchable electronic device.

Figure 3:
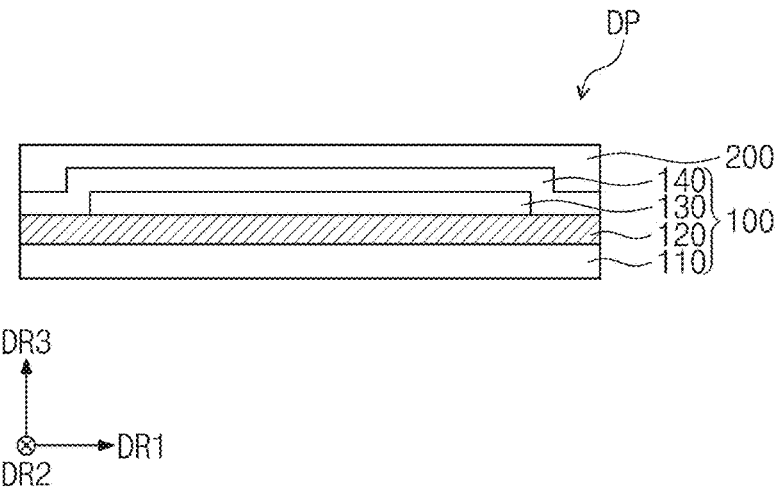
FIG. 3 is a schematic cross-sectional view of a display panel according to an embodiment of the inventive concept.

FIG. 3 is a schematic cross-sectional view of a display panel DP according to an embodiment of the inventive concept.

Referring to FIG. 3, the display panel DP may include a display layer 100 and a sensor layer 200.

The display layer 100 may be configured to substantially generate images. The display layer 100 may be a light emitting display layer, and for example, the display layer 100 may be an organic light emitting display layer, an inorganic light emitting display layer, an organic-inorganic light emitting display layer, a quantum dot display layer, a micro LED display layer, or a nano LED display layer. The display layer 100 may include a base layer 110, a circuit layer 120, a light emitting element layer 130, and an encapsulation layer 140.

The base layer 110 may be a member providing a base surface on which the circuit layer 120 is disposed. The base layer 110 may have a multi-layer structure or a single-layer structure. The base layer 110 may be a glass substrate, a metal substrate, a silicon substrate, or a polymer substrate, but is not particularly limited thereto.

The circuit layer 120 may be disposed on the base layer 110. The circuit layer 120 may include an insulating layer, a semiconductor pattern, a conductive pattern, and a signal line. An insulating layer, a semiconductor layer, and a conductive layer may be formed on the base layer 110 through methods such as coating or vapor deposition, and the insulating layer, the semiconductor layer, and the conductive layer may be selectively patterned through plural times of a photolithography process.

The light emitting element layer 130 may be disposed on the circuit layer 120. The light emitting element layer 130 may include a light emitting element. For example, the light emitting element layer 130 may include organic light emitting materials, inorganic light emitting materials, organic-inorganic light emitting materials, quantum dots, quantum rods, micro LEDs, or nano LEDs.

The encapsulation layer 140 may be disposed on the light emitting element layer 130. The encapsulation layer 140 may serve to protect the light emitting element layer 130 from moisture, oxygen, and foreign substances such as dust particles.

The sensor layer 200 may be disposed on the display layer 100. The sensor layer 200 may sense external inputs applied from the outside. The sensor layer 200 may be a single-body sensor consecutively formed in the process of manufacturing the display layer 100, or the sensor layer 200 may be an external sensor attached to the display layer 100. The sensor layer 200 may be referred to as a sensor, an input sensing layer, an input sensing panel, or an electronic device for sensing input coordinates.

According to an embodiment of the inventive concept, the sensor layer 200 may sense both inputs from a passive type input means such as a body part of a user or a passive type pen, and an active input device that generates a magnetic field at a predetermined resonant frequency. The active input device may be referred to as a pen, an input pen, a magnetic pen, a stylus pen, or an electromagnetic resonance pen.

Figure 4:
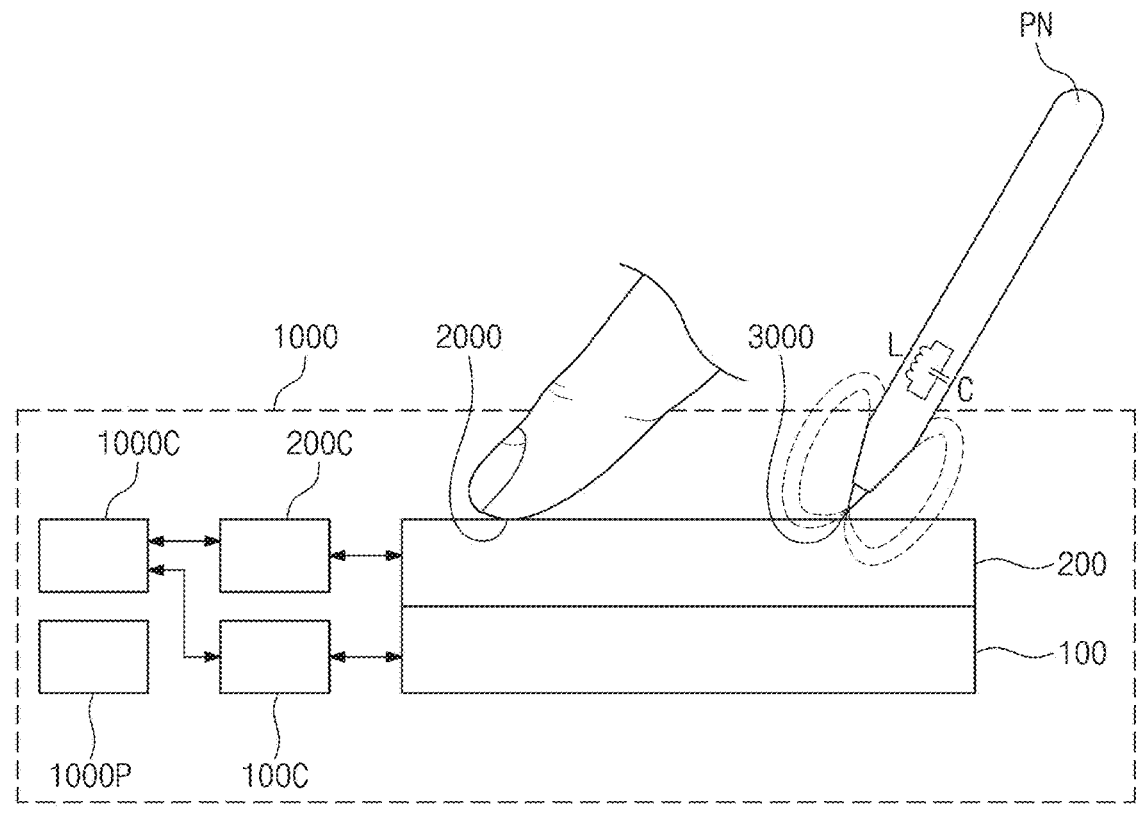
FIG. 4 is a view for describing the operation of an electronic device according to an embodiment of the inventive concept.

FIG. 4 is a view for describing the operation of the electronic device 1000 according to an embodiment of the inventive concept.

Referring to FIG. 4, the electronic device 1000 may include a display layer 100, a sensor layer 200, a display driver 100C, a sensor driver 200C, a main driver 1000C, and a power circuit 1000P.

The sensor layer 200 may sense a first input 2000 or a second input 3000 applied from the outside. Each of the first input 2000 and the second input 3000 may be an input means capable of providing changes in capacitance of the sensor layer 200 or an input means capable of causing an induced current in the sensor layer 200. For example, the first input 2000 may be a passive type input means such as a body part of a user. The second input 3000 may be an input from a pen PN or an RFIC tag. For example, the pen PN may be a passive type pen or an active type pen.

In an embodiment of the inventive concept, the pen PN may be a device that generates a magnetic field at a predetermined resonant frequency. The pen PN may be configured to transmit output signals based on electromagnetic resonance. The pen PN may be referred to as an input device, an input pen, a magnetic pen, a stylus pen, or an electromagnetic resonance pen.

The pen PN may include an RLC resonance circuit, and the RLC resonance circuit may include an inductor L and a capacitor C. In an embodiment of the inventive concept, the RLC resonance circuit may be a variable resonance circuit that varies the resonance frequency. In this case, the inductor L may be a variable inductor and/or the capacitor C may be a variable capacitor, but the embodiment of the inventive concept is not particularly limited thereto.

The inductor L generates current by the magnetic field formed in the sensor layer 200. However, the embodiment of the inventive concept is not particularly limited thereto. For example, when the pen PN operates as an active type pen, the pen PN may generate current even when the magnetic field is not provided from the outside. The generated current is delivered to the capacitor C. The capacitor C charges the current input from the inductor L and discharges the charged current to the inductor L. Thereafter, the inductor L may emit a magnetic field at resonant frequency. An induced current may flow in the sensor layer 200 due to the magnetic field emitted by the pen PN, and the induced current may be delivered to the sensor driver 200C as a received signal (or a sensing signal, a signal).

The main driver 1000C may control the overall operation of the electronic device 1000. For example, the main driver 1000C may control the operation of the display driver 100C and the operation of the sensor driver 200C. The main driver 1000C may include at least one microprocessor and may further include a graphics controller. The main driver 1000C may be referred to as an application processor, a central processing unit, or a main processor.

The display driver 100C may drive the display layer 100. The display driver 100C may receive image data and control signals from the main driver 1000C. The control signals may include various signals. For example, the control signals may include input vertical synchronizing signals, input horizontal synchronizing signals, main clocks, and data enable signals.

The sensor driver 200C may drive the sensor layer 200. The sensor driver 200C may receive control signals from the main driver 1000C. The control signals may include clock signals of the sensor driver 200C. In addition, the control signals may further include mode decision signals that determine drive modes of the sensor driver 200C and the sensor layer 200.

The sensor driver 200C may be implemented as an integrated circuit (IC) and electrically connected to the sensor layer 200. For example, the sensor driver 200C may be mounted directly on a predetermined region of a display panel or mounted on a separate printed circuit board in a chip on film (COF) manner and electrically connected to the sensor layer 200.

The sensor driver 200C and the sensor layer 200 may selectively operate in a first mode or in a second mode. For example, the first mode may be a mode for sensing touch inputs, for example, the first input 2000. The second mode may be a mode for sensing a pen PN input, for example, the second input 3000. The first mode may be referred to as a touch sensing mode, and the second mode may be referred to as a pen sensing mode.

Switching between the first mode and the second mode may be performed in a variety of ways. For example, the sensor driver 200C and the sensor layer 200 may work through time division driving in the first mode and in the second mode, and may sense the first input 2000 and the second input 3000. Alternatively, a switch between the first mode and the second mode takes place due to selection or a specific action done by users, or any one of the first mode and the second mode may be activated or deactivated due to activation or deactivation of a specific application, or the mode may be switched from one to the other. Alternatively, while the sensor driver 200C and the sensor layer 200 work in the alternate operation of the first mode and the second mode, when the first input 2000 is sensed, the first mode may stay, or when the second input 3000 is sensed, the second mode may stay.

The sensor driver 200C may calculate input coordinate information based on signals received from the sensor layer 200 and provide coordinate signals having the coordinate information to the main driver 1000C. The main driver 1000C executes an operation corresponding to user inputs based on the coordinate signals. For example, the main driver 1000C may operate the display driver 100C such that a new application image is displayed on the display layer 100.

The power circuit 1000P may include a power management integrated circuit (PMIC). The power circuit 1000P may generate a plurality of driving voltages for driving the display layer 100, the sensor layer 200, the display driver 100C, and the sensor driver 200C. For example, the plurality of driving voltages may include a gate high voltage, a gate low voltage, a first driving voltage (e.g., ELVSS voltage), a second driving voltage (e.g., ELVDD voltage), an initialization voltage, and the like, but are not limited to the examples above.

Figure 5A:
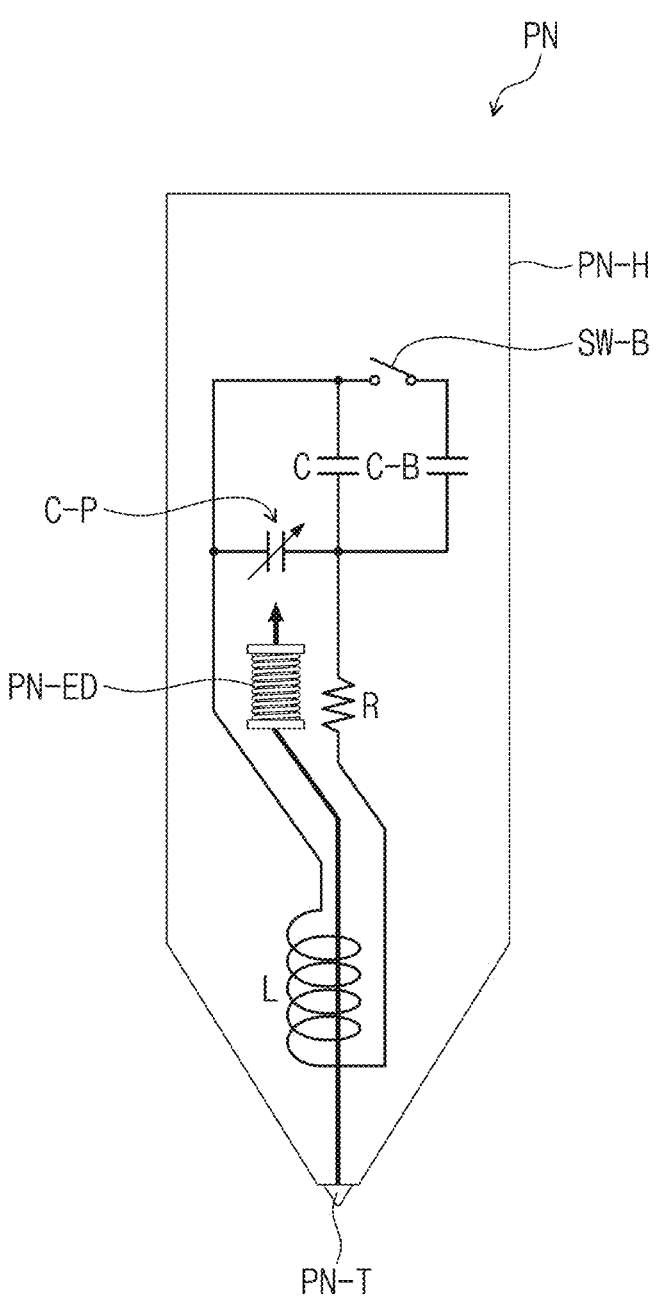
FIG. 5A is a view showing a pen according to an embodiment of the inventive concept.

FIG. 5A is a view showing a pen PN according to an embodiment of the inventive concept.

Referring to FIGS. 4 and 5A, the pen PN may include a housing PN-H, a pen tip PN-T, an inductor L, a capacitor C, a resistor R, an elastic body PN-ED, a pressure capacitor C-P, a switch SW-B, and a button capacitor C-B. The pen PN may not include any active elements such as a power supply, a transistor, or a diode, except for the switch SW-B connected to the button capacitor C-B. Components included in the pen PN are not limited to the components described above. At least some of the components described above may not be provided, and other components may be added.

In an embodiment of the inventive concept, the pen tip PN-T may include a non-conductive material. The pen tip PN-T may have a structure that protrudes to the outside of the housing PN-H. The pen tip PN-T may be detachably bonded to the housing PN-H and may be a replaceable component.

In an embodiment of the inventive concept, the resistor R, the inductor L, and the capacitor C may be connected in series. Accordingly, the pen PN may have a structure having resonance frequency and selectivity that are characteristics of an RLC series circuit. In this case, the frequency of signals provided to the sensor layer 200 when the sensor layer 200 is charged and driven may correspond to the resonance frequency of the pen PN. The capacitor C, the pressure capacitor C-P, and the button capacitor C-B may have a structure connected in parallel. For reference, the button capacitor C-B may be connected in parallel with the capacitor C when the switch SW-B is turned on.

In an embodiment of the inventive concept, as the switch SW-B is turned on or turned off, the button capacitor C-B may be electrically connected to or disconnected from the capacitor C. That is, the switch SW-B may be turned on or turned off to enable the pen PN to respond to different resonance frequencies. For example, a button may be provided on an outer peripheral surface of the housing PN-H. When the button is pressed, the switch SW-B is turned on, and the button capacitor C-B may be electrically connected to the capacitor C, and thus the capacitance of the entire pen PN may be increased.

In an embodiment of the inventive concept, the capacitor C may be provided by cutting a portion of a plurality of capacitors connected in parallel. For example, for the purpose of tuning in target resonance frequency during the process of manufacturing the pen PN, a portion of the plurality of capacitors may be cut, so that the pen PN may tune the capacitor C.

In an embodiment of the inventive concept, when the pen tip PN-T is partially inserted into the housing PN-H by pen pressure, area, distance, or area and distance forming the capacitance of the pressure capacitor C-P may be altered. Accordingly, the capacitance of the pressure capacitor C-P may change. For example, when the pen pressure is applied to the pen PN, the capacitance of the pressure capacitor C-P may increase, and the resonant frequency of the pen PN may decrease correspondingly. Thereafter, when the pen pressure is removed, the capacitance of the pressure capacitor C-P may be restored to the original state by the elastic body PN-ED.

Figure 5B:
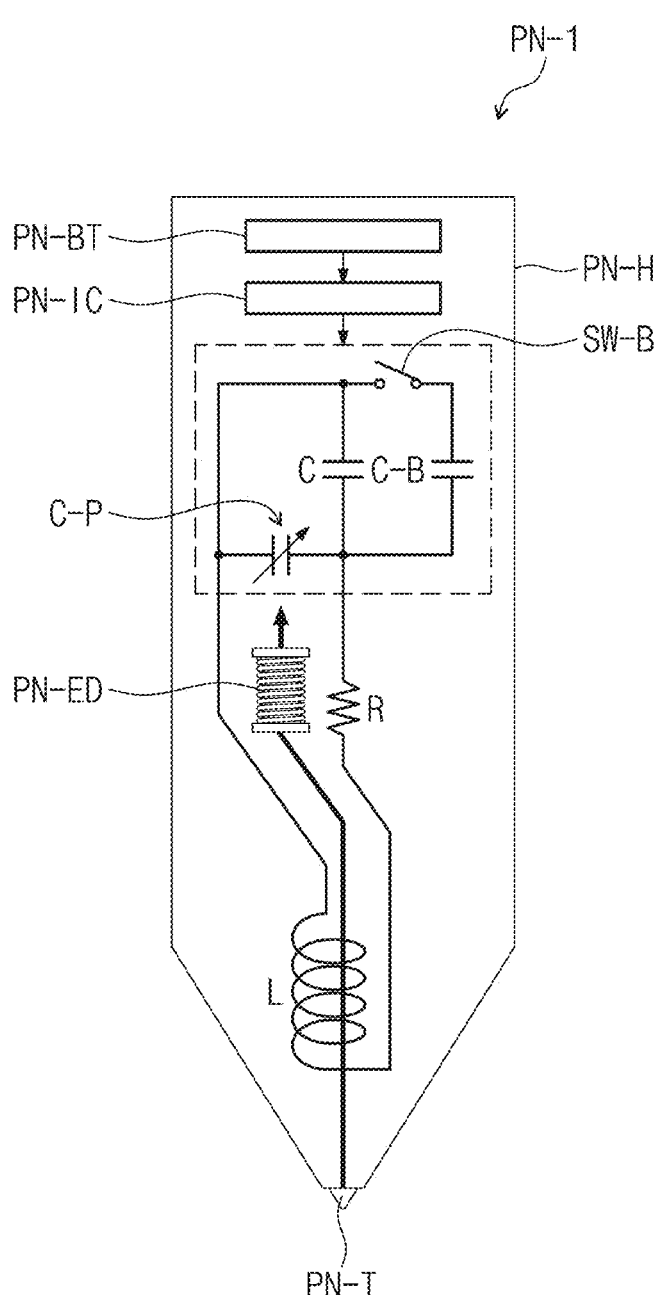
FIG. 5B is a view showing a pen according to an embodiment of the inventive concept.

FIG. 5B is a view showing a pen PN-1 according to an embodiment of the inventive concept.

In describing FIG. 5B, the reference numerals are given for the components described in FIG. 5A, and descriptions thereof are not provided.

Referring to FIGS. 4 and 5B, the pen PN-1 may further include a power supply unit PN-BT and a control unit PN-IC, compared to the pen PN shown in FIG. 5A. The power supply unit PN-BT may include a battery or a high-capacity capacitor. The control unit PN-IC may receive power from the power supply unit PN-BT and may control the frequency of signals output from the pen PN-1.

According to an embodiment of the inventive concept, the pen PN-1 includes an RLC resonance circuit, a power supply unit PN-BT, and a control unit PN-IC, and may thus operate as an active type pen as well as a passive type pen. Accordingly, even when a magnetic field is not provided from the sensor layer 200, the pen PN-1 may emit a magnetic field. Accordingly, the sensor layer 200 may sense inputs from the pen PN-1 that outputs a magnetic field without a charging mode for forming a magnetic field.

Figure 5C:
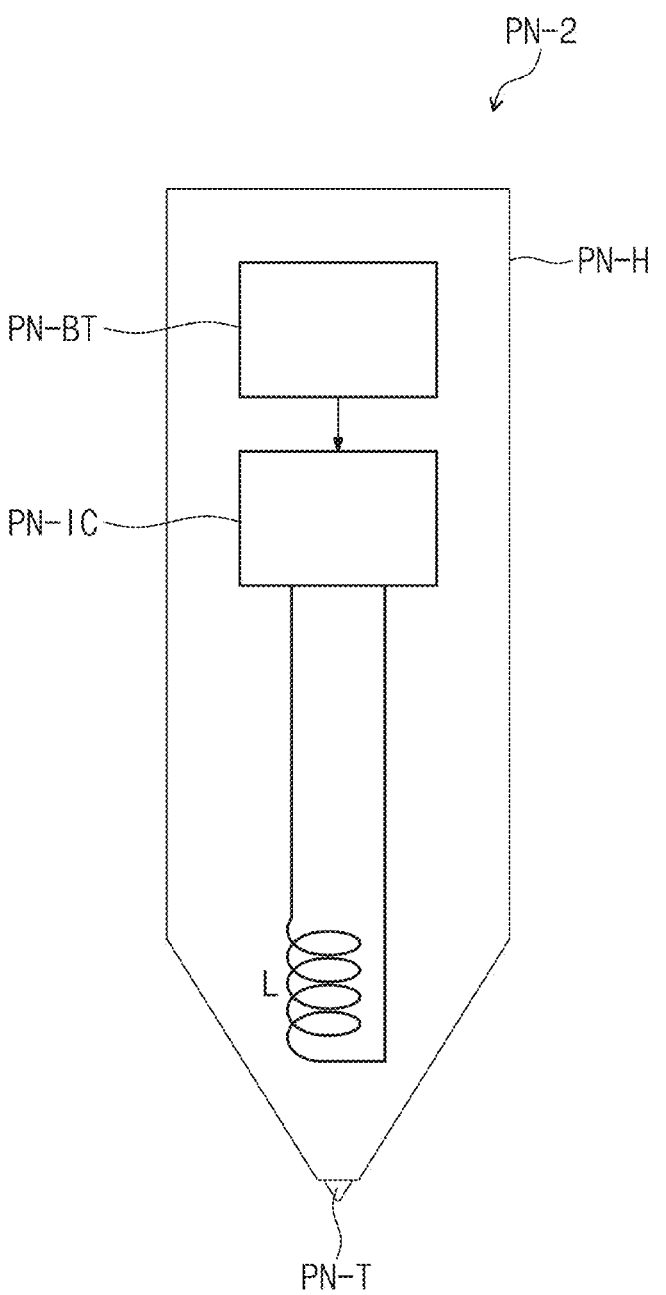
FIG. 5C is a view showing a pen according to an embodiment of the inventive concept.

FIG. 5C is a view showing a pen PN-2 according to an embodiment of the inventive concept.

Referring to FIGS. 4 and 5C, the pen PN-2 may not include an RLC resonance circuit. For example, the pen PN-2 may include a housing PN-H, a pen tip PN-T, an inductor L, a power supply unit PN-BT, and a control unit PN-IC. The power supply unit PN-BT may include a battery or a high-capacity capacitor. The control unit PN-IC may receive power from the power supply unit PN-BT and may control the frequency of signals output from the pen PN-2.

According to an embodiment of the inventive concept, the pen PN-2 may operate as an active type pen. Accordingly, even when a magnetic field is not provided from the sensor layer 200, the pen PN-2 may emit a magnetic field.

Figure 5D:
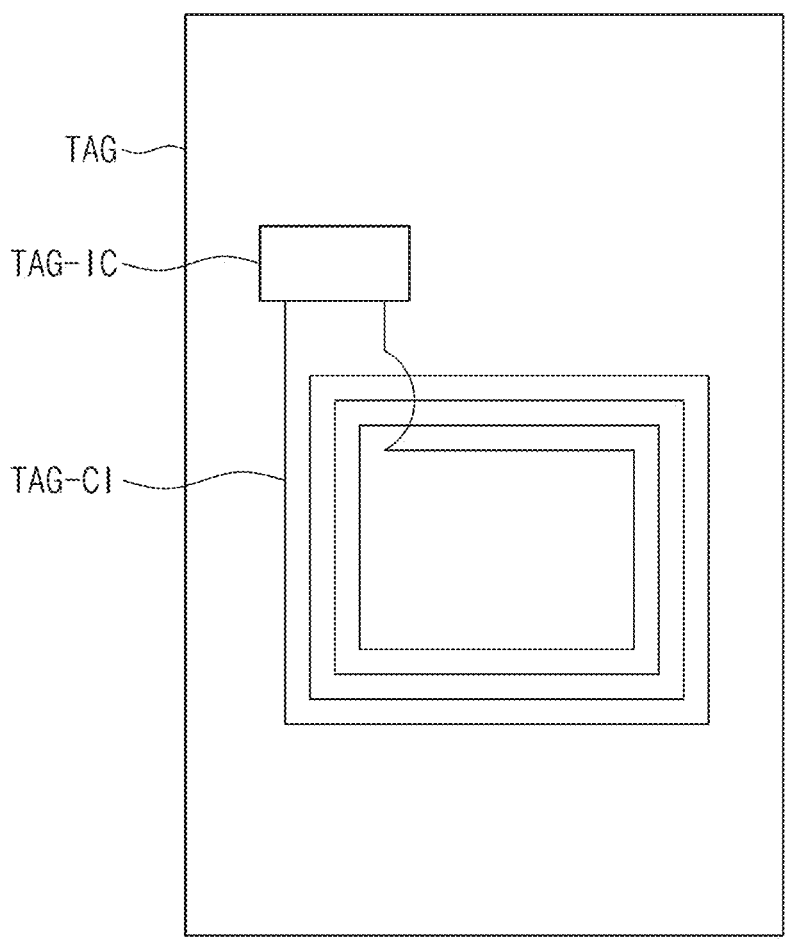
FIG. 5D is a view showing an input device according to an embodiment of the inventive concept.

FIG. 5D is a view showing an input device TAG according to an embodiment of the inventive concept.

Referring to FIGS. 4 and 5D, the sensor layer 200 may sense inputs on the input device TAG. The input device TAG may be referred to as an electronic tag, a smart tag, or an electronic label. The input device TAG may include a controller TAG-IC and an antenna TAG-CI connected to the controller TAG-IC. The antenna TAG-CI may emit radio waves having a unique code. The sensor layer 200 may detect the code of the input device TAG.

Figure 6:
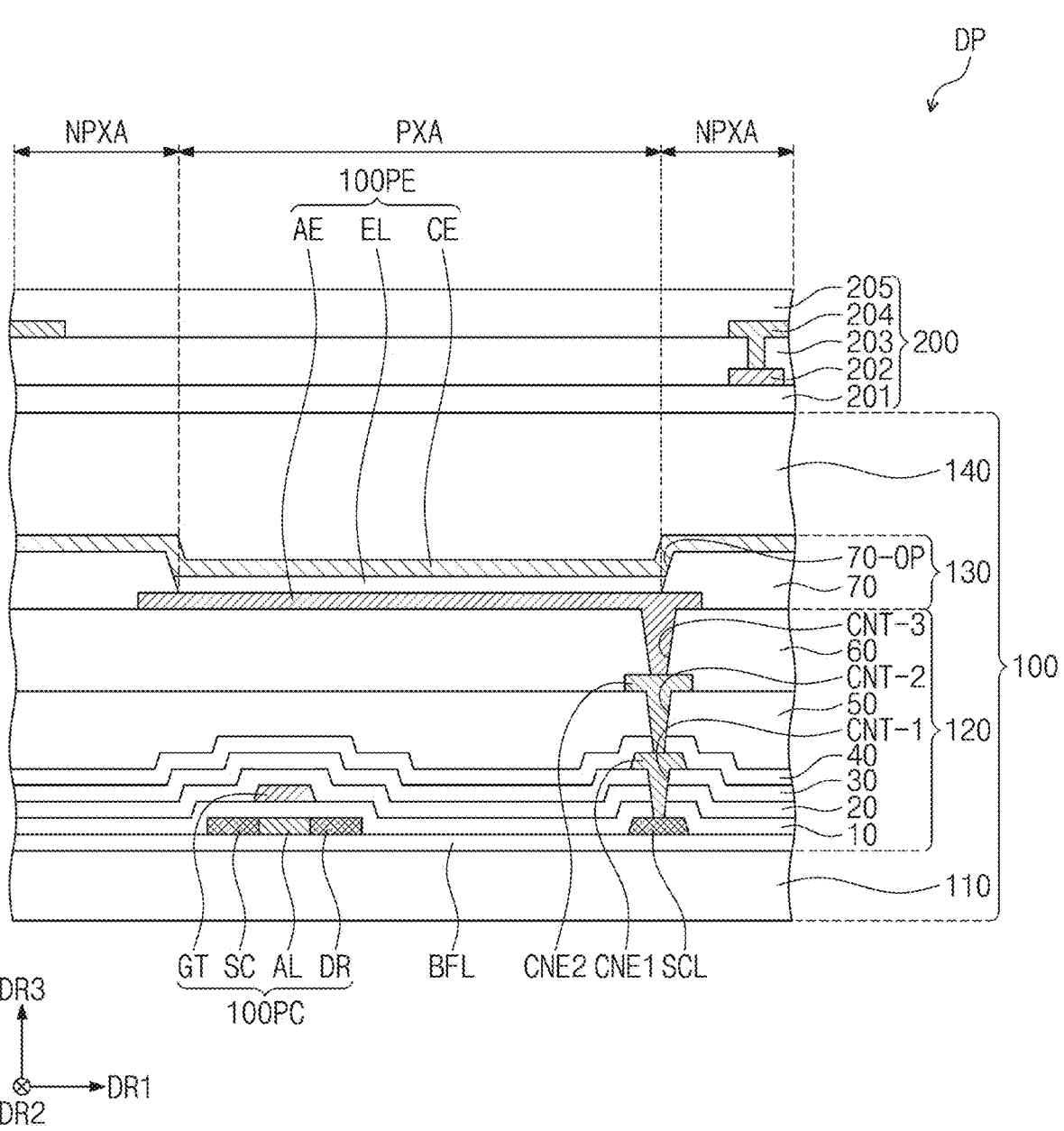
FIG. 6 is a cross-sectional view of a display panel according to an embodiment of the inventive concept.

FIG. 6 is a cross-sectional view of a display panel DP according to an embodiment of the inventive concept.

Referring to FIG. 6, at least one buffer layer BFL is formed on an upper surface of the base layer 110. The buffer layer BFL may improve the bonding force between the base layer 110 and a semiconductor pattern. The buffer layer BFL may be formed of multiple layers. Alternatively, the display layer 100 may further include a barrier layer. The buffer layer BFL may include at least one of silicon oxide, silicon nitride, or silicon oxynitride. For example, the buffer layer BFL may include a structure in which silicon oxide layers and silicon nitride layers are alternately stacked.

Semiconductor patterns SC, AL, DR, and SCL may be disposed on the buffer layer BFL. The semiconductor patterns SC, AL, DR, and SCL may include polysilicon. In other examples, the semiconductor pattern SC, AL, DR, and SCL may include amorphous silicon, low-temperature polycrystalline silicon, or an oxide semiconductor.

FIG. 6 only shows some semiconductor patterns SC, AL, DR, and SCL, and additional semiconductor patterns may be disposed in other regions. The semiconductor patterns SC, AL, DR, and SCL may be arranged in specific rules over pixels. The semiconductor patterns SC, AL, DR, and SCL may have different electrical properties according to with/ without doping. The semiconductor pattern SC, AL, DR, and SCL may include first regions SC, DR, and SCL having high conductivity and a second region AL having low conductivity. The first regions SC, DR, and SCL may be doped with an N-type dopant or a P-type dopant. A P-type transistor may include a doped region doped with the P-type dopant, and a N-type transistor may include a doped region doped with the N-type dopant. The second region AL may be a non-doped region or may be doped in a lower concentration than the first region.

The first regions SC, DR, and SCL may have greater conductivity than the second region AL, and may substantially serve as an electrode or a signal line. The second region AL may substantially correspond to an active region AL (or channel) of a transistor 100PC. That is, a portion AL of the semiconductor patterns SC, AL, DR, and SCL may be the active region AL of the transistor 100PC, other portions SC and DR may be a source region SC or a drain region DR of the transistor 100PC, and another portion SCL may be a connection electrode or a connection signal line SCL.

Each of pixels may have an equivalent circuit including a plurality of transistors, at least one capacitor, and a light emitting element, and the equivalent circuit diagram of the pixels may be modified in various forms. In FIG. 6, one transistor 100PC and a light emitting element 100PE included in the pixels are shown as an example.

The source region SC, the active region AL, and the drain region DR of the transistor 100PC may be formed from the semiconductor patterns SC, AL, DR, and SCL. The source region SC and the drain region DR may extend in opposite directions from the active region AL on a cross-section. A portion of the connection signal line SCL formed from the semiconductor patterns SC, AL, DR, and SCL is shown in FIG. 6. Although not shown separately, the connection signal line SCL may be connected to the drain region DR of the transistor 100PC on a plane.

A first insulating layer 10 may be disposed on the buffer layer BFL. The first insulating layer 10 may commonly overlap a plurality of pixels and cover the semiconductor patterns SC, AL, DR, and SCL. The first insulating layer 10 may be an inorganic layer and/or an organic layer, and have a single-layer structure or a multi-layer structure. The first insulating layer 10 may include at least one of aluminum oxide, titanium oxide, silicon oxide, silicon nitride, silicon oxynitride, zirconium oxide, or hafnium oxide. In the present embodiment, the first insulating layer 10 may be a single-layered silicon oxide layer. Insulating layers of the circuit layer 120 which will be described later in addition to the first insulating layer 10 may be inorganic layers and/or organic layers, and have single-layer or multi-layer structures. The inorganic layer may include at least one of the materials described above, but is not limited thereto.

A gate GT of the transistor 100PC is disposed on the first insulating layer 10. The gate GT may be a portion of a metal pattern. The gate GT overlaps the active region AL. In the process of doping or reducing the semiconductor patterns SC, AL, DR, and SCL, the gate GT may serve as a mask.

A second insulating layer 20 may be disposed on the first insulating layer 10 and may cover the gate GT. The second insulating layer 20 may commonly overlap pixels. The second insulating layer 20 may be an inorganic layer and/or an organic layer, and may have a single-layered or multi-layered structure. The second insulating layer 20 may include at least one of silicon oxide, silicon nitride, or silicon oxynitride. In the present embodiment, the second insulating layer 20 may have a multi-layer structure including a silicon oxide layer and a silicon nitride layer.

A third insulating layer 30 may be disposed on the second insulating layer 20. The third insulating layer 30 may have a single-layered or multi-layered structure. For example, the third insulating layer 30 may have a multi-layer structure including a silicon oxide layer and a silicon nitride layer.

A first connection electrode CNE1 may be disposed on the third insulating layer 30. The first connection electrode CNE1 may be connected to the connection signal line SCL through a contact hole CNT-1 passing through the first, second, and third insulating layers 10, 20, and 30.

A fourth insulating layer 40 may be disposed on the third insulating layer 30. The fourth insulating layer 40 may be a single-layered silicon oxide. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 passing through the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

The light emitting element layer 130 may be disposed on the circuit layer 120. The light emitting element layer 130 may include a light emitting element 100PE. For example, the light emitting element layer 130 may include organic light emitting materials, inorganic light emitting materials, organic-inorganic light emitting materials, quantum dots, quantum rods, micro LEDs, or nano LEDs. Hereinafter, the light emitting element 100PE is described as an organic light emitting element as an example, but is not particularly limited thereto.

The light emitting element 100PE may include a first electrode AE, an emission layer EL, and a second electrode CE.

The first electrode AE may be disposed on the sixth insulating layer 60. The first electrode AE may be connected to the second connection electrode CNE2 through a contact hole CNT-3 passing through the sixth insulating layer 60.

A pixel defining film 70 may be disposed on the sixth insulating layer 60 and may cover a portion of the first electrode AE. An opening 70-OP is defined in the pixel defining film 70. The opening portion 70-OP of the pixel defining film 70 exposes at least a portion of the first electrode AE.

The first display portion DA1-F (see FIG. 1A) may include a light emitting region PXA and a non-light emitting region NPXA adjacent to the light emitting region PXA. The non-light emitting region NPXA may surround the light emitting region PXA. In the present embodiment, the light emitting region PXA is defined to correspond to a portion of the first electrode AE exposed through the opening 70-OP.

An emission layer EL may be disposed on the first electrode AE. The emission layer EL may be disposed in a region corresponding to the opening 70-OP. That is, the emission layer EL may be separately formed on each of the pixels. When the emission layer EL is separately formed on each of the pixels, each of the emission layers EL may emit light of at least one color among blue, red, and green. However, the embodiment of the inventive concept is not limited thereto, and the emission layer EL may be connected to the pixels to be commonly provided. In this case, the emission layer EL may provide blue light or white light.

The second electrode CE may be disposed on the emission layer EL. The second electrode CE may have a single-body shape and may be commonly included in a plurality of pixels.

A hole control layer may be disposed between the first electrode AE and the emission layer EL. The hole control layer may be commonly disposed in the light emitting region PXA and the non-light emitting region NPXA. The hole control layer may include a hole transport layer, and may further include a hole injection layer. An electron control layer may be disposed between the emission layer EL and the second electrode CE. The electron control layer may include an electron transport layer, and may further include an electron injection layer. The hole control layer and the electron control layer may be commonly formed in the plurality of pixels using an open mask or an inkjet process.

The encapsulation layer 140 may be disposed on the light emitting element layer 130. The encapsulation layer 140 may include an inorganic layer, an organic layer, and an inorganic layer which are sequentially stacked, but the layers forming the encapsulation layer 140 are not limited thereto. The inorganic layers may protect the light emitting element layer 130 from moisture and oxygen, and the organic layer may protect the light emitting element layer 130 from foreign substances such as dust particles. The inorganic layers may include a silicon nitride layer, a silicon oxy nitride layer, a silicon oxide layer, a titanium oxide layer, an aluminum oxide layer, and the like. The organic layer may include an acryl-based organic layer, but is not limited thereto.

The sensor layer 200 may include a base layer 201, a first conductive layer 202, an intermediate insulating layer 203, a second conductive layer 204, and a cover insulating layer 205.

The base layer 201 may be an inorganic layer including any one among silicon nitride, silicon oxynitride, and silicon oxide. Alternatively, the base layer 201 may be an organic layer including an epoxy resin, an acrylic resin, or an imide-based resin. The base layer 201 may have a single-layer structure or may have a multi-layer structure stacked along the third direction DR3.

Each of the first conductive layer 202 and the second conductive layer 204 may have a single-layer structure or may have a multi-layer structure stacked along the third direction DR3.

Each of the first conductive layer 202 and the second conductive layer 204 having a single-layer structure may include a metal layer or a transparent conductive layer. The metal layer may include molybdenum, silver, titanium, copper, aluminum, or an alloy thereof. The transparent conductive layer may include transparent conductive oxides such as an indium tin oxide (ITO), an indium zinc oxide (IZO), a zinc oxide (ZnO), and an indium tin zinc oxide (ITZO). In addition, the transparent conductive layer may include a conductive polymer such as poly(3,4-ethylenedioxythiophene) (PEDOT), a metal nanowire, graphene, and the like.

Each of the first conductive layer 202 and the second conductive layer 204 having a multi-layer structure may include metal layers. The metal layers may have a three-layer structure of, for example, titanium/aluminum/titanium. The multi-layer conductive layer may include at least one metal layer and at least one transparent conductive layer.

A thickness of the first conductive layer 202 may be greater than or equal to a thickness of the second conductive layer 204. When the thickness of the first conductive layer 202 is greater than the thickness of the second conductive layer 204, resistance of components included in the first conductive layer 202 may be reduced. In addition, the first conductive layer 202 is disposed below the second conductive layer 204, and accordingly, even when the thickness of the first conductive layer 202 is increased, the first conductive layer 202 may have lower chances of patterns being visible due to external light reflection than the second conductive layer 204.

A width of a first mesh line included in the first conductive layer 202 may be less than or equal to a width of a second mesh line included in the second conductive layer 204. When users view the electronic device 1000 (see FIG. 1A), the first mesh line has a smaller width than the second mesh line, and accordingly, the chances of the first mesh line being visible to the users may be reduced.

At least any one of the intermediate insulating layer 203 or the cover insulating layer 205 may include an inorganic film. The inorganic film may include at least one of aluminum oxide, titanium oxide, silicon oxide, silicon nitride, silicon oxynitride, zirconium oxide, or hafnium oxide.

At least any one of the intermediate insulating layer 203 or the cover insulating layer 205 may include an organic film. The organic film may include at least any one of an acryl-based resin, a methacrylate-based resin, polyisoprene, a vinyl-based resin, an epoxy-based resin, a urethane-based resin, a cellulose-based resin, a siloxane-based resin, a polyimide-based resin, a polyamide-based resin, or a perylene-based resin.

In the descriptions above, the sensor layer 200 includes the first conductive layer 202 and the second conductive layer 204, that is, a total of two conductive layers as an example, but in other embodiments the sensor layer 200 may include three or more conductive layers.

Figure 7:
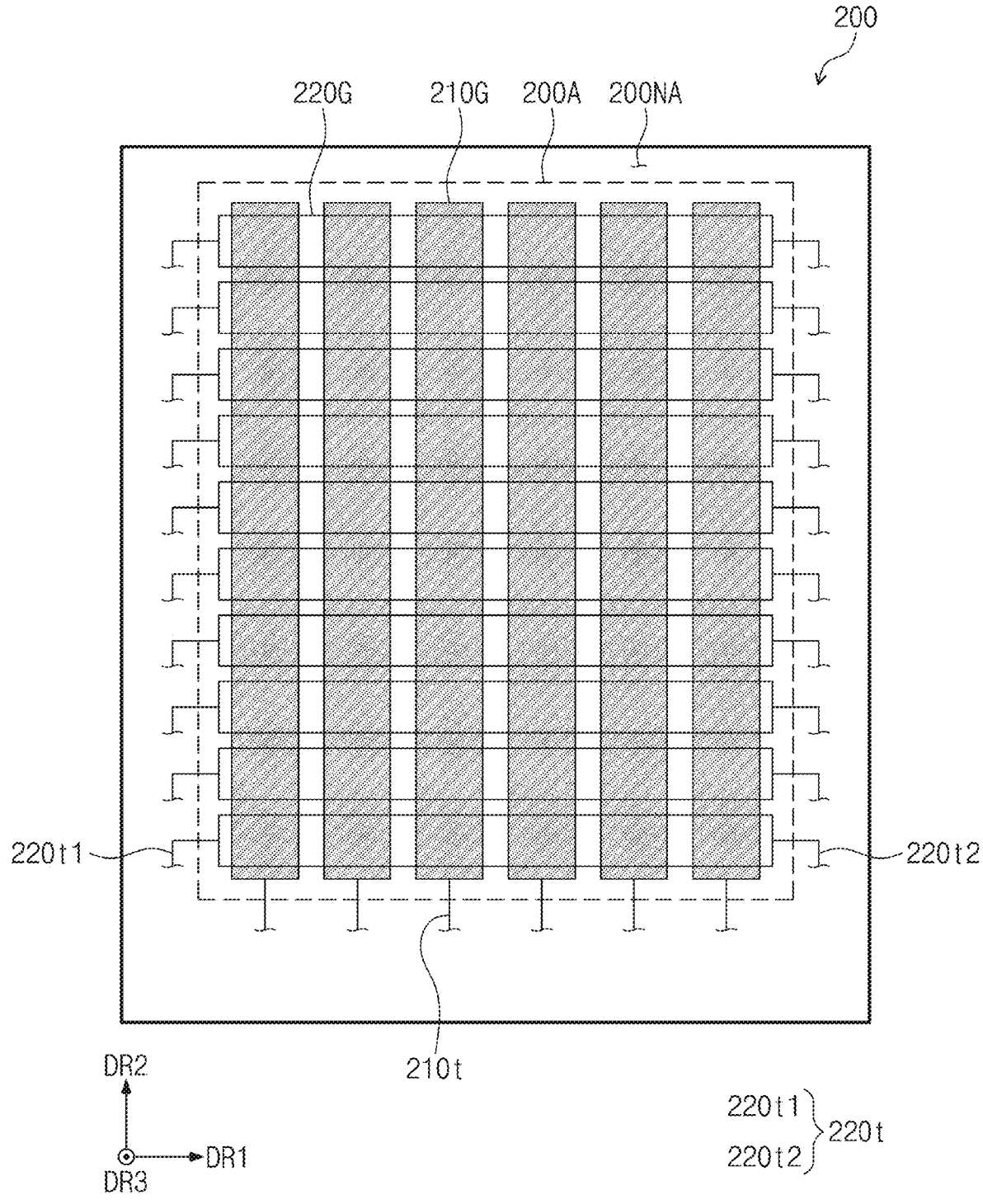
FIG. 7 is a plan view of a sensor layer according to an embodiment of the inventive concept.

FIG. 7 is a plan view of the sensor layer 200 according to an embodiment of the inventive concept.

Referring to FIG. 7, a sensing region 200A and a peripheral region 200NA adjacent to the sensing region 200A may be defined in the sensor layer 200.

The sensor layer 200 may include a plurality of first electrode groups 210G and a plurality of second electrode groups 220 disposed in the sensing region 200A. Each of the first electrode groups 210G may cross the second electrode groups 220G. Each of the first electrode groups 210G may extend along the second direction DR2, and the first electrode groups 210G may be arranged spaced apart in the first direction DR1. Each of the second electrode groups 220G may extend along the first direction DR1, and the second electrode groups 220G may be arranged spaced apart in the second direction DR2.

FIG. 7 shows that the first electrode groups 210G is six in total and the second electrode groups 220G are ten in total as an example, but the number of first electrode groups 210G and the number of second electrode groups 220G are not limited to thereto.

The sensor layer 200 may further include a plurality of first trace lines 210*t* and a plurality of second trace lines 220*t* disposed at least partly in a peripheral region 200NA. The first trace lines 210*t* may be electrically connected to the first electrode groups 210G in a one-to-one correspondence. As such, one first trace line 210*t* may be connected to one first electrode group 210G. The second trace lines 220*t* may be electrically connected to the second electrode groups 220G in a two-to-one correspondence. Thus, two second trace lines 220*t*1 and 220*t*2 may be electrically connected to one second electrode group 220G. One of the second trace lines 220*t*1 and 220*t*2 may be referred to as a first cross trace line 220*t*1, and the other may be referred to as a second cross trace line 220*t*2.

The second trace lines 220*t* are electrically connected to the second electrode groups 220G in a two-to-one correspondence, and accordingly, the number of second trace lines 220*t* may be twice the number of second electrode groups 220G. In an embodiment of the inventive concept, at least a portion of the second trace lines 220*t* or at least a portion of each of the second trace lines 220*t* may overlap the sensing region 200A. In an embodiment of the inventive concept, the second trace lines 220*t* may extend and overlap the first electrode groups 210G and the second electrode groups 220G. Accordingly, an area of the peripheral region 200NA may be reduced. Accordingly, an area occupied by the peripheral region 200NA on a front surface of the electronic device 1000 (see FIG. 1A) may be reduced, and a narrow bezel may be implemented.

Figure 8:
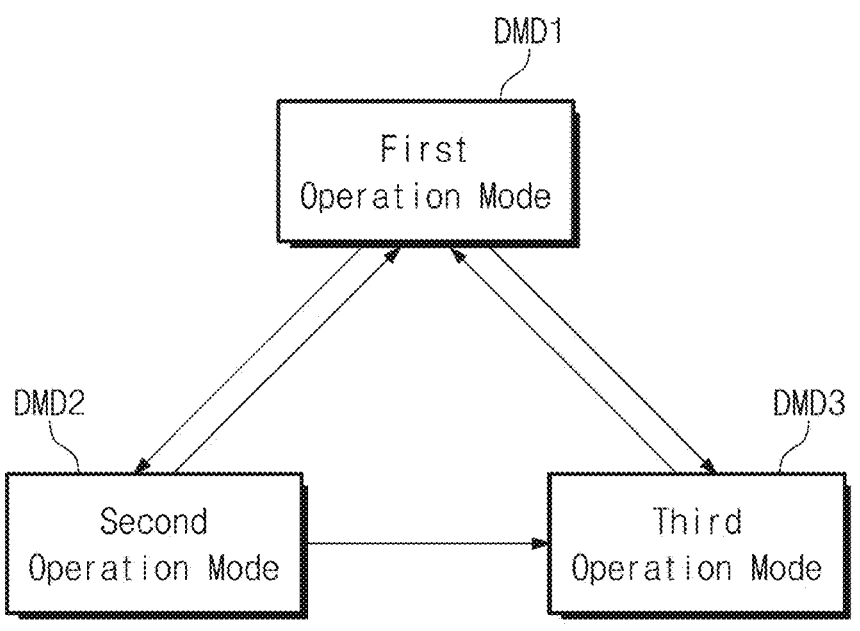
FIG. 8 is a view showing the operation of a sensor driver according to an embodiment of the inventive concept.

FIG. 8 is a view showing the operation of the sensor driver 200C (see FIG. 4) according to an embodiment of the inventive concept.

Referring to FIGS. 4 and 8, the sensor driver 200C may be configured to be selectively driven in any one of a first operation mode DMD1, a second operation mode DMD2, and a third operation mode DMD3.

The first operation mode DMD1 may be referred to as a touch and pen standby mode; the second operation mode DMD2 may be referred to as a touch activation and pen standby mode; and the third operation mode DMD3 may be referred to as a pen activation mode. The first operation mode DMD1 may be a mode that waits for the first input 2000 and the second input 3000. The second operation mode DMD2 may be a mode that senses the first input 2000 and waits for the second input 3000. The third operation mode DMD3 may be a mode for sensing the second input 3000. (Implementation details of the first to third operation modes DMD1-DMD2 are explained further below in connection with FIG. 9.)

In an embodiment of the inventive concept, the sensor driver 200C may first be driven in the first operation mode DMD1. When the first input 2000 is sensed in the first operation mode DMD1, the operation mode driving the sensor driver 200C may be switched (or changed) to the second operation mode DMD2. Alternatively, when the second input 3000 is sensed in the first operation mode DMD1, the operation mode driving the sensor driver 200C may be switched (or changed) to the third operation mode DMD3.

In an embodiment of the inventive concept, when the second input 3000 is sensed in the second operation mode DMD2, the operation mode driving the sensor driver 200C may be switched to the third operation mode DMD3. When the first input 2000 is released (or not sensed) in the second operation mode DMD2, the operation mode driving the sensor driver 200C may be switched to the first operation mode DMD1. When the second input 3000 is released (or not sensed) in the third operation mode DMD3, the operation mode driving the sensor driver 200C may be switched to the first operation mode DMD1.

Figure 9:
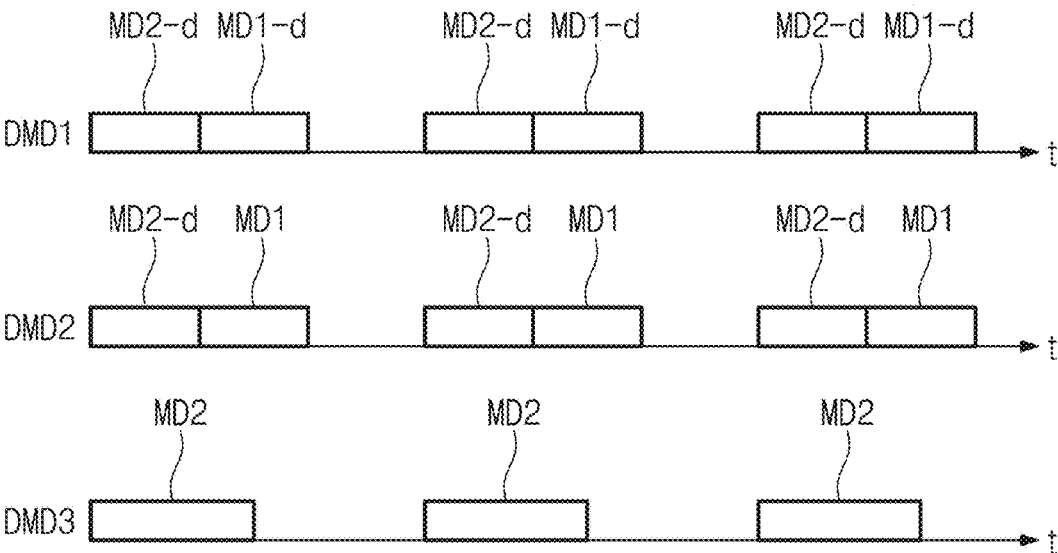
FIG. 9 is a view showing the operation of a sensor driver according to an embodiment of the inventive concept.

FIG. 9 is a view showing the operation of the sensor driver 200C (see FIG. 4) according to an embodiment of the inventive concept.

Referring to FIGS. 4, 8, and 9, operations in the first to third operation modes DMD1, DMD2, and DMD3 are shown in order of time t.

In the first operation mode DMD1, the sensor driver 200C may be repeatedly driven in the second mode MD2-*d* and the first mode MD1-*d*. During the second mode MD2-*d*, the sensor layer 200 may be scan driven to detect the second input 3000. During the first mode MD1-*d*, the sensor layer 200 may be scan driven to detect the first input 2000. In FIG. 9, the sensor driver 200C is shown to operate in the first mode MD1-*d* consecutively after the second mode MD2-*d*, but the order may be swapped in other example implementations.

In the second operation mode DMD2, the sensor driver 200C may be repeatedly driven in the second mode MD2-*d* and the first mode MD1. During the second mode MD2-*d*, the sensor layer 200 may be scan driven to detect the second input 3000. During the first mode MD1, the sensor layer 200 may be scan driven to detect coordinates by the first input 2000.

In the third operation mode DMD3, the sensor driver 200C may be driven in the second mode MD2. During the second mode MD2, the sensor layer 200 may be scan driven to detect coordinates by the second input 3000. In the third operation mode DMD3, the sensor driver 200C may not operate in the first mode MD1-*d* or MD1 until the second input 3000 is released (or not sensed).

Figure 10:
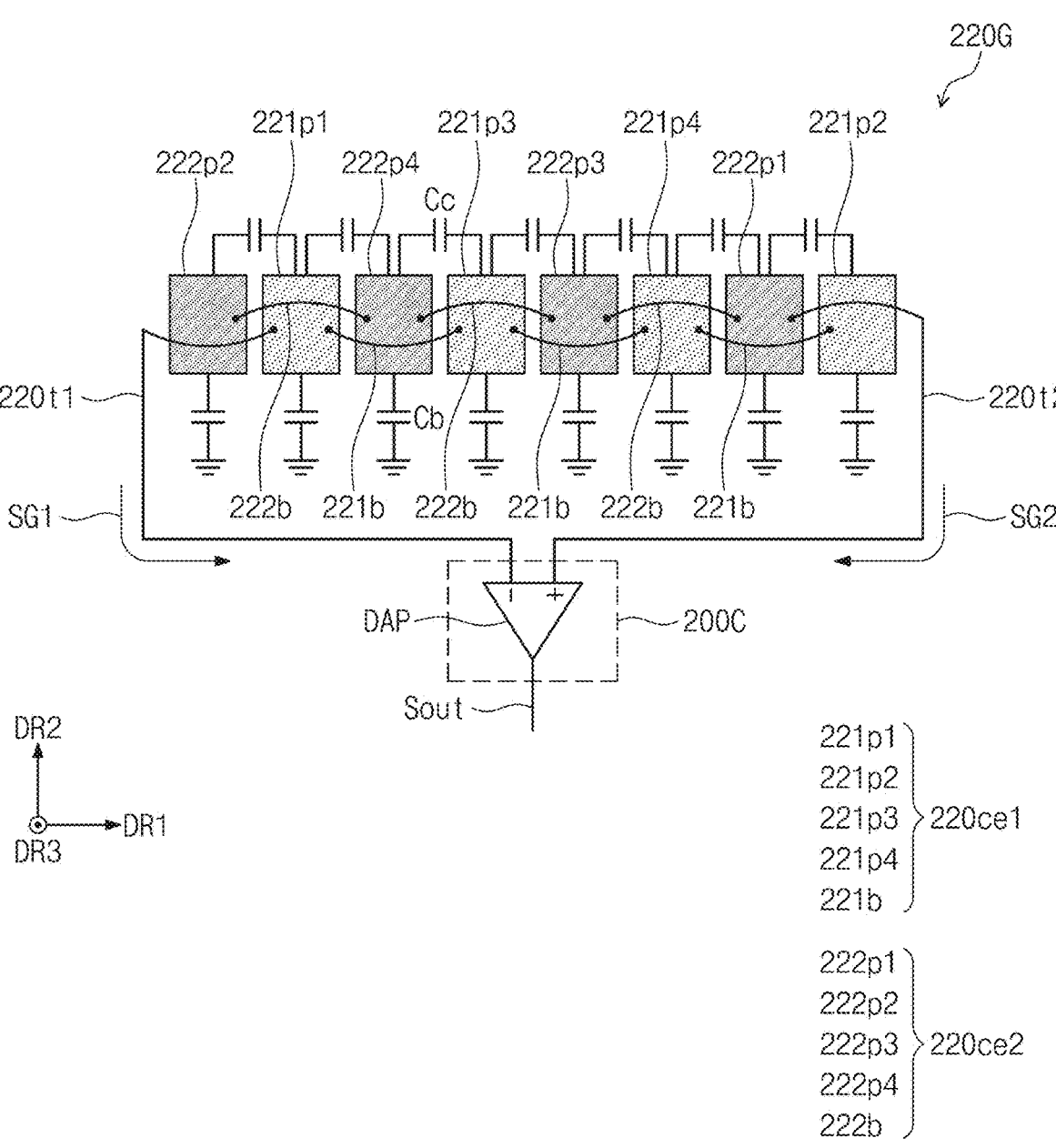
FIG. 10 is a view showing one electrode group and a portion of a sensor driver according to an embodiment of the inventive concept.

FIG. 10 is a view showing one electrode group 220G and a portion of a sensor driver 200C according to an embodiment of the inventive concept.

Referring to FIGS. 7, 9, and 10, a plurality of second electrode groups 220G may have substantially the same structure. Accordingly, in FIG. 10, one second electrode group 220G is described.

The second electrode group 220G may include a first cross electrode 220*ce*1 and a second cross electrode 220*ce*2. The first and second cross electrodes 220*ce*1 and 220*ce*2 may be referred to as first and second sub-electrodes, first and second alternate electrodes, or first and second electrodes.

The first cross electrode 220*ce*1 may include first "sensing patterns" 221*p*1, 221*p*2, 221*p*3 and 221*p*4 (collectively hereafter, "221*p*") and three first bridges 221*b*. The second cross electrode 220*ce*2 may include second "sensing patterns" 222*p*1, 222*p*2, 222*p*3 and 222*p*4 (collectively hereafter, "222*p*") and second bridges 222*b*. Herein, the term "sensing pattern" refers to a pattern of conductive elements, e.g., arranged in a mesh structure that may together form a translucent touch sensing or pen sensing element. This may allow images from the display layer 100 below to be visible to a user of the electronic device 1000.

In other examples, the second electrode group has more or fewer first sensing patterns and first bridges, and has more or fewer second sensing patterns and second bridges. (For a minimal case, an embodiment with just one first sensing pattern and one second sensing pattern is possible.)

The first sensing patterns 221*p* may be the same as or different from the second sensing patterns 222*p* (in terms of the geometrical patterns of the conductive elements). The first sensing patterns 221*p* may be arranged spaced apart in the first direction DR1, and the first bridge 221*b* may be connected to the first sensing patterns 221*p* spaced apart in the first direction DR1. The second sensing patterns 222*p* may be arranged spaced apart in the first direction DR1, and the second bridge 222*b* may be connected to the second sensing patterns 222*p* spaced apart in the first direction DR1. At least one of the first sensing patterns 221*p* and at least one of the second sensing patterns 222*p* may be alternately arranged.

The first sensing patterns 221*p* and the second sensing patterns 222*p* may be disposed on the same layer, and the first bridges 221*b* and the second bridges 222*b* may be disposed on the same layer. For example, the first conductive layer 202 (see FIG. 6) may include the first bridges 221*b* and the second bridges 222*b*, and the second conductive layer 204 (see FIG. 6) may include the first sensing patterns 221*p* and the second sensing patterns 222*p*. In this case, the first bridges 221*b* and the first sensing patterns 221*p* may be electrically connected through a via hole formed in the intermediate insulating layer 203 (see FIG. 6), and the second bridges 222*b* and the second sensing patterns 222*p* may be electrically connected through a via hole formed in the intermediate insulating layer 203 (see FIG. 6).

The sensor layer 200 may further include a dummy pattern (not shown). For example, the dummy pattern may be disposed in a region in which the first bridges 221*b* and the second bridges 222*b* are not disposed in the first conductive layer 202. In this case, the chances of the first bridges 221*b* and the second bridges 222*b* being visible due to external light reflection may be reduced. Thus, the electronic device 1000 (see FIG. 1A) having improved visibility according to external light reflection may be provided.

In another embodiment of the inventive concept, the first sensing patterns 221*p*, the second sensing patterns 222*p*, the first bridges 221*b*, and the second bridges 222*b* may be disposed on the same layer. In this case, the first sensing patterns 221*p* may be spaced apart from the second bridges 222*b* and electrically insulated therefrom. In addition, the second sensing patterns 222*p* may also be spaced apart from the first bridges 221*b* and electrically insulated therefrom.

In another embodiment of the inventive concept, the first bridges 221*b* may be single first bridge lines connected to each other, and the second bridges 222*b* may be single second bridge lines connected to each other. For example, the first conductive layer 202 (see FIG. 6) may include a first bridge line and a second bridge line, and the second conductive layer 204 (see FIG. 6) may include the first sensing patterns 221*p* and the second sensing patterns 222*p*. Each of the first bridge line and the second bridge line may overlap the first sensing patterns 221*p* and the second sensing patterns 222*p*. The first bridge line and the first sensing patterns 221*p* may be electrically connected through a via hole formed in the intermediate insulating layer 203 (see FIG. 6), and the second bridge line and the second sensing patterns 222*p* may be electrically connected through a via hole formed in the intermediate insulating layer 203 (see FIG. 6).

In this case, a plurality of bridges may not be formed, but a single bridge line is used instead, whereby resistance may be reduced. In addition, the bridges are provided in the form of lines instead of being spaced apart at predetermined intervals, the chances of the bridge lines being visible from the exterior may be reduced. Thus, the effect of improving visibility may be achieved. In addition, a dummy pattern in a region in which the bridge lines are not disposed in the first conductive layer 202 may be provided to provide the electronic device 1000 (see FIG. 1A) having improved visibility according to external light reflection.

The number of first sensing patterns 221*p* may equal the number of second sensing patterns 222*p* included in the second electrode group 220G. In this case, the total base capacitance of the first cross electrode 220*ce*1 and the total base capacitance of the second cross electrode 220*ce*2 may substantially be the same. As noted above, each of the first sensing patterns 221*p* and the second sensing patterns 222*p* may number more and fewer than the four shown in FIG. 10 in other examples. In addition, each of the first sensing patterns 221*p* and each of the second sensing patterns 222*p* may be composed of a plurality of patterns that are electrically connected (e.g., closed elements like squares, rectangles, circles, etc. forming a mesh structure) but are shaped to be separated from each other.

The first cross trace line 220*t*1 may be electrically connected to the first cross electrode 220*ce*1, and the second cross trace line 220*t*2 may be electrically connected to the second cross electrode 220*ce*2. For example, the first cross trace line 220*t*1 may be directly connected to one of the first sensing patterns 221*p*1, and the second cross trace line 220*t*2 may be directly connected to one second sensing pattern 222*p*1 among the second sensing patterns 222*p*. The first cross trace line 220*t*1 and the second cross trace line 220*t*2 may be spaced apart in the first direction DR1.

According to an embodiment of the inventive concept, one first sensing pattern 221*p*2 among the first sensing patterns 221*p* may be disposed at a first end of one second electrode group 220G, and one second sensing pattern 222*p*2 among the second sensing patterns 222*p* may be disposed at a second end of the second electrode group 220G. At least one second sensing pattern 222*p*2 among the second sensing patterns 222*p* may be disposed between a portion of the first cross trace line 220*t*1 and one first sensing pattern 221*p*1. In addition, at least one first sensing pattern 221*p*2 among the first sensing patterns 221*p* may be disposed between a portion of the second cross trace line 220*t*2 and one second sensing pattern 222*p*1.

Thus, a sensing pattern to which a trace line is not connected may be closer to the peripheral region 200NA than a sensing pattern to which a trace line is connected. In the first cross electrode 220*ce*1, the first sensing pattern 221*p*2 may be closer to the peripheral region 200NA than the first sensing pattern 221*p*1, and in the second cross electrode 220*ce*2, the second sensing pattern 222*p*2 may be closer to the peripheral region 200NA than the second sensing pattern 222*p*1. In this case, a base capacitance Cb at the end where the trace line is not connected may be provided as close to the peripheral region 200NA as possible with respect to one cross electrode. In this case, even when inputs of the pen PN are provided from a region further than the trace connection region, signal intensity (or signal strength) may be further improved by the base capacitance Cb at the end.

In another embodiment of the inventive concept, the positions of the first cross trace line 220*t*1 and the second cross trace line 220*t*2 shown in FIG. 10 may be changed. For instance, the first cross trace line 220*t*1 may be directly connected to one of the first sensing patterns 221*p*2, and the second cross trace line 220*t*2 may be directly connected to one second sensing pattern 222*p*2 among the second sensing patterns 222*p*. In this case, the first cross trace line 220*t*1 and the first sensing pattern 221*p*2 may be disposed on the same layer and may be shaped to be connected to each other as a single body. In addition, the second cross trace line 220*t*2 and the second sensing pattern 222*p*2 may be disposed on the same layer and may be shaped to be connected to each other as a single body. In this case, resistance may be reduced because the two components are directly connected on the same layer instead of a via hole, and this may lead to improved sensing sensitivity.

The second mode MD2-*d* or the second mode MD2 may include a pen sensing drive mode. In the pen sensing drive mode, the sensor layer 200 and the sensor driver 200C may sense induced current generated by magnetic field emitted from the pen PN. In the pen sensing drive mode, the sensor driver 200C may be configured to receive a first signal SG1 from the first cross electrode 220*ce*1 and to receive a second signal SG2 from the second cross electrode 220*ce*2.

The sensor driver 200C may include a differential amplifier DAP. An inverting terminal of the differential amplifier DAP may be electrically connected to the first cross electrode 220*ce*1, and a non-inverting terminal of the differential amplifier DAP may be electrically connected to the second cross electrode 220*ce*2. The differential amplifier DAP may output an output signal Sout by amplifying a signal proportional to a difference between the first signal SG1 and the second signal SG2.

The first signal SG1 and the second signal SG2 may contain the same or substantially the same amount of noise; this noise may be removed through the differential amplifier DAP. In addition, current directions of the first signal SG1 and the second signal SG2 may be opposite. Accordingly, the signal intensity may be greater by differentiating the first signal SG1 and the second signal SG2. Accordingly, the signal-to-noise ratio increases, and therefore, the driver 200C of the electronic device 1000 (see FIG. 1A) may have improved sensing sensitivity as compared to conventional devices.

Figure 11:
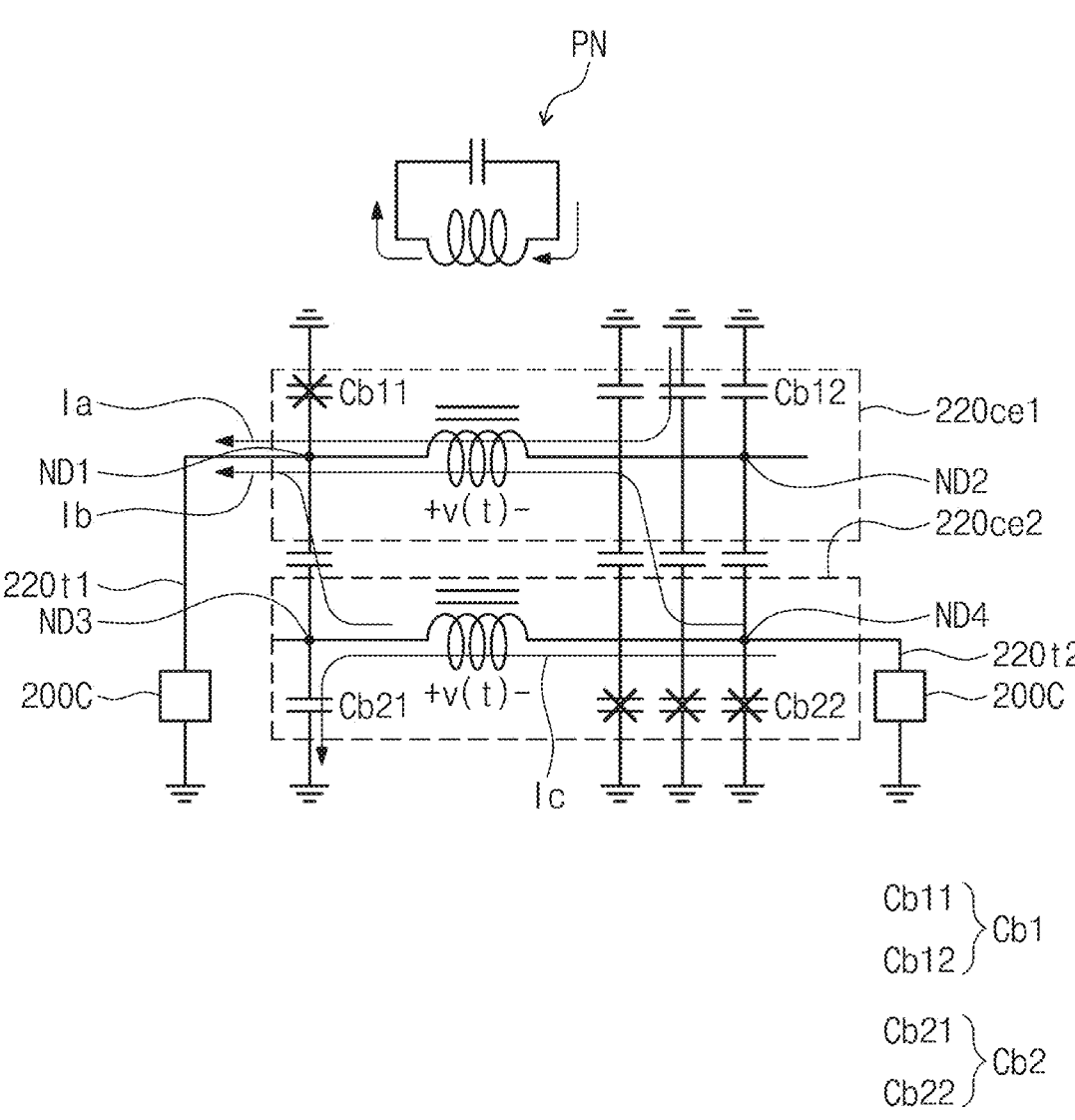
FIG. 11 is an equivalent circuit diagram showing a relationship between one electrode group and a pen according to an embodiment of the inventive concept.
Figure 12:
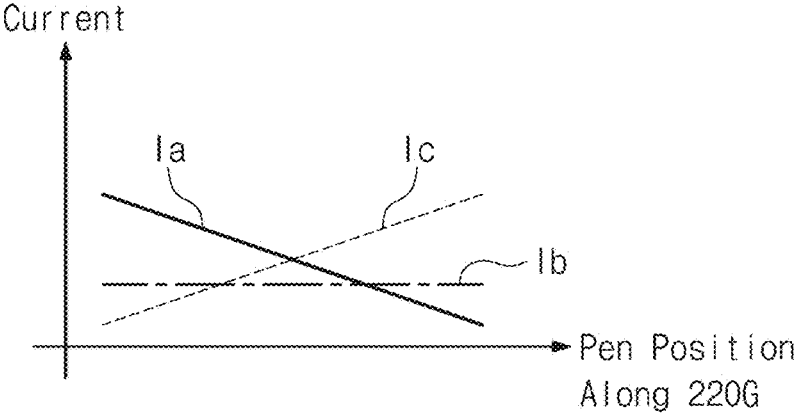
FIG. 12 is a graph showing the intensity of current according to pen position for one channel.
Figure 13:
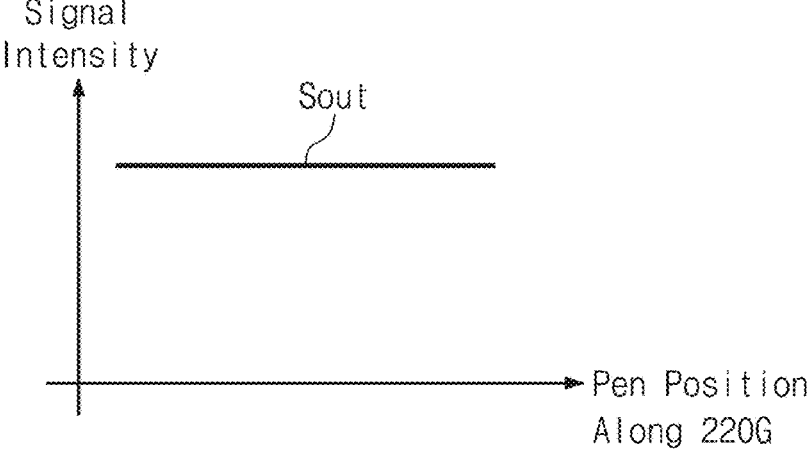
FIG. 13 is a graph showing the intensity of output signals according to pen position for one channel.

FIG. 11 is an equivalent circuit diagram showing a relationship between one electrode group and a pen's circuitry and induced voltages and currents caused by the pen according to an embodiment of the inventive concept. FIG. 12 is a graph showing the intensity of current according to pen position along one second electrode group 220G (in the first direction DR1 (see FIG. 10)) for one channel corresponding to the one second electrode group 220G. FIG. 13 is a graph showing the intensity of output signals according to pen position for the one channel.

Referring to FIGS. 10 and 11, the first cross electrode 220*ce*1 may be electrically connected to the sensor driver 200C through a first node ND1, and the second cross electrode 220*ce*2 may be electrically connected to the sensor driver 200C through a fourth node ND4. The first node ND1 may be a left node of the first cross electrode 220*ce*1, and the fourth node ND4 may be a right node of the second cross electrode 220*ce*2.

A plurality of coupling capacitors Cc may be defined between the first cross electrode 220*ce*1 and the second cross electrode 220*ce*2. Referring to FIG. 10, as an example, it is shown that seven coupling capacitors Cc are defined between the first sensing patterns 221*p* and the second sensing patterns 222*p*.

Four first base capacitors Cb1 (Cb11, Cb12 and the two therebetween) may be defined in the first cross electrode 220*ce*1, and four second base capacitors Cb2 (Cb21, Cb22 and the two therebetween) may be defined in the second cross electrode 220*ce*2. The first base capacitors Cb1 may correspond to the number of first sensing patterns 221*p,* and the second base capacitors Cb2 may correspond to the number of second sensing patterns 222*p*.

When the pen PN is close to the first cross electrode 220*ce*1 and the second cross electrode 220*ce*2, an induced electromotive force v(t) may be generated by magnetic field generated from the pen PN in each of the first cross electrode 220*ce*1 and the second cross electrode 220*ce*2. FIG. 11 shows, as an example, that the same induced electromotive force v(t) is generated in each of the first cross electrode 220*ce*1 and the second cross electrode 220*ce*2, but different induced electromotive forces v(t) may be generated in other examples.

First to third induced currents Ia, Ib, and Ic may be generated by the induced electromotive force v(t) in the first cross electrode 220*ce*1 and the second cross electrode 220*ce*2. The first signal SG1's current may correspond to the sum of the first induced current Ia and the second induced current Ib, and the second signal SG2's current may correspond to a negative value (signifying a negative relative direction) of the sum of the second induced current Ib and the third induced current Ic.

For example, the capacitance of each of the first base capacitors Cb1 and the capacitance of each of the second base capacitors Cb2 is assumed to be Cb, and the capacitance of the coupling capacitors Cc is assumed to be Cc.

A ground voltage may be applied to the first node ND1 and the fourth node ND4 connected to the sensor driver 200C. Therefore, the voltages at one end and the other end of the first base capacitor Cb11 are the same. Because the voltage difference between the two ends of the capacitor is 0, the induced current may not be transmitted through the first base capacitor Cb11. Additionally, the voltage at one end and the other end of the second base capacitor Cb22 may be the same. Therefore, induced current may not be transmitted through the second base capacitor Cb22. In addition, a voltage at a second node ND2 corresponding to a right end of the first cross electrode 220*ce*1 may be −v(t), and a voltage of a third node ND3 corresponding to a left end of the second cross electrode 220*ce*2 may be v(t).

The first induced current Ia over time may be indicated by the following equation.

$$Ia(t) = 3Cb \ dv(t)/dt$$

The second induced current Ib over time may be indicated by the following equation.

$$Ib(t) = 7Cc \ dv(t)/dt$$

The third induced current Ic over time may be indicated by the following equation.

$$Ic(t) = Cb \ dv(t)/dt$$

The first signal SG1 may correspond to Ia(t)+Ib(t)+NOISE, and the second signal SG2 may correspond to −Ib(t)−Ic(t)+NOISE.

Referring to FIGS. 11, 12, and 13, as the position of the pen PN moves from the first node ND1 to the second node ND2, the first induced current Ia may gradually decline, the second induced current Ib may be substantially the same, and the third induced current Ic may gradually rise.

When the first signal SG1 and the second signal SG2 are differentiated by the differential amplifier DAP, noise included in the first signal SG1 and the second signal SG2 may be removed. In addition, the two signals are differentiated, and accordingly, the intensity of the output signal Sout may be output in a form that remains constant regardless of the position of the pen PN.

Therefore, according to an embodiment of the inventive concept, one electrode group may include two cross electrodes through which current flows in different directions. In this case, current directions of signals received from the two cross electrodes are opposite, and noise generated in the two cross electrodes may be substantially the same. When output signals are generated by differentiating two signals using the differential amplifier DAP, noise may be removed and the intensity of the output signal Sout may be greater. Accordingly, the signal-to-noise ratio may increase, and thus the electronic device 1000 (see FIG. 1A) may have improved sensing sensitivity.

Figure 14:
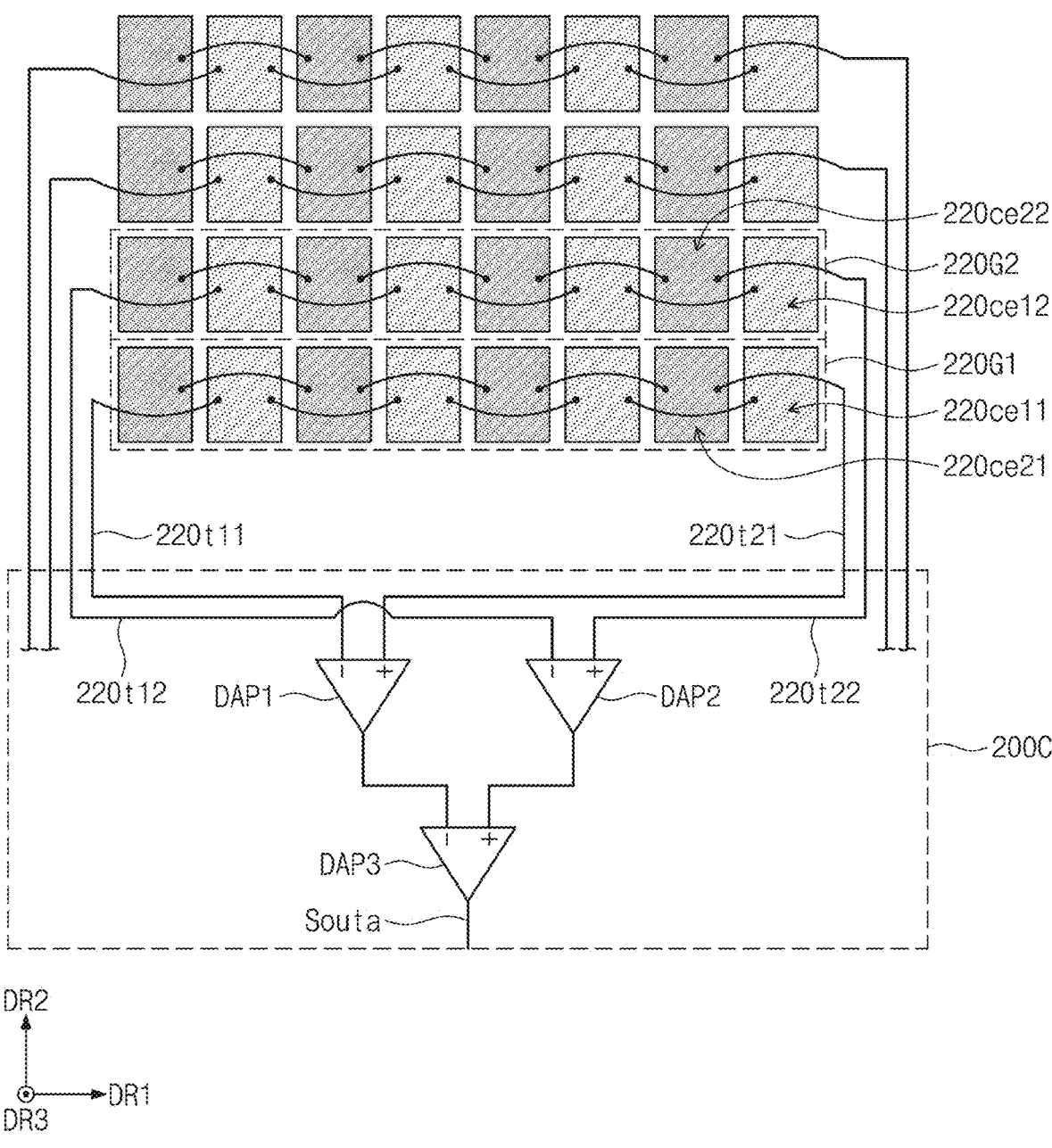
FIG. 14 is a view showing four electrode groups and a portion of a sensor driver according to an embodiment of the inventive concept.

FIG. 14 is a view showing four second electrode groups 220G and a portion of a sensor driver 220C according to an embodiment of the inventive concept. In the embodiment of FIG. 14, current may be sensed by differentially sensing channels adjacent to each other or channels spaced apart from each other. This may facilitate calculation of pen PN coordinates, based on a centroid method or a maximum point of a trend line.

Referring to FIGS. 7 and 14, the sensor driver 200C may include a first differential amplifier DAP1, a second differential amplifier DAP2, and a third differential amplifier DAP3.

In the pen sensing drive mode, the first differential amplifier DAP1 and the second differential amplifier DAP2 may each receive signals from a respective one of the second electrode groups 220G, an inverting terminal of the third differential amplifier DAP3 may receive signals output from the first differential amplifier DAP1, and a non-inverting terminal of the third differential amplifier DAP3 may receive signals output from the second differential amplifier DAP2 and output an output signal Souta.

The second electrode groups 220G may include a (2-1)-th electrode group 220G1 and a (2-2)-th electrode group 220G2 spaced apart from the (2-1)-th electrode group 220G1 in the second direction DR2.

In the pen sensing drive mode, the inverting terminal of the first differential amplifier DAP1 may be electrically connected to a first cross electrode 220ce11 of the (2-1)-th electrode group 220G1 through a (1-1)-th cross trace line 220t11, and the non-inverting terminal of the first differential amplifier DAP1 may be electrically connected to a second cross electrode 220ce21 of the (2-1)-th electrode group 220G1 through a (2-1)-th cross trace line 220t21.

In the pen sensing drive mode, the inverting terminal of the second differential amplifier DAP2 may be electrically connected to a first cross electrode 220ce12 of the (2-2)-th electrode group 220G2 through a (1-2)-th cross trace line 220t12, and the non-inverting terminal of the second differential amplifier DAP2 may be electrically connected to a second cross electrode 220ce22 of the (2-2)-th electrode group 220G2 through a (2-2)-th cross trace line 220t22.

In the illustrated example of FIG. 14, the third differential amplifier DAP3 is shown to receive signals provided from the two second electrode groups 220G1 and 220G2 which are positioned closest to each other in the second direction DR2, but they need not be the closest groups. For example, the third differential amplifier DAP3 may receive signals provided from two second electrode groups with one or more second electrode groups disposed therebetween.

Figure 15:
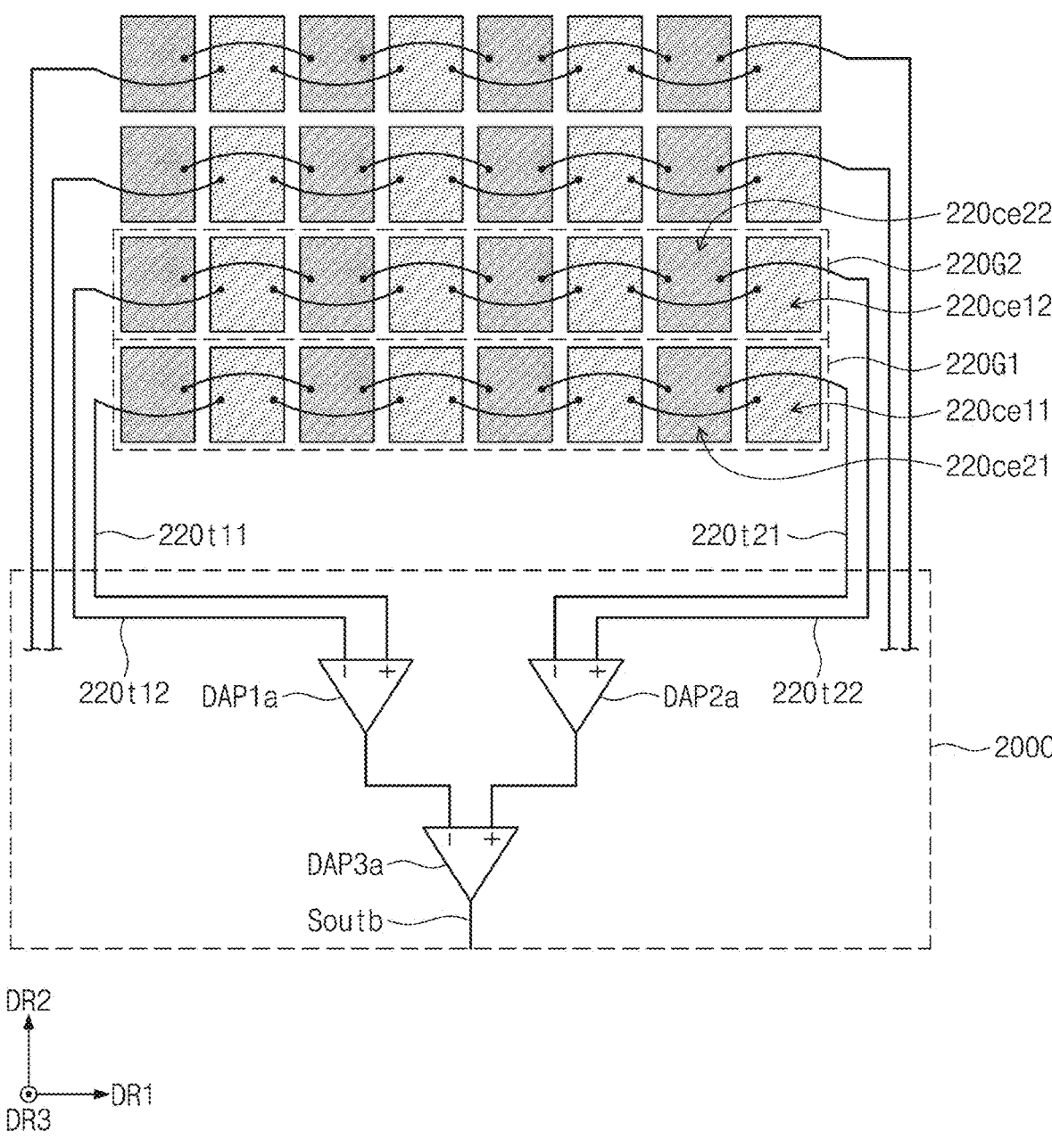
FIG. 15 is a view showing four electrode groups and a portion of a sensor driver according to an embodiment of the inventive concept.

FIG. 15 is a view showing four electrode groups and a portion of a sensor driver according to an embodiment of the inventive concept. The embodiment of FIG. 15 differs from that of FIG. 14 by connecting the sensing electrodes to the differential amplifiers in a different manner.

Referring to FIGS. 7 and 15, the sensor driver 200C may include a first differential amplifier DAP1a, a second differential amplifier DAP2a, and a third differential amplifier DAP3a.

In the pen sensing drive mode, a first differential amplifier DAP1a and a second differential amplifier DAP2a may each receive signals from the second electrode groups 220G, an inverting terminal of a third differential amplifier DAP3a may receive signals output from the first differential amplifier DAP1a, and a non-inverting terminal of the third differential amplifier DAP3a may receive signals output from the second differential amplifier DAP2a and output an output signal Soutb.

The second electrode groups 220G may include a (2-1)-th electrode group 220G1 and a (2-2)-th electrode group 220G2 spaced apart from the (2-1)-th electrode group 220G1 in the second direction DR2.

In the pen sensing drive mode, the inverting terminal of the first differential amplifier DAP1 may be electrically connected to a first cross electrode 220ce11 of the (2-1)-th electrode group 220G1 through a (1-1)-th cross trace line 220t11, and the non-inverting terminal of the first differential amplifier DAP1 may be electrically connected to a first cross electrode 220ce12 of the (2-2)-th electrode group 220G1 through a (1-2)-th cross trace line 220t12.

In the pen sensing drive mode, the inverting terminal of the second differential amplifier DAP2 may be electrically connected to a second cross electrode 220ce21 of the (2-1)-th electrode group 220G2 through a (2-1)-th cross trace line 220t21, and the non-inverting terminal of the second differential amplifier DAP2 may be electrically connected to a second cross electrode 220ce22 of the (2-2)-th electrode group 220G2 through a (2-2)-th cross trace line 220t22.

Figure 16A:
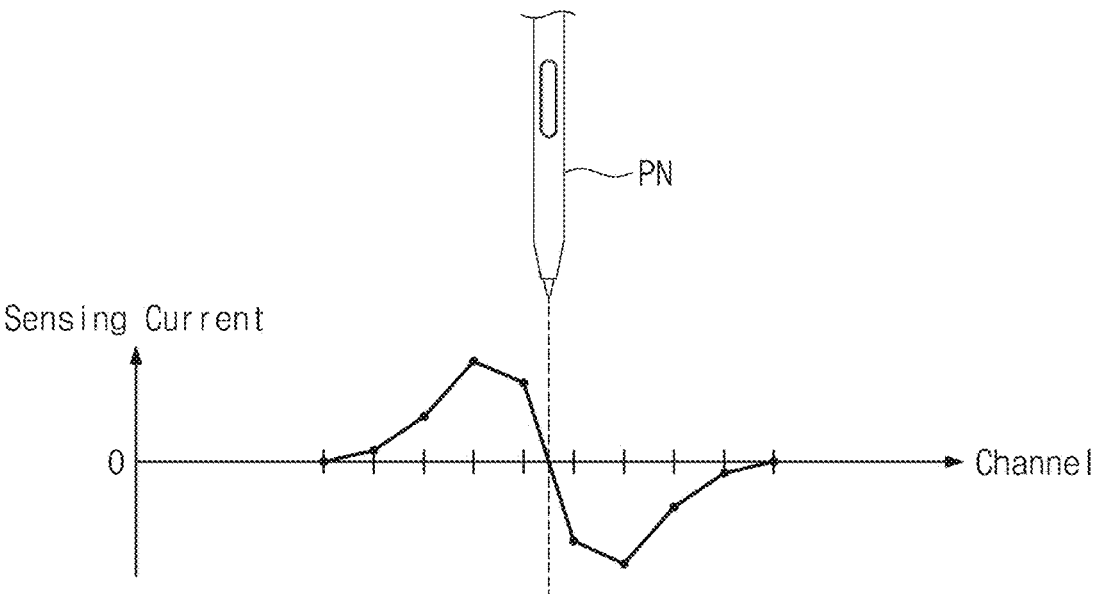
FIG. 16A is a view showing current sensed from a plurality of electrode groups.
Figure 16B:
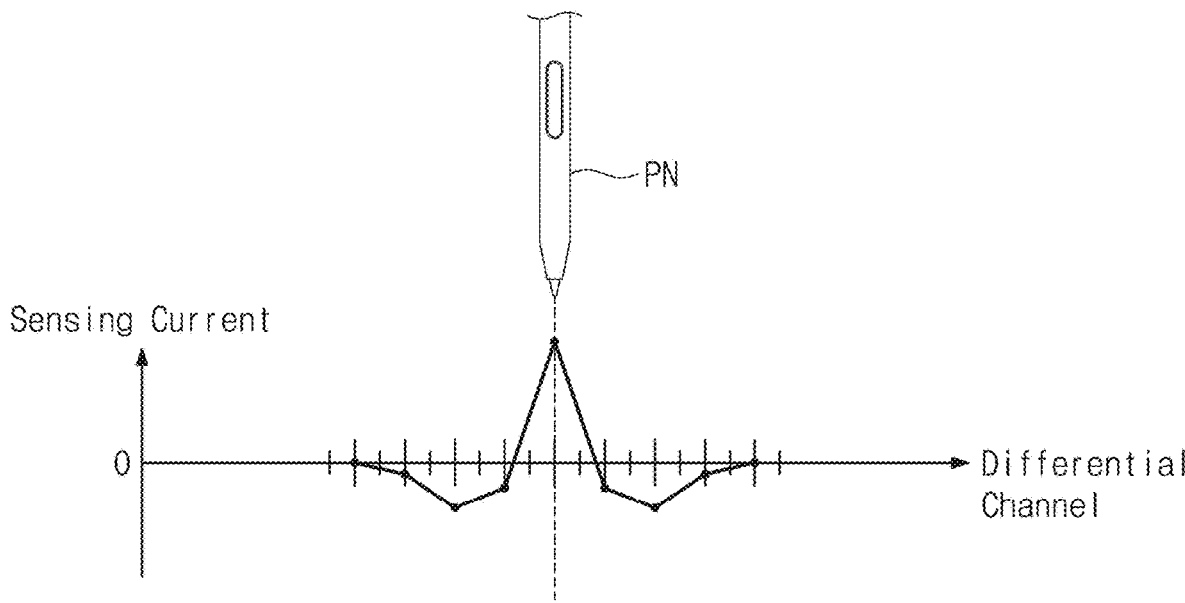
FIG. 16B is a view showing current obtained from a differential pair of a plurality of electrode groups.

FIG. 16A is a view showing current sensed from a plurality of electrode groups. FIG. 16B is a view showing current obtained from a differential pair of a plurality of electrode groups.

Referring to FIGS. 7 and 16A, the directions of currents sensed from channels spaced apart, with a portion in which the pen PN is placed therebetween may be different. The channels may correspond to the second electrode groups 220G, respectively. Accordingly, the directions of currents flowing through the channels on the left and the channels on the right with respect to the position of the pen PN may be different. Accordingly, the sensor driver 200C may sense currents flowing in different directions with respect to the position of the pen PN.

When the pen PN is placed at an upper portion directly above one electrode group 220G, a signal sensed from the one electrode group 220G may be "0". For example, as described with reference to FIG. 10, when calculating coordinates using the output signal Sout obtained from the one electrode group 220G, the intensity of the signal received from the one electrode group 220G directly corresponding to the position of the pen PN may be "0".

Accordingly, the description referring to FIGS. 11, 12, and 13 may be understood as a description of the channel through which the current induced by the pen PN flows. For example, one electrode group described in FIGS. 11, 12, and 13 corresponds to one of the channels on the left and the channels on the right based on the position of the pen PN in FIG. 16A.

When referring to FIGS. 14, 15, and 16B, the output signal Souta or Soutb is a signal obtained from two or more electrode groups 220G1 and 220G2. That is, current may be sensed by differentially sensing channels adjacent to each other or channels non-adjacent (spaced apart) from each other. In this case, coordinates of the pen PN may be calculated relatively simply based on a centroid method or a maximum point of a trend line.

Figure 17:
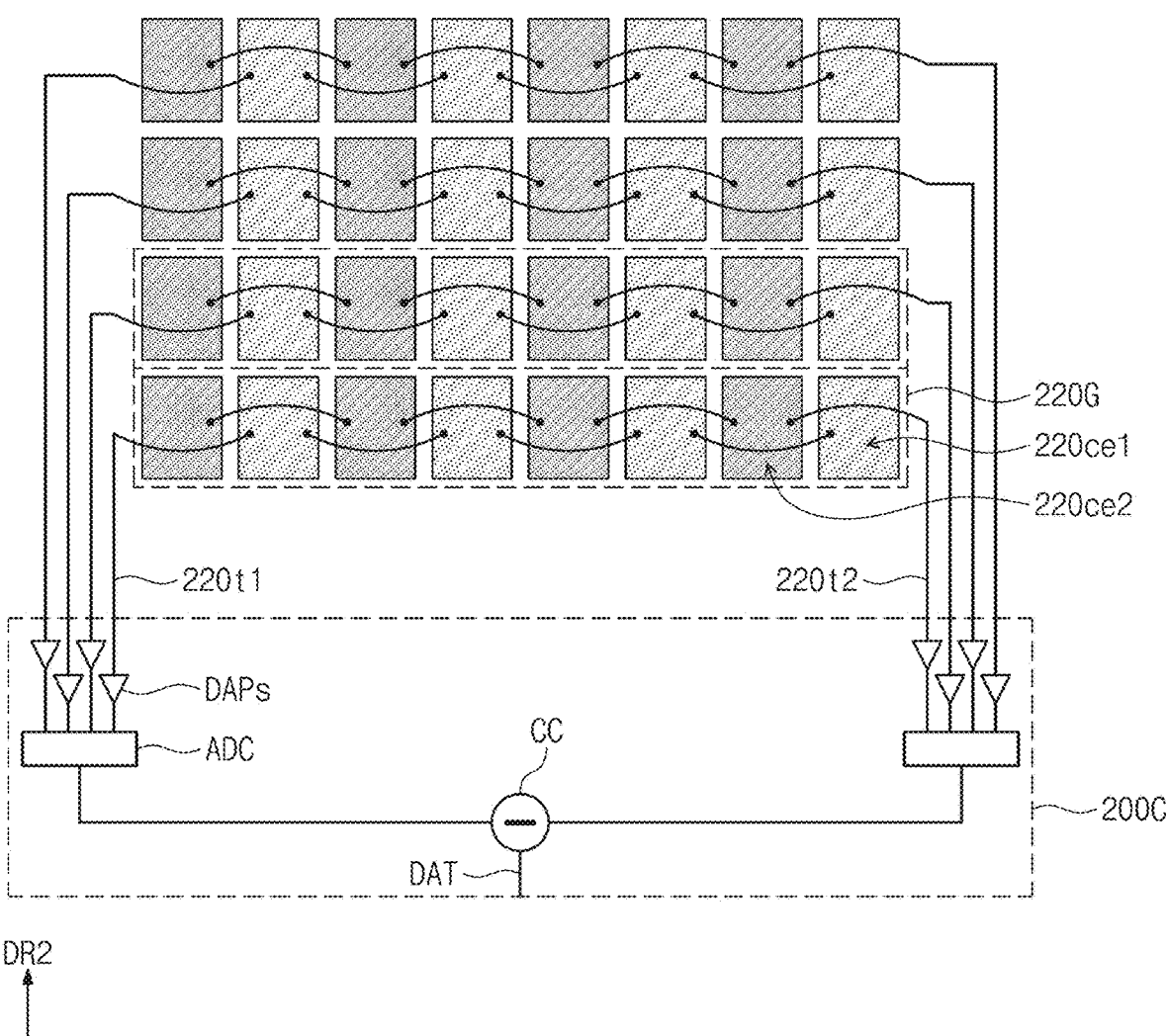
FIG. 17 is a view showing four electrode groups and a portion of a sensor driver according to an embodiment of the inventive concept.

FIG. 17 is a view showing four electrode groups and a portion of a sensor driver according to an embodiment of the inventive concept. Here, the sensor driver 200C may include a plurality of differential amplifiers DAPs, an analog-to-digital converter ADC, and a difference calculator Cc.

The differential amplifiers DAPs may be connected in one-to-one correspondence with the first cross electrodes 220ce1 and the second cross electrodes 220ce2 of the second electrode groups 220G. The analog-to-digital converter ADC may receive analog signals from the differential amplifiers DAPs and convert the signals into digital signals. The difference calculator Cc may perform a difference operation on data provided from the analog-to-digital converter ADC and output "denoised" output data DAT (an output data signal with noise removed).

Figure 18:
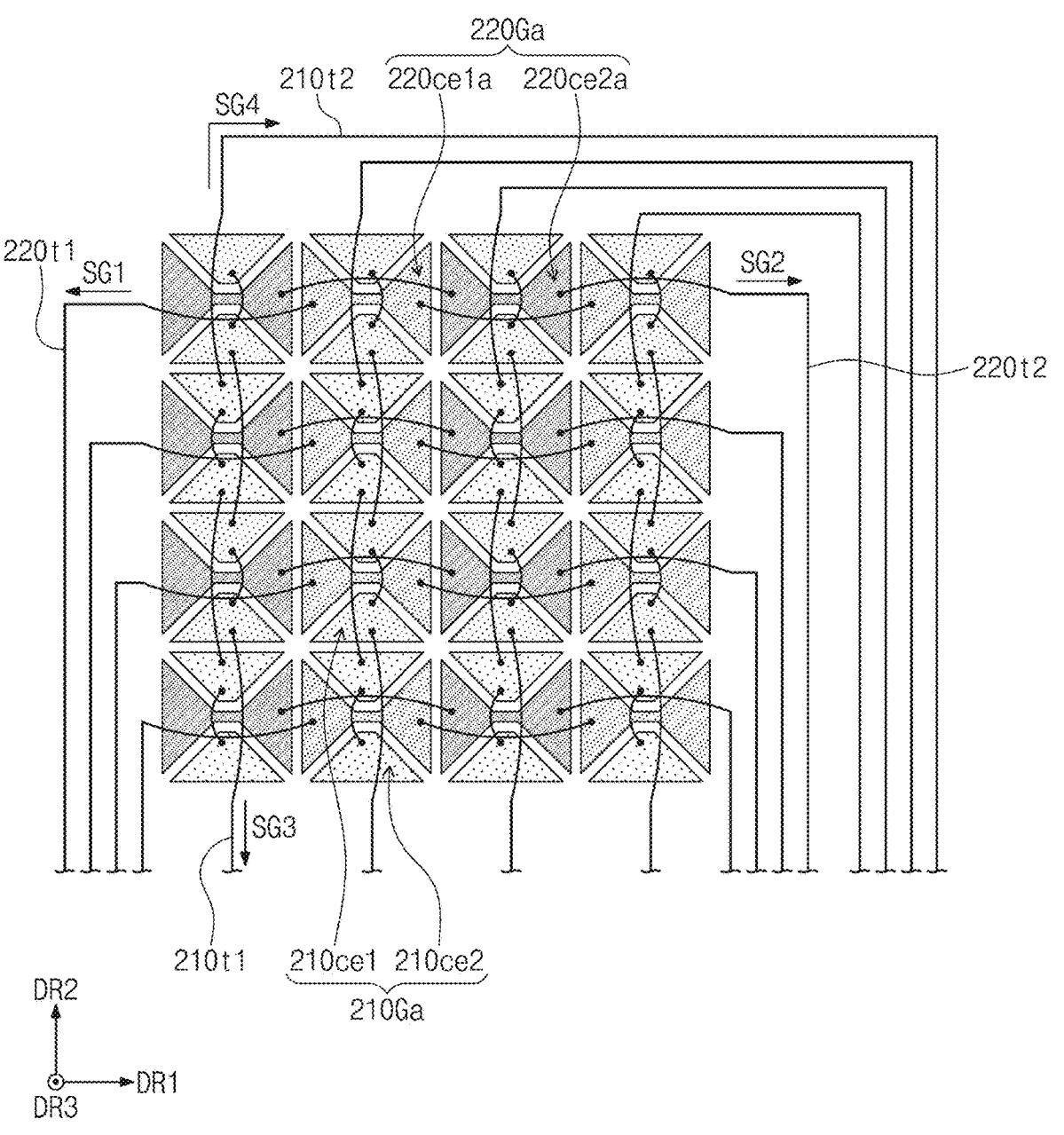
FIG. 18 is a plan view showing a portion of a sensor layer according to an embodiment of the inventive concept.

FIG. 18 is a plan view showing a portion of a sensor layer according to an embodiment of the inventive concept.

Referring to FIGS. 7, 9, and 18, the sensor layer 200 may include first electrode groups 210Ga and second electrode groups 220Ga. Each of the first electrode groups 210Ga and the second electrode groups 220Ga may include two cross electrodes. Accordingly, two trace lines may be electrically connected to each of the first electrode groups 210Ga and the second electrode groups 220Ga. A connection relationship between the cross electrodes and the trace lines in each of the first and second directions DR1 and DR2 is substantially the same as what is described in FIG. 10 for the second direction DR2.

For instance, each of the second electrode groups 220Ga may include a first cross electrode 220ce1a and a second cross electrode 220ce2a. The first cross electrode 220ce1a may be electrically connected to the first cross trace line 220t1, and the second cross electrode 220ce2a may be electrically connected to the second cross trace line 220t2. Each of the first electrode groups 210Ga may include a third cross electrode 210ce1 and a fourth cross electrode 210ce2. A third cross electrode 210ce1 may be electrically connected to the third cross trace line 210t1, and a fourth cross electrode 210ce2 may be electrically connected to the fourth cross trace line 210t2. In the example, the individual patterns in the rows (DR1 direction) have a bowtie shape, and those in the column direction (DR2 direction) each include a pair of truncated triangles connected to one another. Alternatively, the two pattern shapes are swapped (the bowtie shapes are used in the column direction and the truncated triangle shapes are used in the row direction).

The second mode MD2-d or the second mode MD2 may be or include a pen sensing drive mode. In the pen sensing drive mode, the sensor layer 200 and the sensor driver 200C may sense induced current generated by magnetic field emitted from the pen PN. In the pen sensing drive mode, the sensor driver 200C may be configured to receive a first signal SG1 from the first cross electrode 220ce1a, a second signal SG2 from the second cross electrode 220ce2a, a third signal SG3 from the third cross electrode 210ce1, and a fourth signal SG4 from the fourth cross electrode 210ce2. In the pen sensing drive mode, the sensor driver 200C may process the first to fourth signals SG1, SG2, SG3, and SG4 as described in FIG. 10, FIG. 14, FIG. 15, or FIG. 17 for the signals SG1 and SG2. Thus, in the direction DR2, the mechanism for detecting a direction DR2 coordinate of a pen input (affecting any one or more first electrode groups 220G) may be the same as any of those described above for detecting a direction DR2 coordinate of a pen input (affecting any one or more of the second electrode groups 210G).

Figure 19:
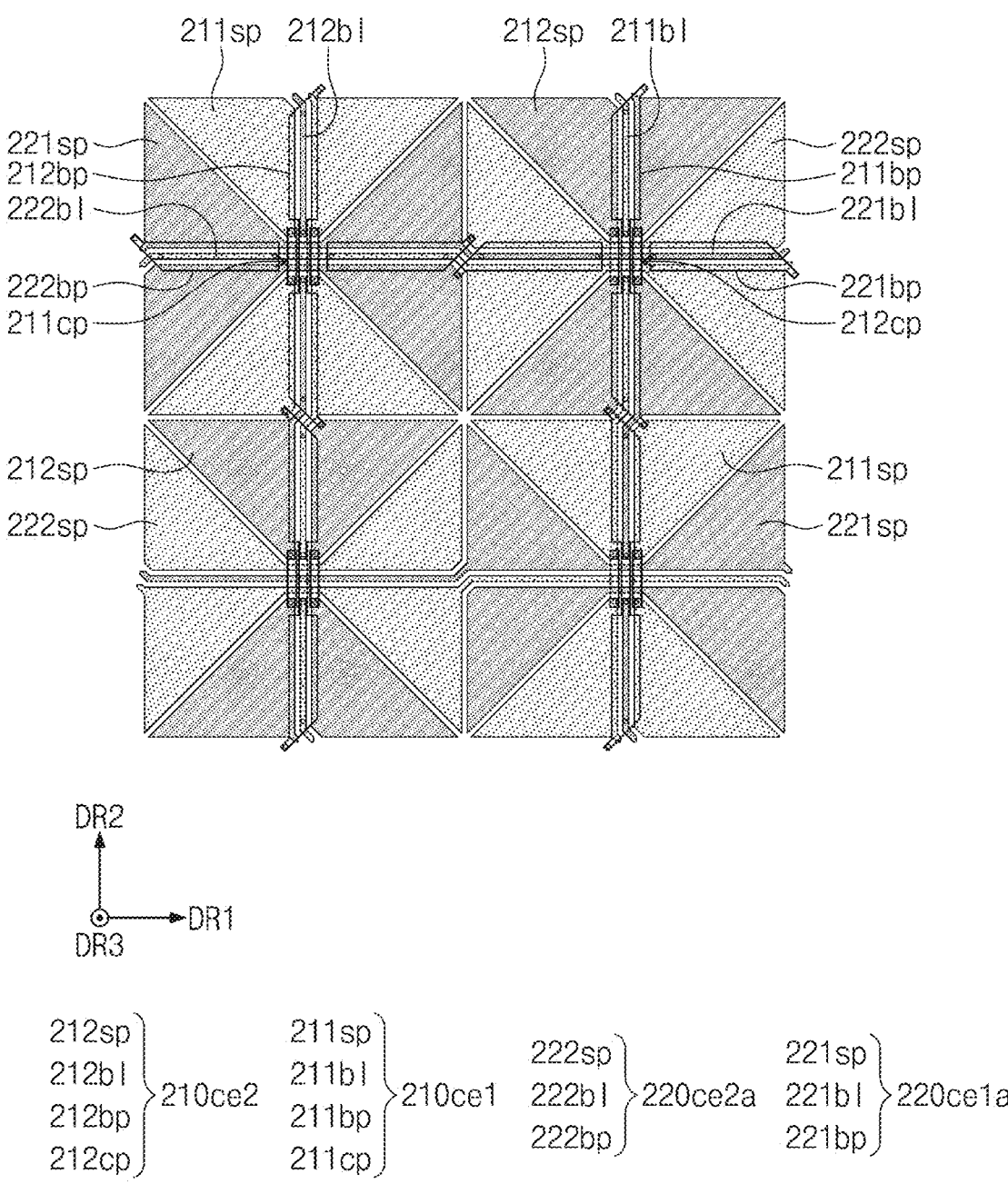
FIG. 19 is a plan view showing four sensing units according to an embodiment of the inventive concept.

FIG. 19 is a plan view showing four sensing units according to an embodiment of the inventive concept. FIG.

20A is a plan view showing a second conductive layer of a sensing unit according to an embodiment of the inventive concept. FIG. 20B is a plan view showing a first conductive layer of a sensing unit according to an embodiment of the inventive concept.

Referring to FIGS. 18, 19, 20A, and 20B, the first cross electrode 220ce1a may include a plurality of first sensing patterns 221sp, a first bridge line 221b1, and a first bridge pattern 221bp. The second cross electrode 220ce2a may include a plurality of second sensing patterns 222sp, a second bridge line 222b1, and a second bridge pattern 222bp. The third cross electrode 210ce1 may include a plurality of third sensing patterns 211sp, a third bridge line 211b1, a third bridge pattern 211bp, and a first connection pattern 211cp. The fourth cross electrode 210ce2 may include a plurality of fourth sensing patterns 212sp, a fourth bridge line 212b1, a fourth bridge pattern 212bp, and a second connection pattern 212cp.

The first sensing patterns 221sp, the second sensing patterns 222sp, the third sensing patterns 211sp, the fourth sensing patterns 212sp, the first bridge line 221b1, the second bridge line 222b1, the third bridge line 211b1, and the fourth bridge line 212b1 may be disposed on the same layer, and for example, may be included in the second conductive layer 204 (see FIG. 4). The first bridge pattern 221bp, the second bridge pattern 222bp, the third bridge pattern 211bp, the fourth bridge pattern 212bp, the first connection pattern 211cp, and the second connection pattern 212cp may be disposed on the same layer, and for example, may be included in the first conductive layer 202 (see FIG. 4).

The first sensing patterns 221sp may include a plurality of (1-1)-th sensing patterns 221spa and a plurality of (1-2)-th sensing patterns 221spb spaced apart from the plurality of (1-1)-th sensing patterns 221spa in the second direction DR2. The third sensing patterns 211sp may include a plurality of (3-1)-th sensing patterns 211spa and a plurality of (3-2)-th sensing patterns 211spb spaced apart from the plurality of (3-1)-th sensing patterns 211spa in the first direction DR1.

The four sensing units shown in FIG. 19 may be repeatedly arranged along the first direction DR1 and the second direction DR2. The (1-1)-th sensing patterns 221spa included in different sensing units spaced apart in the first direction DR1 may be electrically connected through the first bridge line 221b1. In addition, the (1-2)-th sensing patterns 221spb included in other sensing units spaced apart in the first direction DR1 may be electrically connected through the first bridge pattern 221bp. The first bridge line 221b1 and the first bridge pattern 221bp may be electrically connected.

The first bridge line 221b1 may be disposed between two second sensing patterns 222sp spaced apart in the second direction DR2 among the first sensing patterns 222sp. The first bridge pattern 221bp may overlap the first bridge line 221b1 and may also overlap the two second sensing patterns 222sp.

In an embodiment of the inventive concept, an overlapping area of the first bridge pattern 221bp and the two second sensing patterns 222sp is regulated to control capacitance of a coupling capacitor between the first cross electrode 220ce1a and the second cross electrode 220ce2a.

The (3-1)-th sensing patterns 211spa included in other sensing units spaced apart in the second direction DR2 may be electrically connected through the third bridge pattern 211bp. In addition, the (3-2)-th sensing patterns 211spb included in other sensing units spaced apart in the second direction DR2 may be electrically connected through the third bridge line 211b1. The third bridge line 211b1 and the third bridge pattern 211bp may be electrically connected.

The first connection pattern 211cp may overlap the first bridge line 221b1 or the second bridge line 222b1, and may be connected to two third sensing patterns 211sp spaced apart with the first bridge line 221b1 or the second bridge line 222b1 therebetween among the third sensing patterns 211sp. For example, two first connection patterns 211cp may be provided, and the two first connection patterns 211cp may be spaced apart in the first direction DR1 with a narrow central portion of the fourth bridge pattern 212bp therebetween as illustrated. The third bridge line 211b1 may be disposed between two fourth sensing patterns 212sp spaced apart in the first direction DR1 among the fourth sensing patterns 212sp.

Figure 20A:
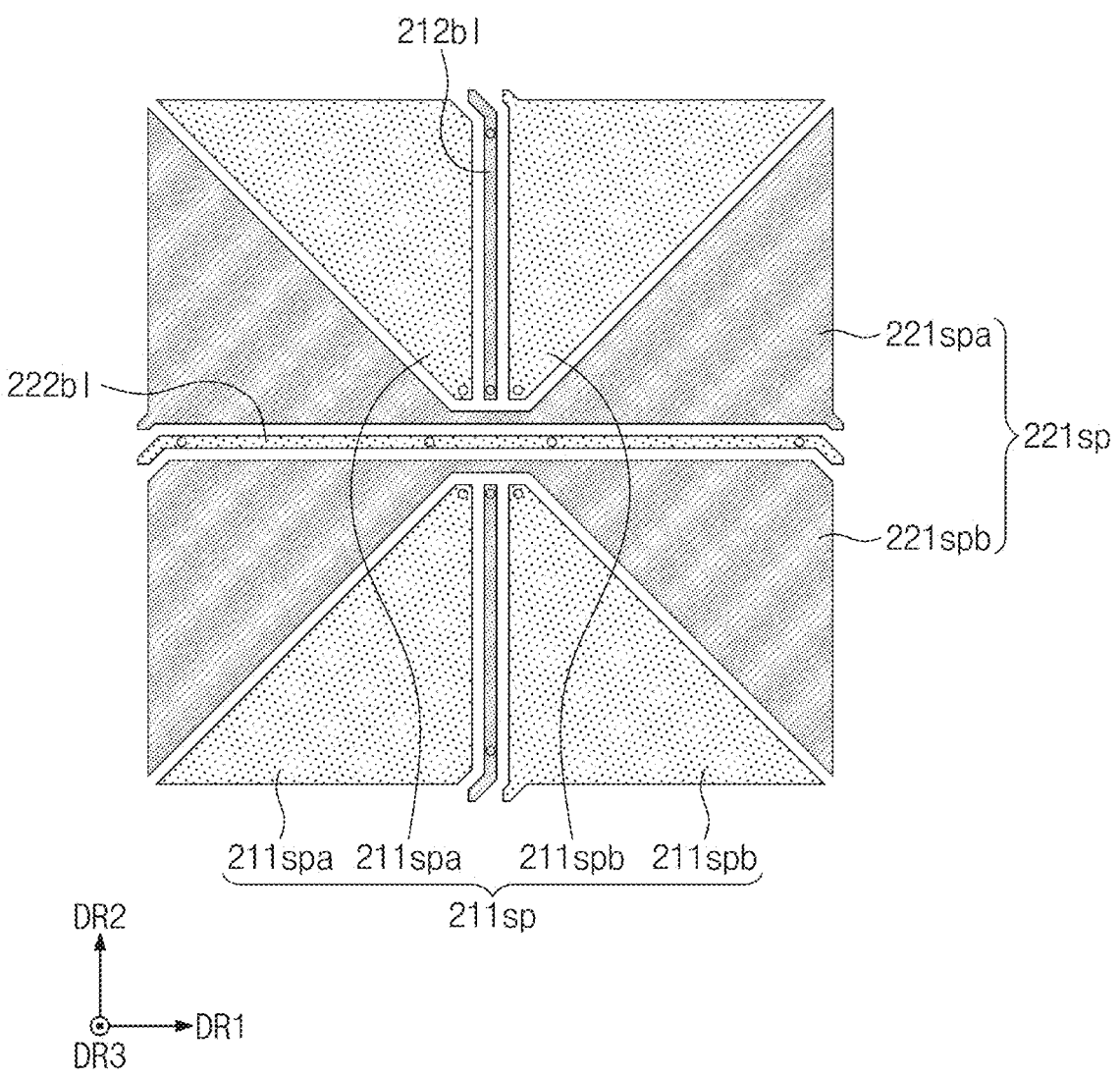
FIG. 20A is a plan view showing a second conductive layer of a sensing unit according to an embodiment of the inventive concept.
Figure 20B:
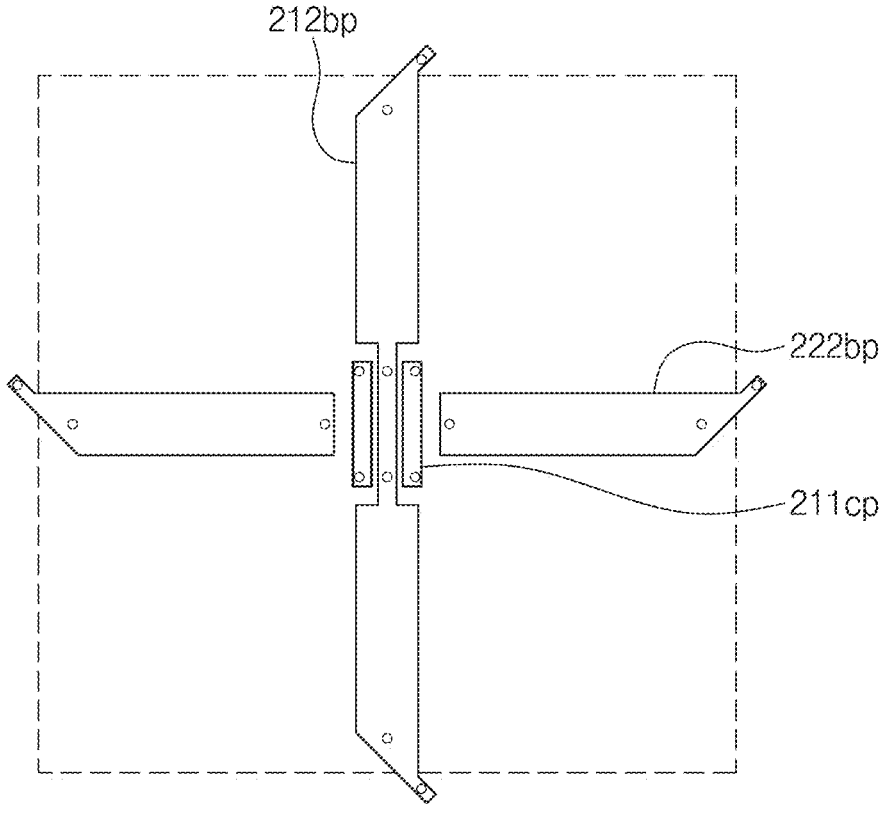
FIG. 20B is a plan view showing a first conductive layer of a sensing unit according to an embodiment of the inventive concept.
Figure 20B:
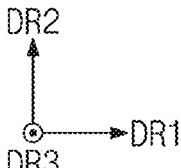

Each of the patterns shown in FIGS. 20A and 21B may have a mesh structure. Each of the mesh structures may include a plurality of mesh lines. Each of the plurality of mesh lines may have a straight line shape extending in a predetermined direction and may be connected. However, this is presented only as an example. In other examples, at least a portion of each of the plurality of mesh lines may have a curved shape.

Figure 21:
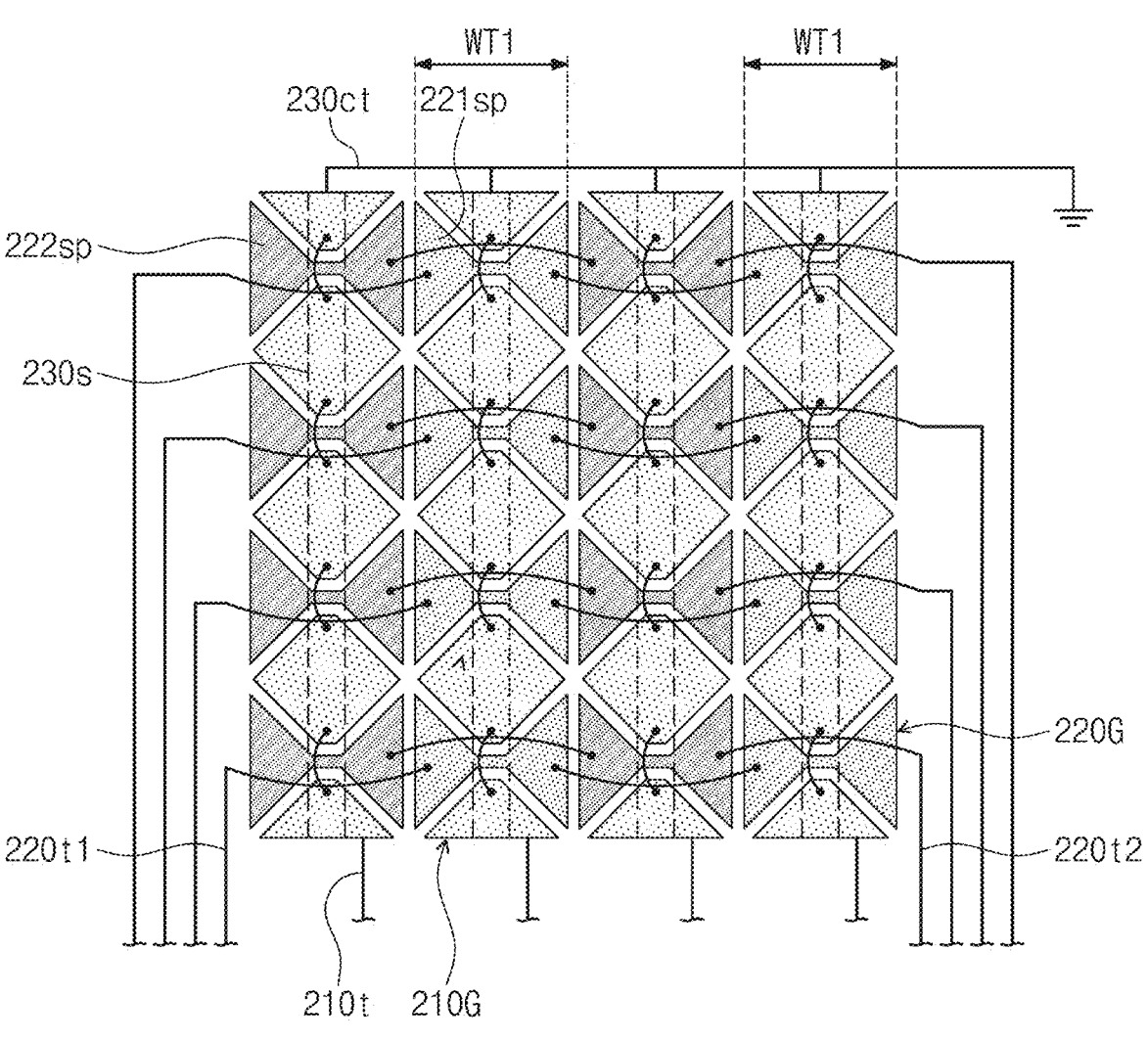
FIG. 21 is a plan view showing a portion of a sensor layer according to an embodiment of the inventive concept.

FIG. 21 is a plan view showing a portion of a sensor layer, including an auxiliary electrode, according to an embodiment of the inventive concept.

Referring to FIGS. 7 and 21, the sensor layer 200 may further include a plurality of auxiliary electrodes 230s overlapping the first electrode groups 210G, respectively. In addition, a connection trace line 230ct connecting the auxiliary electrodes 230s of the sensor layer 200 to each other may be further included. As explained in detail below, through use of the auxiliary electrodes 230s, sensing current may be increased for pen inputs.

The connection trace line 230ct and the first trace lines 210t may be spaced apart with the first electrode groups 210G and the auxiliary electrodes 230s therebetween. Thus, a routing direction of the first electrode groups 210G and a routing direction of the auxiliary electrodes 230s may be different. The routing direction may refer to the direction in which the trace line protrudes and extends from the location where the electrode group and the trace line are connected. For example, the first trace lines 210t from the first electrode groups 210G may protrude downward, and the connection trace line 230ct from the auxiliary electrodes 230s may protrude upward. Therefore, it is expressed that the routing directions of the electrodes are different.

Each of the first sensing patterns 221sp and the second sensing patterns 222sp may cross one first electrode group 210G and one auxiliary electrode 230s. Hence, one first sensing pattern 221sp may cross one first electrode group 210G and one auxiliary electrode 230s, and one second sensing pattern 222sp may cross another first electrode group 210G and another auxiliary electrode 230s.

The sizes of the first sensing patterns 221sp may be substantially the same. For example, widths WT1 of the first sensing patterns 221sp in the first direction DR1 may be the same. In addition, the sizes of the second sensing patterns 222sp may be substantially the same as the sizes of the first sensing patterns 221sp. In an embodiment of the inventive concept, each of the first electrode groups 210G, the second electrode groups 220G, and the auxiliary electrodes 230s is separately disposed on two conductive layers 202 and 204 (see FIG. 6). This will be described in FIGS. 25, 26A, and 26B.

In another embodiment of the inventive concept, each of the first electrode groups 210G and the second electrode groups 220G are separately disposed on the two conductive layers 202 and 204, and the auxiliary electrodes 230s are included in a third conductive layer provided below the two conductive layers 202 and 204. The third conductive layer may be provided below the base layer 201. For example, the third conductive layer may be disposed between the base layer 201 (see FIG. 6) and the display layer 100 (see FIG. 6), may be disposed below the display layer 100, or may also be included in the display layer 100.

Figure 22:
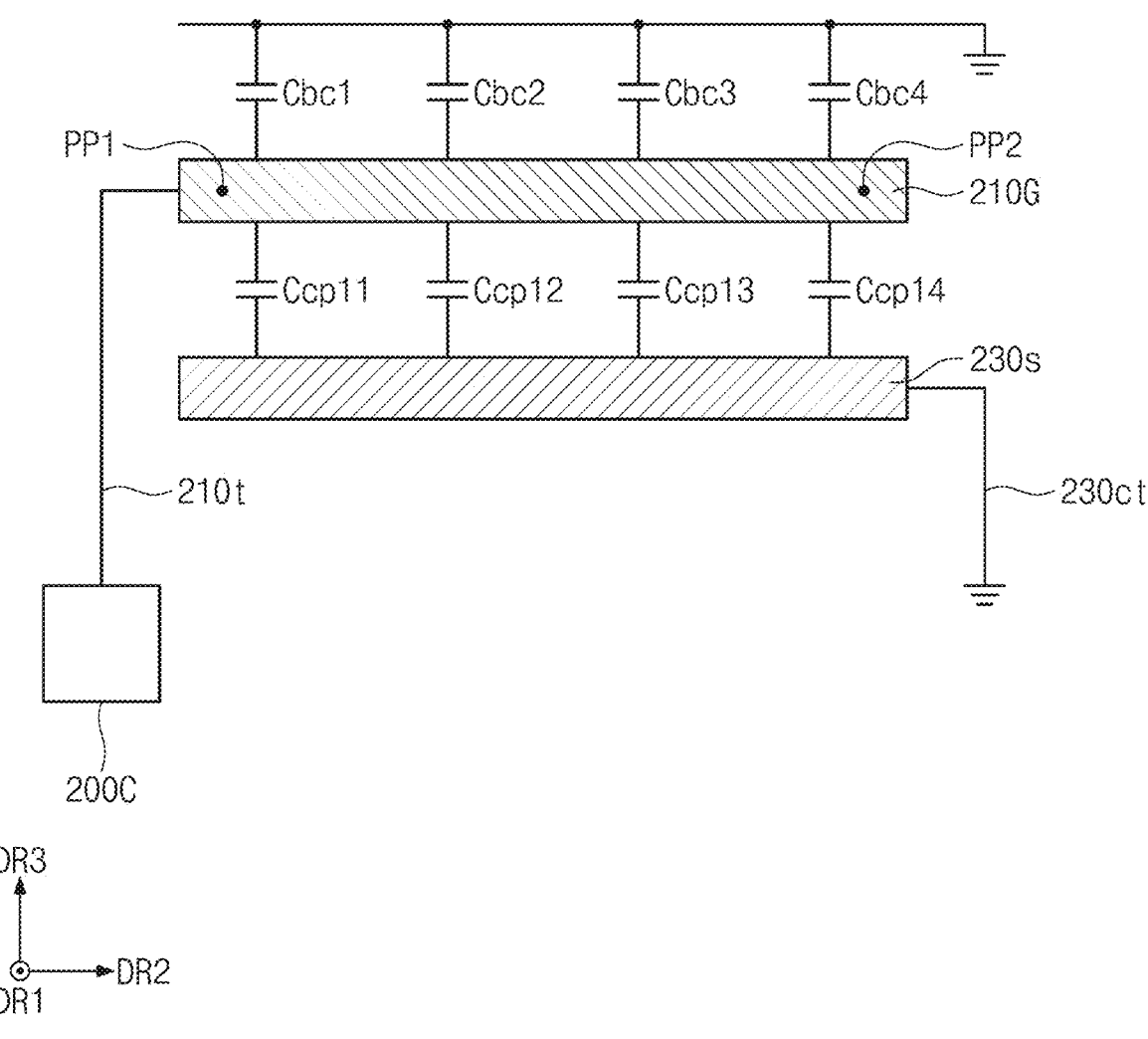
FIG. 22 is a view schematically showing one channel according to an embodiment of the inventive concept.
Figure 23:
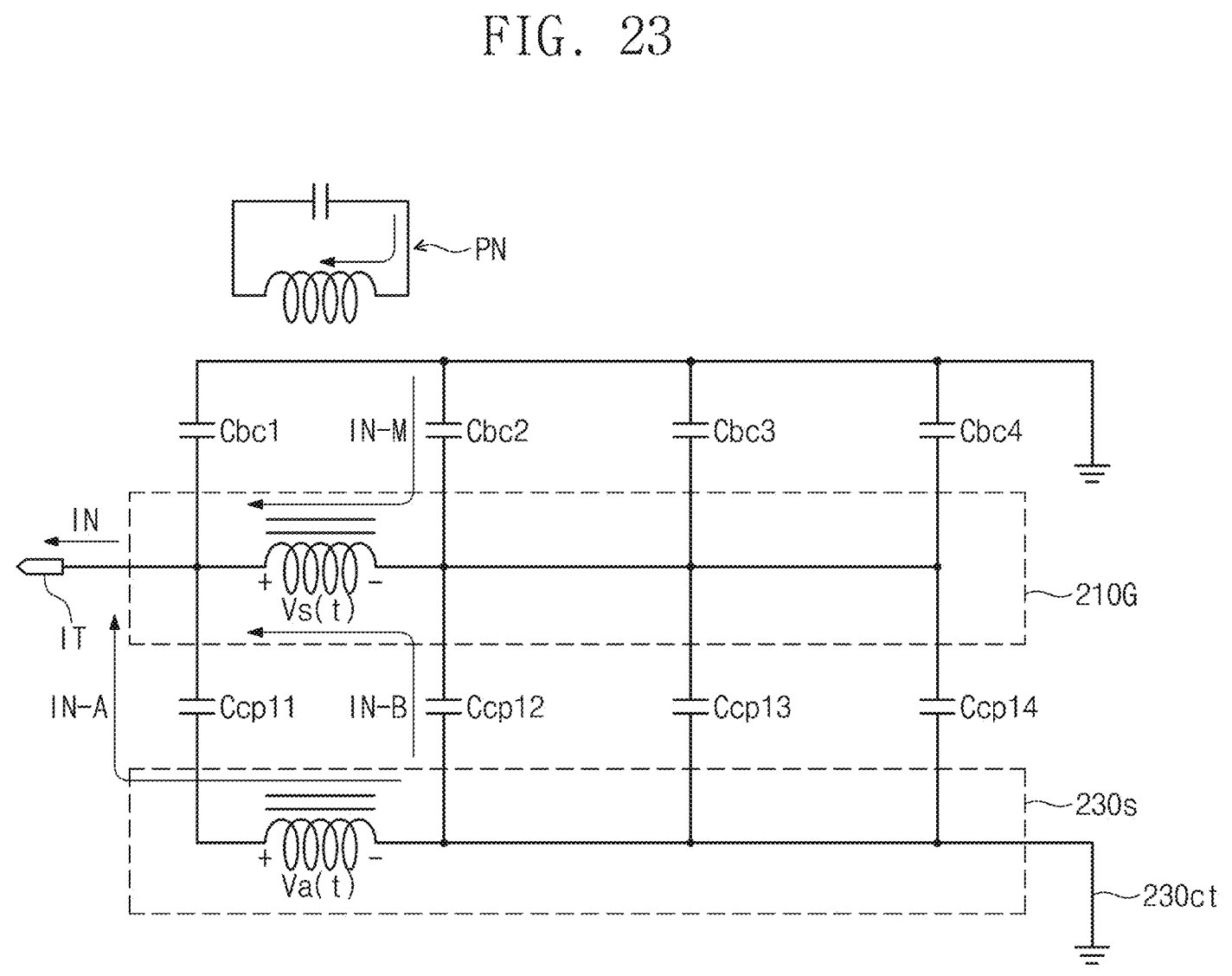

FIG. 22 is a view schematically showing one channel including an auxiliary electrode according to an embodiment of the inventive concept. FIG. 23 is an equivalent circuit diagram showing a relationship between one channel and a pen according to an embodiment of the inventive concept.

Referring to FIGS. 21, 22, and 23, one first electrode group 210G and one auxiliary electrode 230s are shown. The first electrode group 210G and the auxiliary electrode 230s may overlap when viewed in the third direction DR3.

A first end of the auxiliary electrode 230s may be floating, and a second end of the auxiliary electrode 230s may be grounded. For example, the second end of the auxiliary electrode 230s may be electrically connected to the connection trace line 230ct, and the connection trace line 230ct may be grounded. In another example (not shown), the connecting trace line 230ct is connected to a first end of a bias capacitor having a second end connected to ground.

Capacitors Cbc1, Cbc2, Cbc3, and Cbc4 may be defined in the first electrode group 210G. The capacitors Cbc1-Cbc4 may be referred to as parasitic capacitors or base capacitors. The capacitors Cbc1-Cbc4 may also be used to increase the intensity of a signal.

When the pen PN is close to the first electrode group 210G, due to magnetic field generated from the pen PN, a first induced electromotive force Vs(t) may be generated in the first electrode group 210G, and a second induced electromotive force Va(t) may be generated in the auxiliary electrode 230s. A first induced current IN-M and a third induced current IN-B may be generated by the first induced electromotive force Vs(t), and a second induced current IN-A may be generated by the second induced electromotive force Va(t). Accordingly, a total induced current IN input to an input terminal IT may correspond to the sum of the first to third induced currents IN-M, IN-A, and IN-B.

For example, capacitance of each of the capacitors Cbc1, Cbc2, Cbc3, and Cbc4 is assumed to be Cb, and capacitance of each of first coupling capacitors Ccp11, Ccp12, Ccp13, and Ccp14 is assumed to be Cc.

The first induced current IN-M over time may be indicated by the following expression:

$$3Cb \ dVs(t)/dt$$

The second induced current IN-A over time may be indicated by the following expression:

$$Cc \ dVa(t)/dt$$

The third induced current IN-B over time may be indicated by the following expression:

$$3Cc \ dVs(t)/dt$$

Figure 24A:
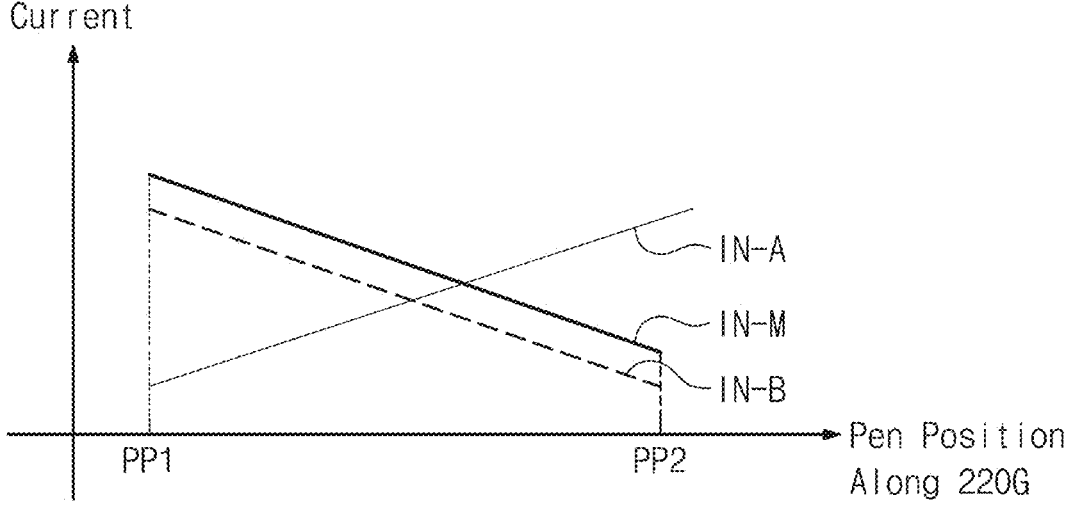
FIG. 24A is a graph showing the intensity of current according to pen position for one channel.
Figure 24B:
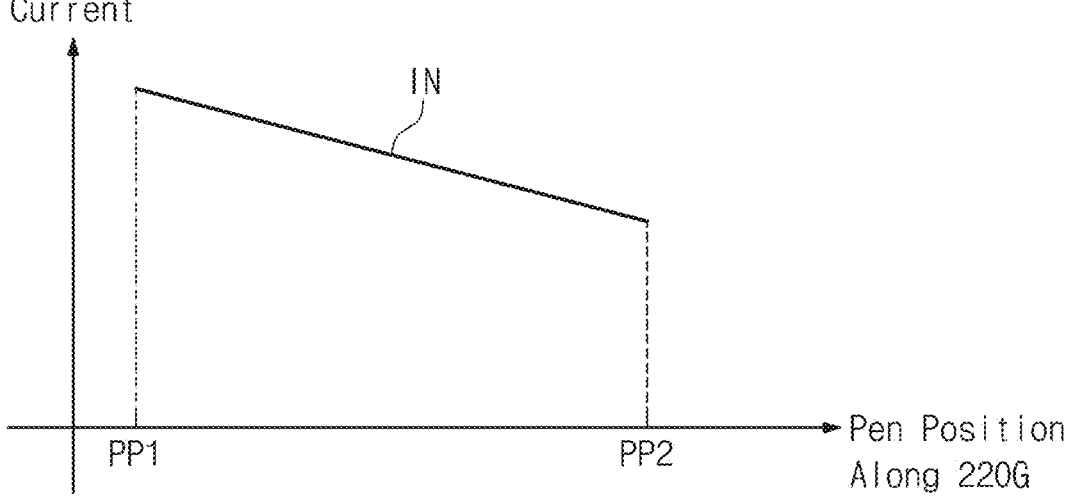
FIG. 24B is a graph showing the intensity of signals according to pen position for one channel.

FIG. 24A is a graph showing the intensity of current according to pen position for one channel. FIG. 24B is a graph showing the intensity of total induced current (for the currents in FIG. 23) according to pen position for one channel.

Referring to FIGS. 22, 23, and 24A, voltages at both ends of capacitors placed between the input terminal IT and the pen PN among the capacitors Cbc1, Cbc2, Cbc3, and Cbc4 are all grounded. Therefore, induced current may not be transmitted through capacitors where the voltage difference between both ends is 0. Accordingly, when the position of the pen PN moves from a first point PP1 to a second point PP2, the first induced current IN-M may gradually decline. In addition, the second induced current IN-A may gradually rise, and the third induced current IN-B may gradually decline.

Referring to FIGS. 22, 23, and 24B, when the position of the pen PN moves from the first point PP1 to the second point PP2, the total induced current IN may gradually decline. However, as described above, the total induced current IN may correspond to the sum of the first to third induced currents IN-M, IN-A, and IN-B, and the intensity of the total induced current IN at the second point PP2 may be secured to be greater than a predetermined value.

Figure 25:
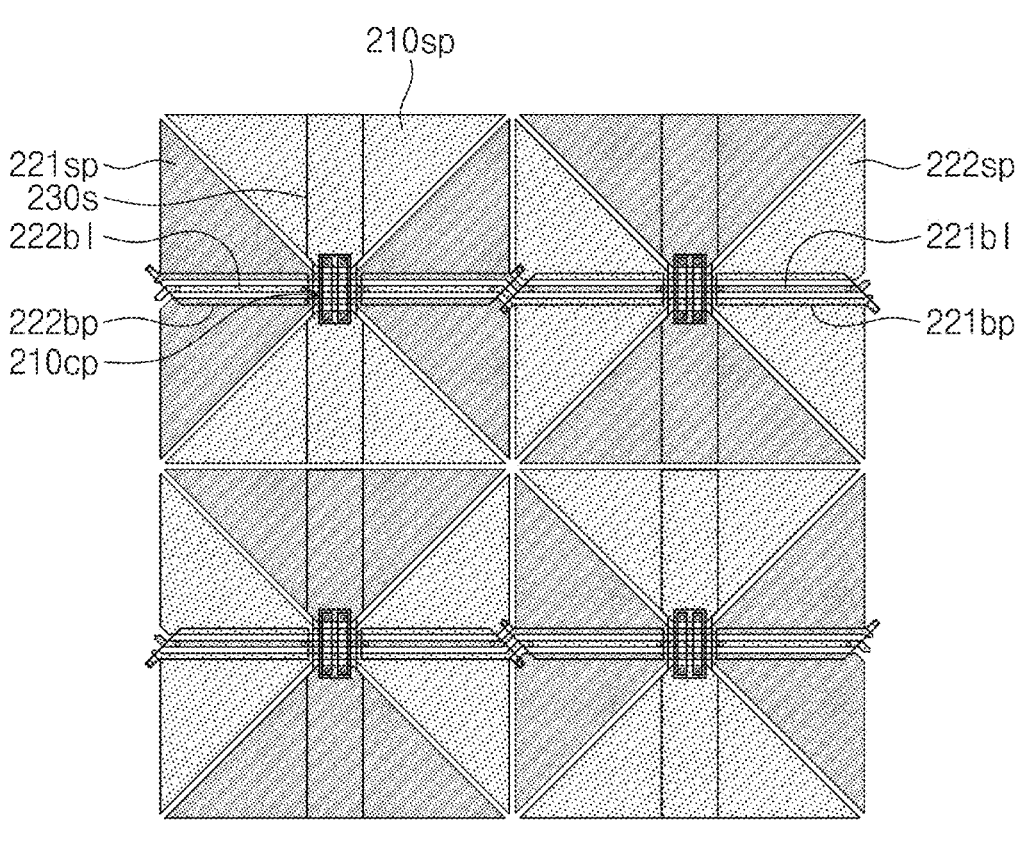
FIG. 25 is a plan view showing four sensing units according to an embodiment of the inventive concept.
Figure 26A:
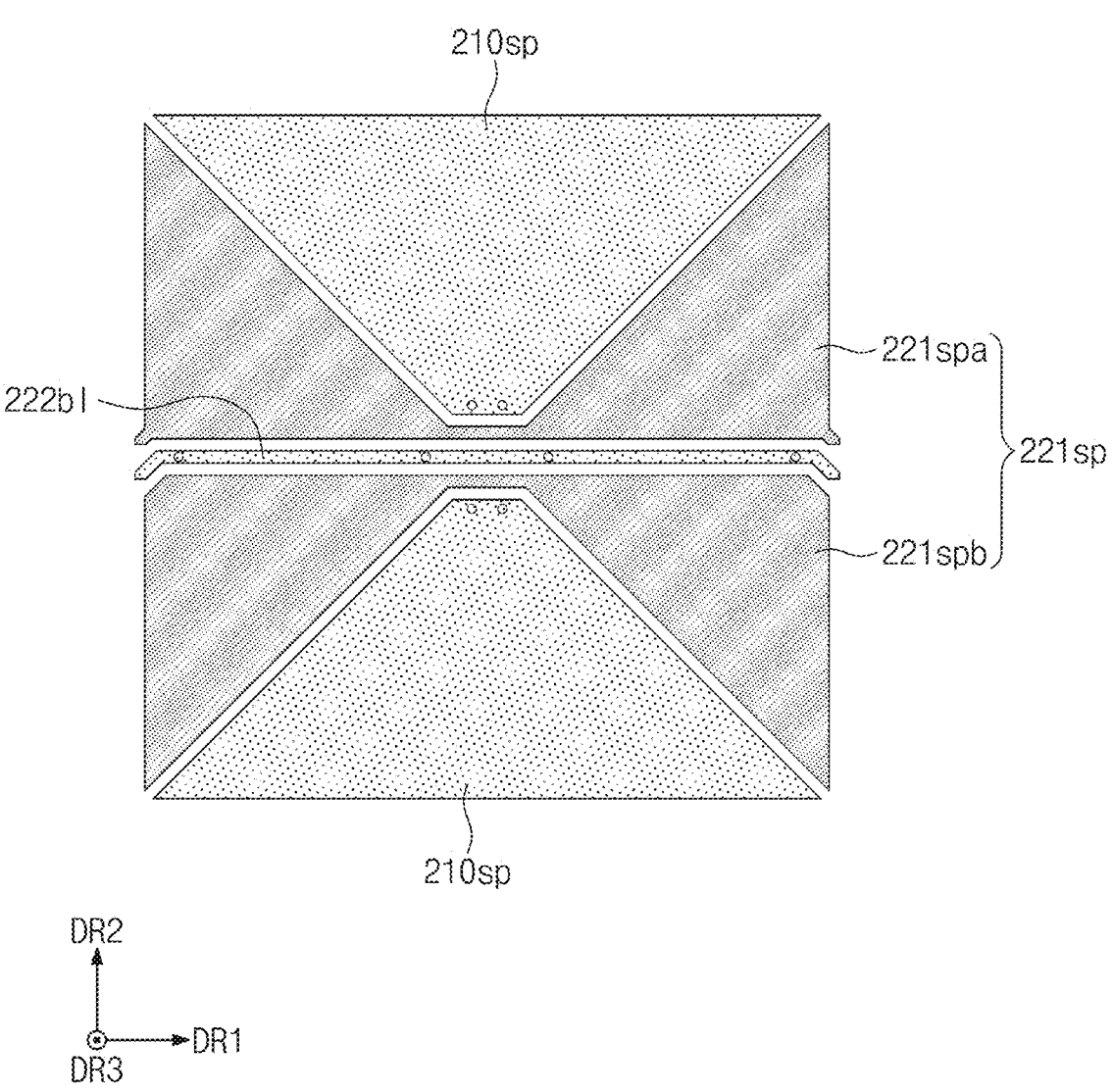
FIG. 26A is a plan view showing a second conductive layer according to an embodiment of the inventive concept.
Figure 26B:
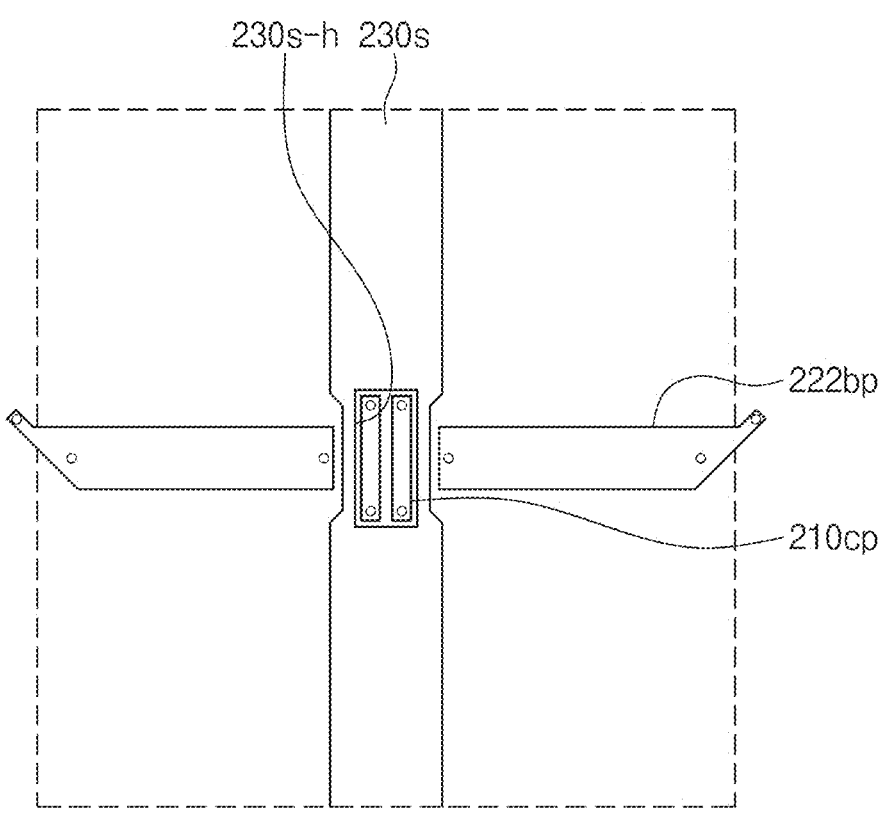
FIG. 26B is a plan view showing a first conductive layer of a sensing unit according to an embodiment of the inventive concept.
Figure 26B:
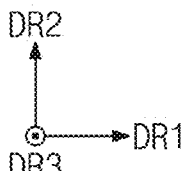

FIG. 25 is a plan view showing four sensing units according to an embodiment of the inventive concept. FIG. 26A is a plan view showing a second conductive layer according to an embodiment of the inventive concept. FIG. 26B is a plan view showing a first conductive layer of a sensing unit according to an embodiment of the inventive concept.

Referring to FIGS. 21, 25, 26A, and 26B, the first cross electrode 220ce1a may include a plurality of first sensing patterns 221sp, a first bridge line 221b1, and a first bridge pattern 221bp. The second cross electrode 220ce2a may include a plurality of second sensing patterns 222sp, a second bridge line 222b1, and a second bridge pattern 222bp. Each of the first electrode groups 210G may include a plurality of third sensing patterns 210sp and a connection pattern 210cp.

The first sensing patterns 221sp, the second sensing patterns 222sp, the third sensing patterns 210sp, the first bridge line 221b1, and the second bridge line 222b1 may be disposed on the same layer, and for example, may be included in the second conductive layer 204 (see FIG. 6). The first bridge pattern 221bp, the second bridge pattern 222bp, the connection pattern 210cp, and the auxiliary electrodes 230s may be disposed on the same layer, and for example, may be included in the first conductive layer 202 (see FIG. 6).

The third sensing patterns 210sp may overlap one corresponding auxiliary electrodes 230s among the auxiliary electrodes 230s. A hole 230s-h may be defined in each of the auxiliary electrodes 230s. The connection pattern 210cp may be surrounded by hole 230s-h and may be insulated from the auxiliary electrode 230s.

Each of the patterns shown in FIGS. 26A and 26B may have a mesh structure. Each of the mesh structures may include a plurality of mesh lines. Each of the plurality of mesh lines may be linear, extend in a predetermined direction, and may be connected to another mesh line. In other examples, at least a portion of each of the plurality of mesh lines has a curved shape.

Figure 27:
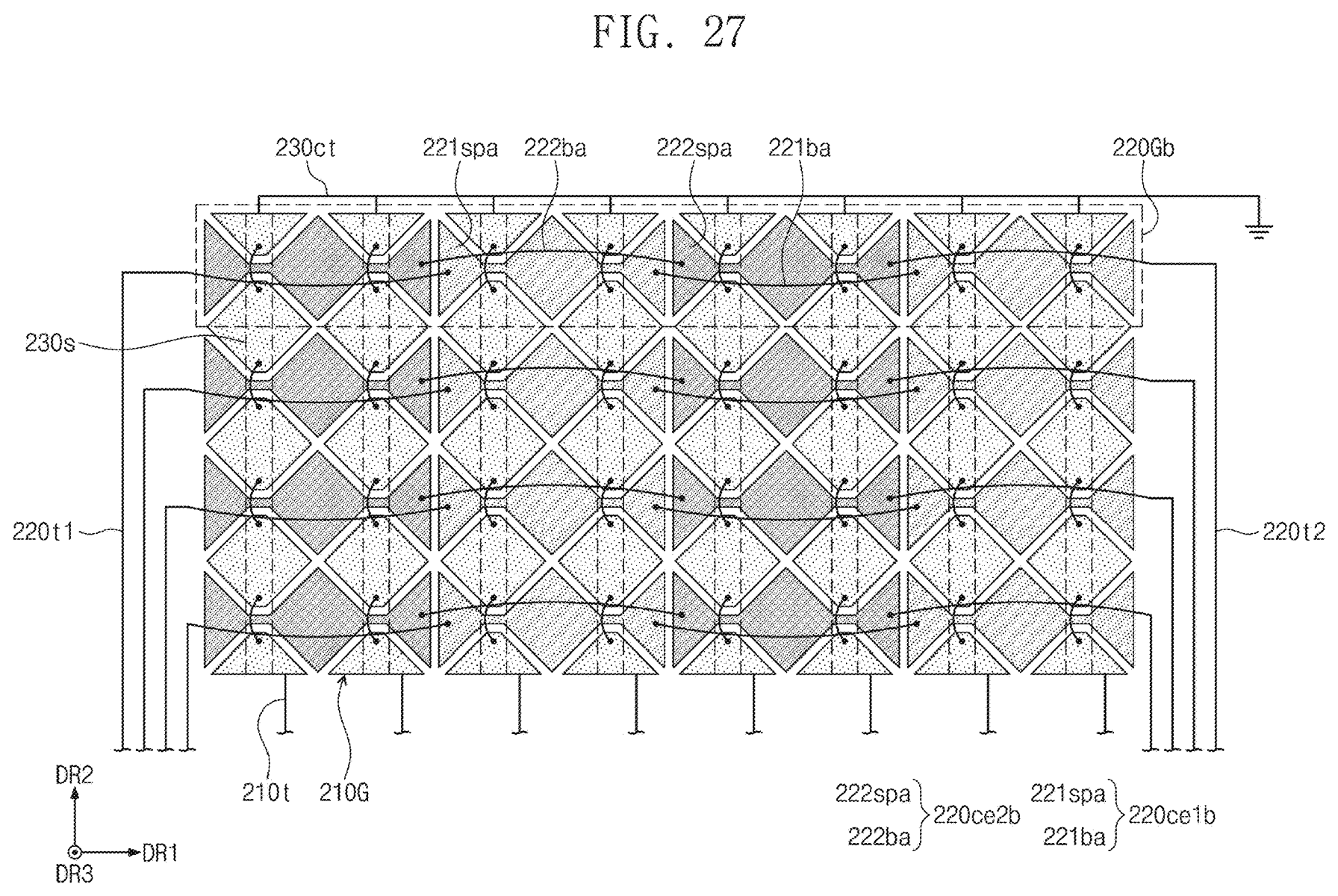

FIG. 27 is a plan view showing a portion of the sensor layer 200 according to an embodiment of the inventive concept.

Referring to FIGS. 7 and 27, the sensor layer 200 may include first electrode groups 210G, second electrode groups 220Gb, and auxiliary electrodes 230s.

Each of the second electrode groups 220Gb may include a first cross electrode 220ce1b and a second cross electrode 220ce2b. The first cross electrode 220ce1b may include first sensing patterns 221spa and first bridges 221ba. The second cross electrode 220ce2b may include second sensing patterns 222spa and second bridges 222ba.

At least one of the first sensing patterns 221spa or the second sensing patterns 222spa may cross at least one of the first electrode groups 210G. In FIG. 27, as an example, one first sensing pattern 221spa is shown to cross two first electrode groups 210G, and one second sensing pattern 222spa is shown to cross two first electrode groups 210G. In other examples, the cross is made across more or fewer electrode groups 210G.

Figure 28:
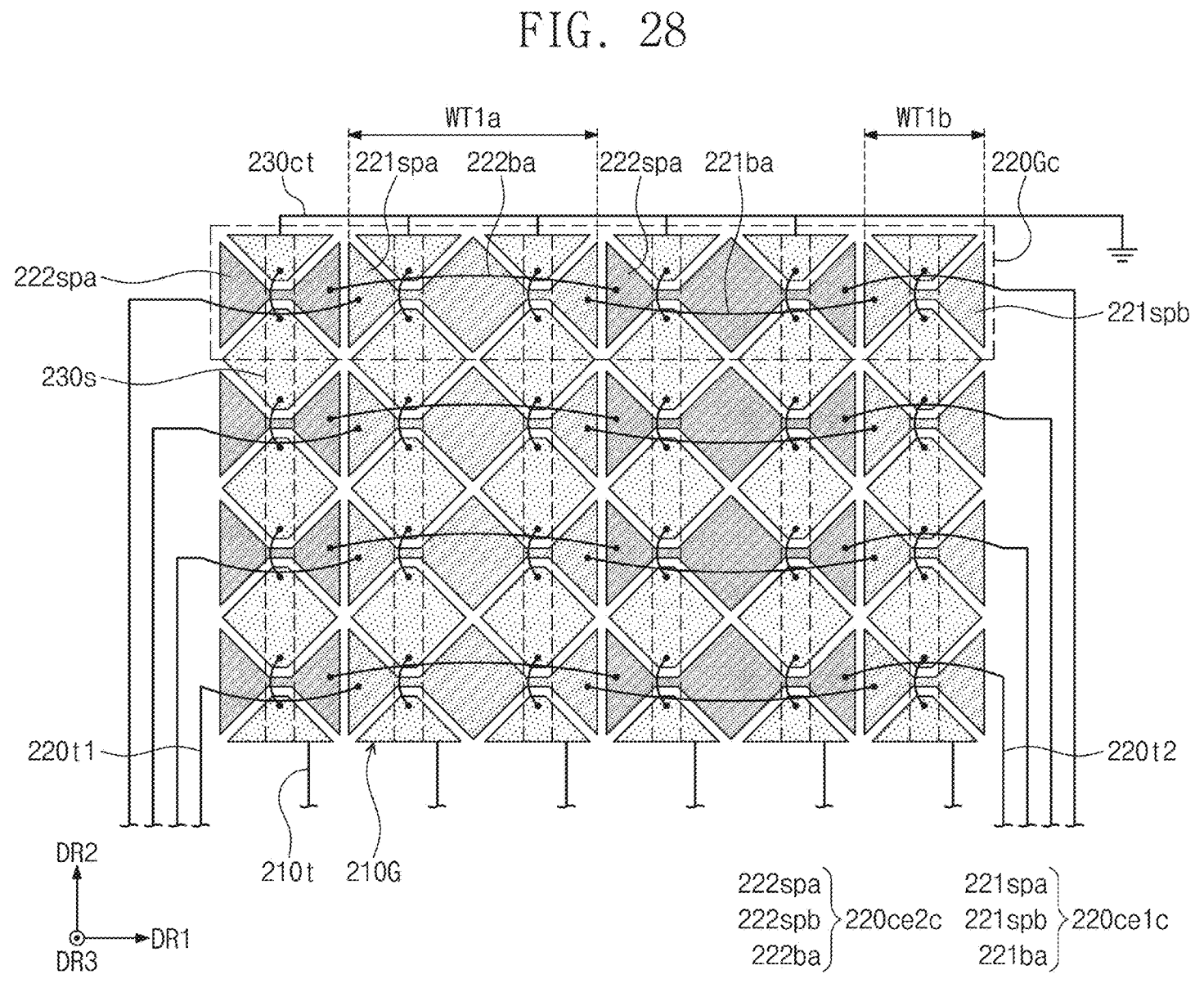

FIG. 28 is a plan view showing a portion of a sensor layer according to an embodiment of the inventive concept.

Referring to FIGS. 7 and 28, the sensor layer 200 may include first electrode groups 210G, second electrode groups 220Gc, and auxiliary electrodes 230s.

Each of the second electrode groups 220Gc may include a first cross electrode 220ce1c and a second cross electrode 220ce2c. The first cross electrode 220ce1c may include a (1-1)-th sensing pattern 221spa, a (1-2)-th sensing pattern 221spb, and first bridges 221ba. The second cross electrode 220ce2b may include a (2-1)-th sensing pattern 222spa, a (2-2)-th sensing pattern 222spb, and second bridges 222ba.

A width WT1a of the (1-1)-th sensing pattern $221_{spa}$ and a width WT1b of the (1-2)-th sensing pattern 221spb may be different. For example, the (1-1)-th sensing pattern 221spa may insulatively cross two first electrode groups 210G and two auxiliary electrodes 230s. The (1-2)-th sensing pattern 221spb may insulatively cross one first electrode group 210G and one auxiliary electrode 230s. In addition, a width of the (2-1)-th sensing pattern 222spa and a width of the (2-2)-th sensing pattern 222spb may be different.

Figure 29:
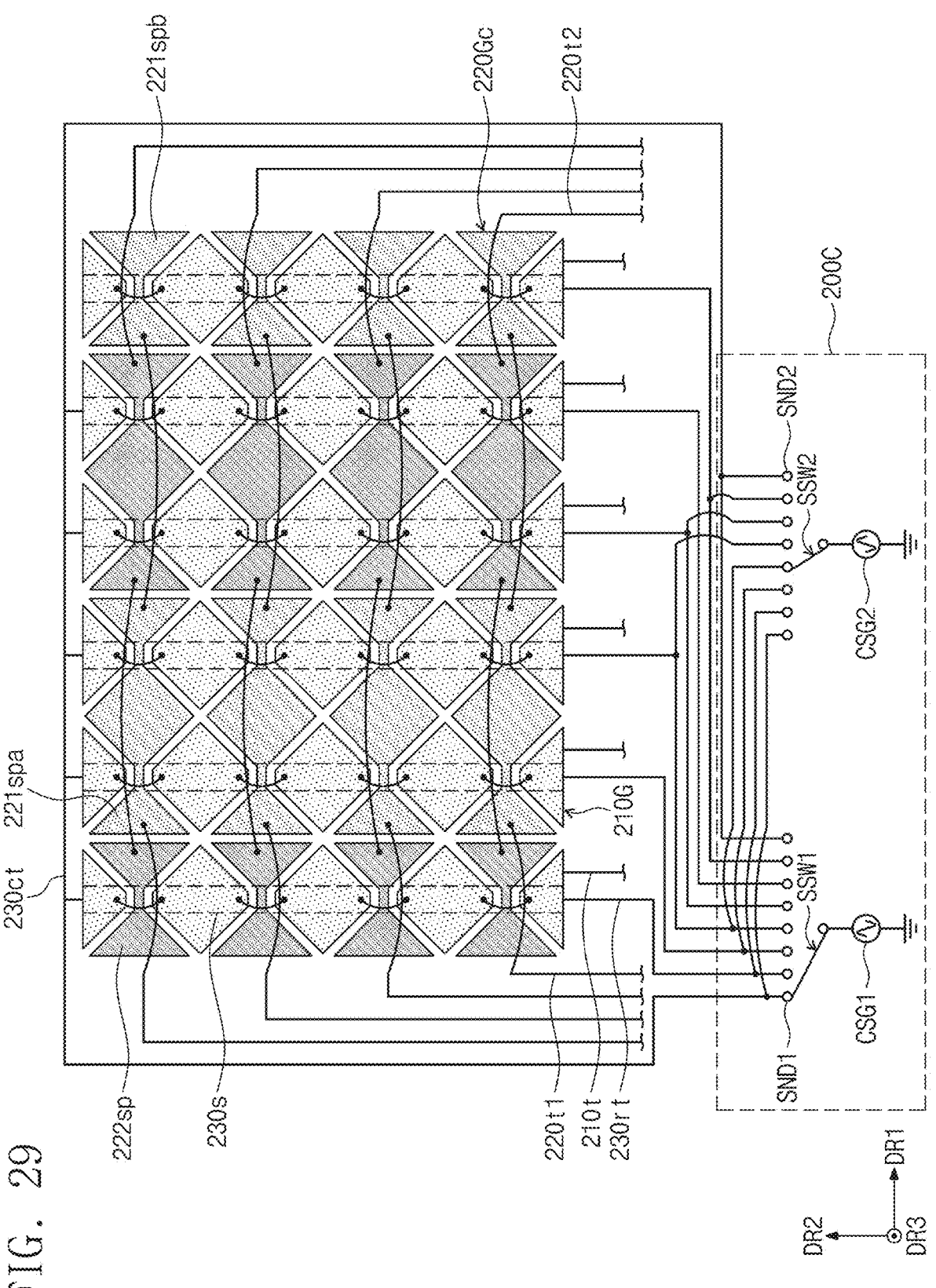
FIG. 29 is a plan view showing a portion of a sensor layer and a portion of a sensor driver according to an embodiment of the inventive concept.

FIG. 29 is a plan view showing a portion of a sensor layer and a portion of a sensor driver according to an embodiment of the inventive concept.

Referring to FIGS. 7 and 29, the sensor layer 200 may further include a plurality of loop trace lines 230rt electrically connected to a plurality of auxiliary electrodes 230s. In FIG. 29, the auxiliary electrodes 230s and the loop trace lines 230rt are shown to be electrically connected in a one-to-one correspondence, but in other examples, two or more auxiliary electrodes 230s are electrically connected to one loop trace line 230rt.

The second mode MD2 (see FIG. 9) may include a charging drive mode and a pen sensing drive mode. FIG. 29 is a view for describing the charging drive mode. The sensor driver 200C may include a first switch SSW1 and a second switch SSW2. The first signal CSG1 may be delivered to the sensor layer 200 through the first switch SSW1, and the second signal CSG2 may be delivered to the sensor layer 200 through the second switch SSW2.

Each of the first signal CSG1 and the second signal CSG2 may be a sine wave signal or a square wave signal. The first signal CSG1 and the second signal CSG2 may have an inverse relationship in which the sine waves or square waves of the two signals are 180° out of phase. Accordingly, a current direction may change periodically in the charging drive mode. In another embodiment of the inventive concept, one of the first signal CSG1 and the second signal CSG2 is a sine wave or square wave signal, and the other has a predetermined constant voltage.

In the charging drive mode, the first switch SSW1 and the second switch SSW2 may be electrically connected to at least one and at least the other of the connection trace line 230ct or the loop trace lines 230rt. In FIG. 29, the first signal CSG1 is shown to be provided through the connection trace line 230ct and the second signal CSG2 is shown to be provided through the loop trace line 230*rt* as an example, but the embodiment of the inventive concept is not limited thereto. For example, the first signal CSG1 may be provided through two or more lines, and the second signal CSG2 may also be provided through two or more different lines.

In the pen sensing drive mode, all of the loop trace lines 230*rt* may be electrically floating, and the connection trace line 230*ct* may be grounded (although not illustrated in FIG. 29).

Figure 30:
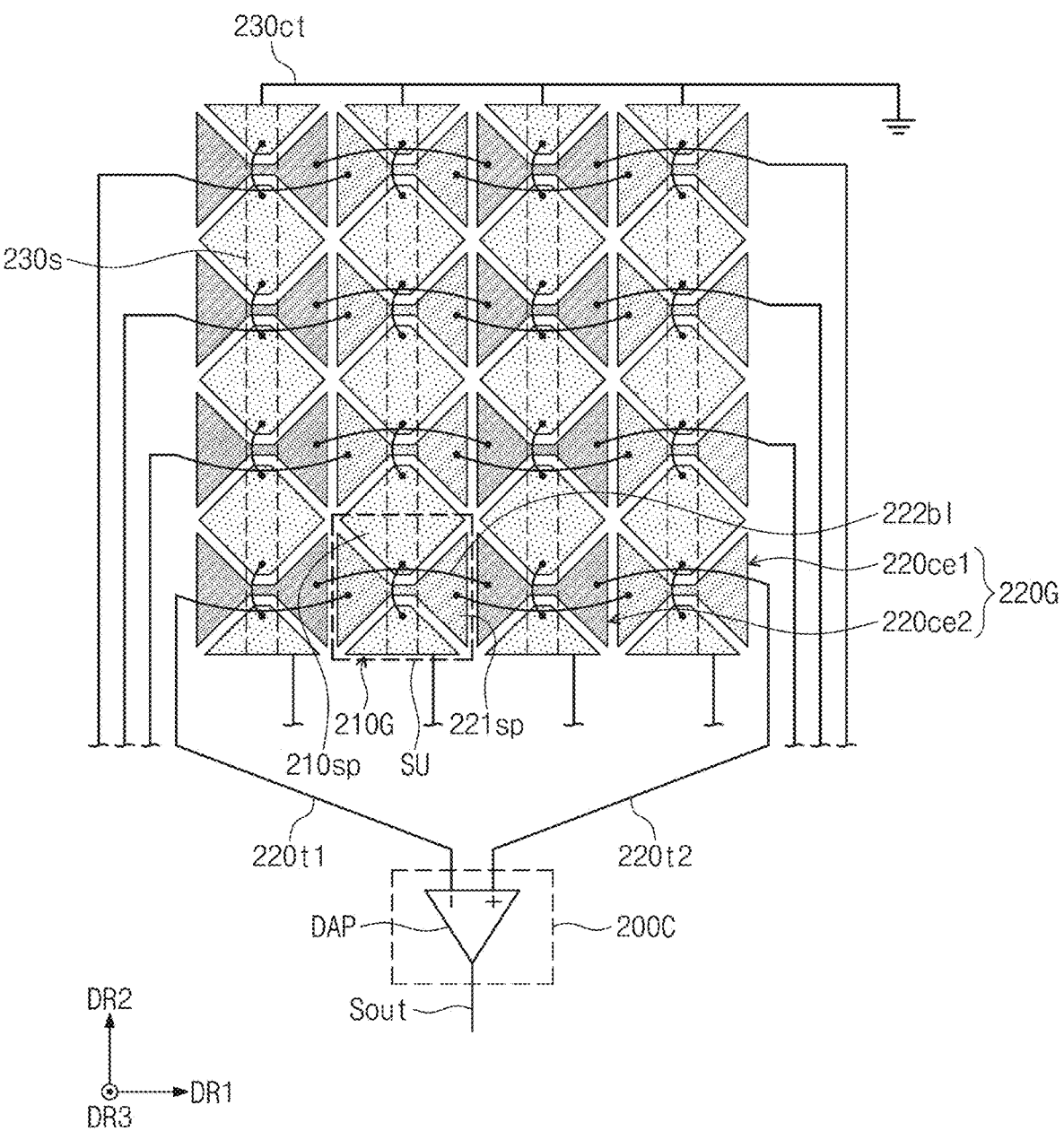
FIG. 30 is a plan view showing a portion of a sensor layer and a portion of a sensor driver according to an embodiment of the inventive concept.

FIG. 30 is a plan view showing a portion of a sensor layer and a portion of a sensor driver according to an embodiment of the inventive concept.

Referring to FIGS. 7 and 30, the operation of the sensor layer 200 in the first mode MD1 (see FIG. 9) is briefly shown as an example.

The sensor driver 200C may include a differential amplifier DAP. In the first mode MD1, an inverting terminal of the differential amplifier DAP may be electrically connected to the first cross electrode 220*ce*1, and a non-inverting terminal of the differential amplifier DAP may be electrically connected to the second cross electrode 220*ce*2.

When viewed with respect to one sensing unit SU, an area of the second bridge line 222*b*1 is smaller than an area of the first sensing pattern 221*sp*, and a distance between the third sensing pattern 210*sp* and the second bridge line 222*b*1 is greater than a distance between the third sensing pattern 210*sp* and the first sensing pattern 221*sp*. Accordingly, a first mutual capacitance between the third sensing pattern 210*sp* of the first electrode group 210G and the first sensing pattern 221*sp* of the second electrode group 220G is greater than a second mutual capacitance between the third sensing pattern 210*sp* and the second bridge line 222*b*1. In addition, when a touch occurs, variation in the first mutual capacitance may be greater than variation in the second mutual capacitance.

Accordingly, even when signals received from the first cross electrode 220*ce*1 and signals received from the second cross electrode 220*ce*2, which are disposed on the same axis in the first mode MD1, are differentiated, the beneficial effect in removing noise may be greater than a tradeoff of reducing signals for sensing touch.

Figure 31:
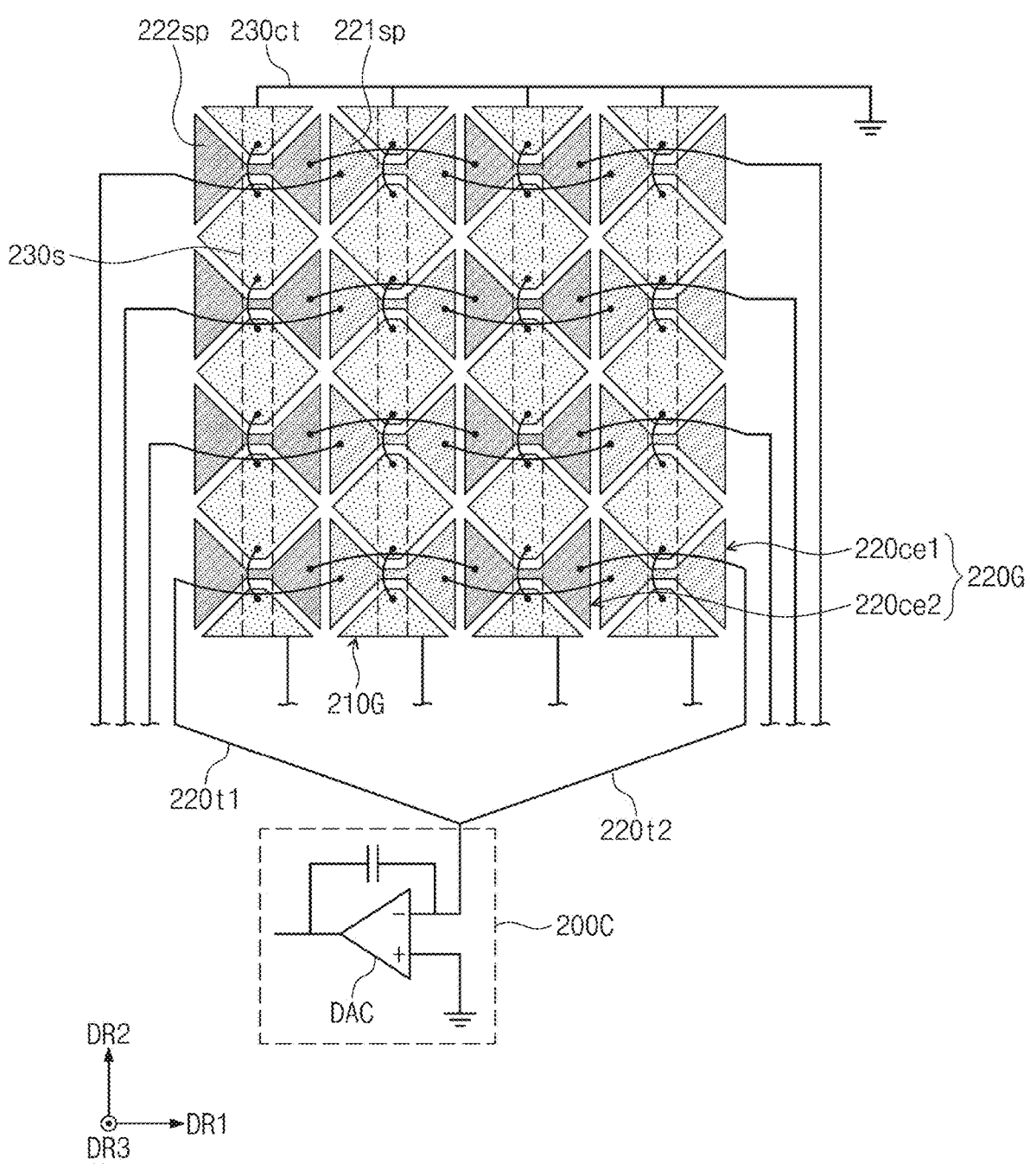
FIG. 31 is a plan view showing a portion of a sensor layer and a portion of a sensor driver according to an embodiment of the inventive concept.

FIG. 31 is a plan view showing a portion of a sensor layer and a portion of a sensor driver according to an embodiment of the inventive concept.

Referring to FIGS. 7 and 31, the operation of the sensor layer 200 in the first mode MD1 (see FIG. 9) is briefly described as an example.

The sensor driver 200C may include a differential amplifier DAP. In the first mode MD1, the inverting terminal of the differential amplifier DAP may be electrically connected to the first cross electrode 220*ce*1 and the second cross electrode 220*ce*2. The non-inverting terminal of the differential amplifier DAP may be grounded or a reference voltage may be applied.

Both the signals received from the first cross electrode 220*ce*1 and the signals received from the second cross electrode 220*ce*2 included in the same group in the first mode MD1 may be input to the inverting terminal of the differential amplifier DAP, and signals for sensing touch may not be reduced.

The sensor driver 200C may further include a switching circuit connected to the first cross trace line 220*t*1 and the second cross trace line 220*t*2. Accordingly, the first cross trace line 220*t*1 and the second cross trace line 220*t*2 may be electrically connected to different circuits depending on the mode.

Figure 32:
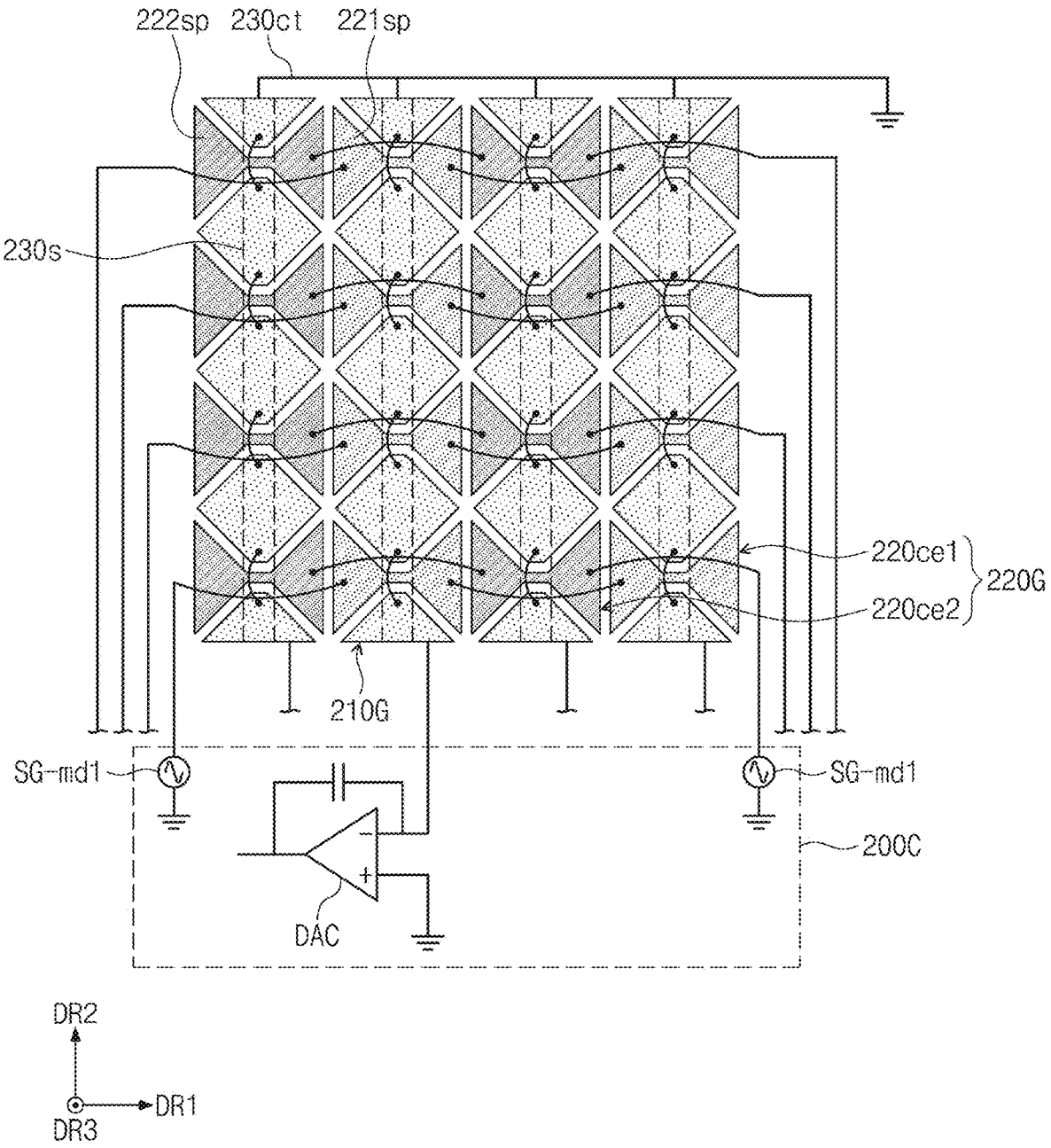
FIG. 32 is a plan view showing a portion of a sensor layer and a portion of a sensor driver according to an embodiment of the inventive concept.

FIG. 32 is a plan view showing a portion of a sensor layer and a portion of a sensor driver according to an embodiment of the inventive concept.

Referring to FIGS. 7 and 32, the operation of the sensor layer 200 in the first mode MD1 (see FIG. 9) is briefly shown as an example. The first mode MD1 may include a mutual capacitance detection mode.

In the first mode MD1, the sensor driver 200C may sequentially provide a transmission signal SG-*md*1 to the second electrode groups 220G. For example, an in-phase transmission signal SG-*md*1 may be provided to the first cross electrode 220*ce*1 and the second cross electrode 220*ce*2 included in one second electrode group 220G.

The sensor driver 200C may detect coordinates of the first input 2000 (see FIG. 4) using the received signals detected through the first electrode groups 210G. For example, the sensor driver 200C may be configured to sense changes in mutual capacitance between the first electrode groups 210G and the second electrode groups 220G to calculate input coordinates.

Figure 33:
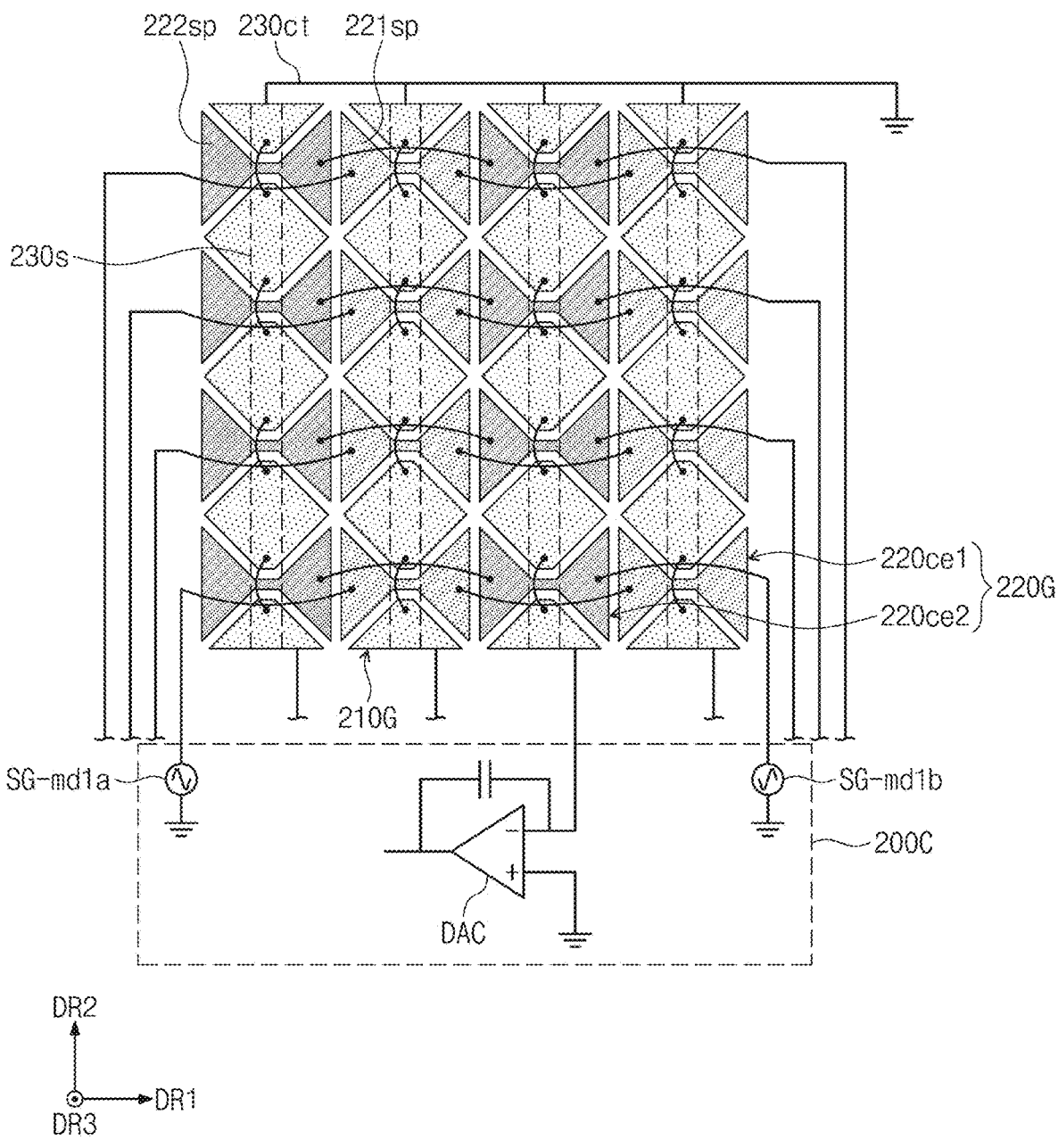
FIG. 33 is a plan view showing a portion of a sensor layer and a portion of a sensor driver according to an embodiment of the inventive concept.

FIG. 33 is a plan view showing a portion of a sensor layer and a portion of a sensor driver according to an embodiment of the inventive concept.

Referring to FIGS. 7 and 33, the operation of the sensor layer 200 in the first mode MD1 (see FIG. 9) is briefly shown as an example. The first mode MD1 may include a mutual capacitance detection mode.

In the first mode MD1, the sensor driver 200C may sequentially provide transmission signals SG-md1*a* and SG-md1*b* to the second electrode groups 220G. For example, the first transmission signal SG-md1*a* may be provided to the first cross electrode 220*ce*1 included in one second electrode group 220G, and the second transmission signal SG-md1*b* may be provided to the second cross electrode 220*ce*2.

In an embodiment of the inventive concept, the first transmission signal SG-md1*a* and the second transmission signal SG-md1*b* may be involved in an inverse relationship. Accordingly, noise caused in the display layer 100 (see FIG. 3) by the first transmission signal SG-md1*a* and noise caused by the second transmission signal SG-md1*b* may cancel each other out. Accordingly, flickering may not take place in the display layer 100, and the display layer 100 may have superior display quality.

The sensor driver 200C may detect coordinates of the first input 2000 (see FIG. 4) using the received signals detected through the first electrode groups 210G. For example, the sensor driver 200C may be configured to sense changes in mutual capacitance between the first electrode groups 210G and the second electrode groups 220G to calculate input coordinates.

Figure 34:
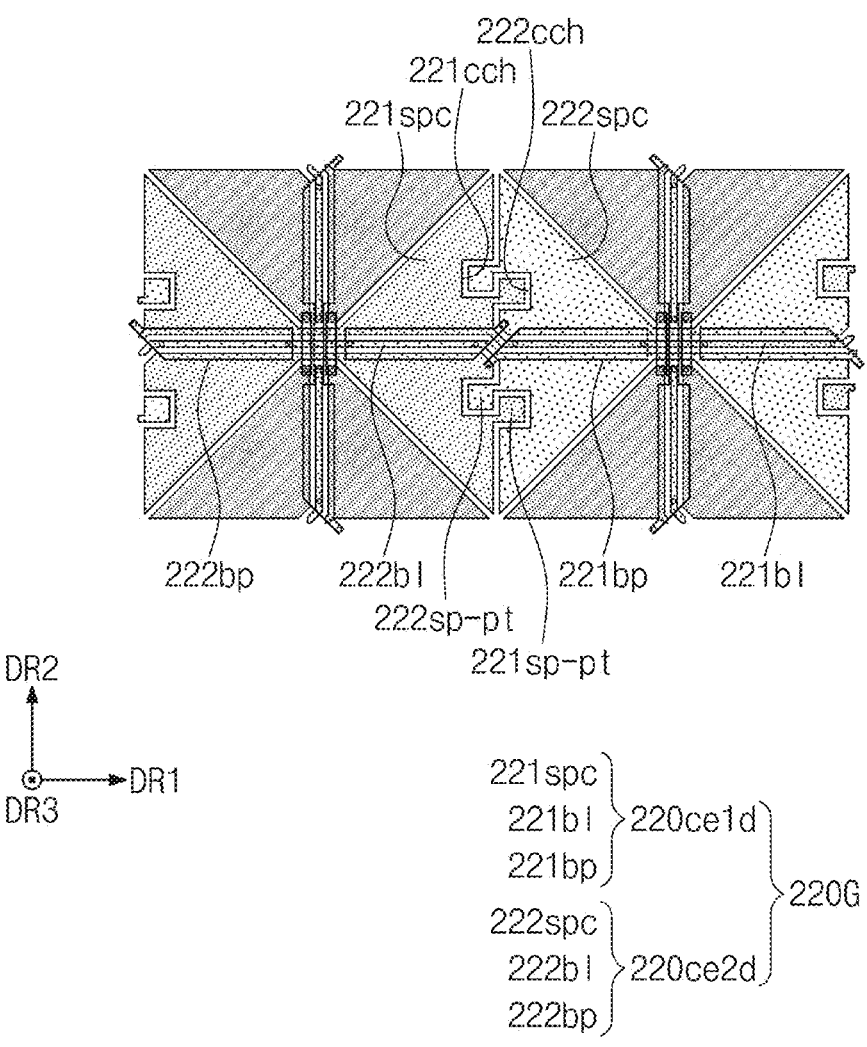
FIG. 34 is a plan view showing two sensing units according to an embodiment of the inventive concept.

FIG. 34 is a plan view showing two sensing units according to an embodiment of the inventive concept.

Referring to FIGS. 7 and 34, each of the second electrode groups 220G may include a first cross electrode 220*ce*1*d* and a second cross electrode 220*ce*2*d*. The first cross electrode 220*ce*1*d* may include first sensing patterns 221*spc*, a first bridge line 221*b*1, and a first bridge pattern 221*bp*. The second cross electrode 220*ce*2*d* may include second sensing patterns 222*spc*, a second bridge line 222*b*1, and a second bridge pattern 222*bp*. The first sensing patterns 221*spc* and the second sensing patterns 222*spc* may be arranged in the first direction DR1.

The first sensing pattern 221*spc* and the second sensing pattern 222*spc* that are adjacent to and face each other may be shaped to engage each other. For example, mutual capacitance may be formed between the first sensing pattern 221*spc* and the second sensing pattern 222*spc* that are adjacent to each other in the first direction DR1. When the first sensing pattern 221*spc* and the second sensing pattern 222*spc* are shaped to engage each other, the effect of increasing the mutual capacitance may be achieved.

The first sensing pattern 221*spc* may include a first protruding portion 221*sp-pt* that protrudes toward the second sensing pattern 222*spc* (to fit within a complementary recess of the second sensing pattern 222*spc* so that the adjacent structures have an interlocking type relationship), and the second sensing pattern 222*spc* may include a second protruding portion 222*sp-pt* that protrudes toward the first sensing pattern 221*spc* (to fit within a complementary recess of the first sensing pattern 221*spc*). A first concave edge 221*cch* surrounding at least a portion of the second protruding portion 222*sp-pt* may be defined in the first sensing pattern 221*spc*, and a second concave edge 222*cch* surrounding at least a portion of the first protruding portion 221*sp-pt* may be defined in the second sensing pattern 222*spc*.

The first sensing patterns 221*spc* and the second sensing patterns 222*spc* that are adjacent to and face each other in one second electrode group 220G may all be shaped to engage each other, but such engagement may be partially or completely omitted in other embodiments. For example, in one second electrode group 220G, coupling capacitance between the first sensing pattern 221*spc* and the second sensing pattern 222*spc* may be regulated to be different according to the position thereof. For example, by reducing RC delay, the coupling capacitance in a specific region may be regulated to be relatively greater to expand the frequency band applicable in the sensor layer 200. In this case, a portion of the first sensing patterns 221*spc* and the second sensing pattern 222*spc* in one second electrode group 220G that are adjacent to and face each other may be in the form of facing each other with a straight border as shown in FIG. 19, and another portion thereof may be in the form of facing each other with a serpentine border as shown in FIG. 34.

According to the descriptions above, touch inputs as well as pen inputs may be sensed using a sensor layer. Accordingly, an electronic device is not necessarily provided with a separate component (e.g., a digitizer) for sensing a pen, and may thus avoid greater thickness and weight and reduced flexibility due to the provision of the digitizer. In addition, at least one electrode group included in the sensor layer may include two cross electrodes that route current in different respective directions. In this case, current directions of signals received from the two cross electrodes are opposite, noise generated in the two cross electrodes may be substantially the same, and such noise may be removed by noise removal circuitry of the sensor driver. In a pen sensing drive mode, the sensor driver may differentiate the two signals using a differential amplifier to generate output signals. In this case, the noise may be removed using the differential amplifier and the intensity of output signals may be greater. Accordingly, the signal-to-noise ratio may rise and thus an electronic device having improved sensing sensitivity may be provided.

Although the present disclosure has been described with reference to exemplary embodiments of the inventive concept, the inventive concept is not be limited to these exemplary embodiments but various changes and modifications may be made by those skilled in the art without departing from the spirit and scope of the present disclosure. Hence, the technical scope of the present disclosure is not limited to the detailed descriptions in the specification but should be determined only with reference to the claims.

What is claimed is:

1. An electronic device comprising:
a sensor layer; and
a sensor driver configured to drive the sensor layer and selectively operate in a first mode for sensing touch inputs or a second mode for sensing pen inputs,
wherein the sensor layer includes:
    a plurality of first electrode groups arranged along a first direction; and
    a plurality of second electrode groups arranged along a second direction crossing the first direction, and crossing the plurality of first electrode groups, each of the plurality of second electrode groups including a first cross electrode and a second cross electrode,
wherein in the second mode, the sensor driver senses the pen inputs based on a first signal received from the first cross electrode and a second signal received from the second cross electrode.

2. The electronic device of claim 1, wherein the first cross electrode comprises a plurality of first sensing patterns arranged in the first direction, the second cross electrode comprises a plurality of second sensing patterns arranged in the first direction, and at least one of the plurality of first sensing patterns and at least one of the plurality of second sensing patterns are alternately arranged.

3. The electronic device of claim 2, wherein the sensor layer further comprises a first cross trace line electrically connected to the first cross electrode and a second cross trace line electrically connected to the second cross electrode,
the first cross trace line is directly connected to one first sensing pattern among the plurality of first sensing patterns, and
the second cross trace line is directly connected to one second sensing pattern among the plurality of second sensing patterns.

4. The electronic device of claim 3, wherein at least one second sensing pattern among the plurality of second sensing patterns is disposed between a portion of the first cross trace line and the one first sensing pattern, and
at least one first sensing pattern among the plurality of first sensing patterns is disposed between a portion of the second cross trace line and the one second sensing pattern.

5. The electronic device of claim 2, wherein at least one of the plurality of first sensing patterns or the plurality of second sensing patterns crosses at least one first electrode group among the plurality of first electrode groups.

6. The electronic device of claim 2, wherein the plurality of first sensing patterns have the same width in the first direction.

7. The electronic device of claim 2, wherein some of widths of the plurality of first sensing patterns in the first direction are different from others.

8. The electronic device of claim 1, wherein the sensor driver comprises a differential amplifier, and the second mode comprises a pen sensing drive mode, and
in the pen sensing drive mode, an inverting terminal of the differential amplifier is electrically connected to the first cross electrode, and a non-inverting terminal of the differential amplifier is electrically connected to the second cross electrode.

9. The electronic device of claim 1, wherein the sensor driver comprises a first differential amplifier, a second differential amplifier, and a third differential amplifier,
the second mode comprises a pen sensing drive mode, and
in the pen sensing drive mode, the first differential amplifier and the second differential amplifier receive signals from the plurality of second electrode groups, an inverting terminal of the third differential amplifier receives signals output from the first differential amplifier, and a non-inverting terminal of the third differential amplifier receives signals output from the second differential amplifier.

10. The electronic device of claim 9, wherein the plurality of second electrode groups comprise a (2-1)-th electrode group and a (2-2)-th electrode group spaced apart from the (2-1)-th electrode group in the second direction, in the pen sensing drive mode, an inverting terminal of the first differential amplifier is electrically connected to the first cross electrode of the (2-1)-th electrode group, and a non-inverting terminal of the first differential amplifier is electrically connected to the second cross electrode of the (2-1)-th electrode group, and in the pen sensing drive mode, an inverting terminal of the second differential amplifier is electrically connected to the first cross electrode of the (2-2)-th electrode group, and a non-inverting terminal of the second differential amplifier is electrically connected to the second cross electrode of the (2-2)-th electrode group.

11. The electronic device of claim 9, wherein the plurality of second electrode groups comprise a (2-1)-th electrode group and a (2-2)-th electrode group spaced apart from the (2-1)-th electrode group in the second direction, in the pen sensing drive mode, an inverting terminal of the first differential amplifier is electrically connected to the first cross electrode of the (2-1)-th electrode group, and a non-inverting terminal of the first differential amplifier is electrically connected to the first cross electrode of the (2-2)-th electrode group, and in the pen sensing drive mode, an inverting terminal of the second differential amplifier is electrically connected to the second cross electrode of the (2-1)-th electrode group, and a non-inverting terminal of the second differential amplifier is electrically connected to the second cross electrode of the (2-2)-th electrode group.

12. The electronic device of claim 1, wherein the sensor driver comprises a plurality of differential amplifiers and an analog-to-digital converter, in the second mode, the plurality of differential amplifiers are connected in one-to-one correspondence with the plurality of first cross electrodes and the plurality of second cross electrodes of the plurality of second electrode groups, the analog-to-digital converter receives a plurality of signals from the plurality of differential amplifiers, and the sensor driver is configured to perform a differential operation on data output from the analog-to-digital converter.

13. The electronic device of claim 1, wherein each of the plurality of first electrode groups comprises a third cross electrode and a fourth cross electrode, and in the second mode, the sensor driver is configured to receive a third signal from the third cross electrode and a fourth signal from the fourth cross electrode.

14. The electronic device of claim 13, wherein the first cross electrode comprises a plurality of first sensing patterns, a first bridge line, and a first bridge pattern, the second cross electrode comprises a plurality of second sensing patterns, a second bridge line, and a second bridge pattern, the third cross electrode comprises a plurality of third sensing patterns, a third bridge line, a third bridge pattern, and a first connection pattern, the fourth cross electrode comprises a plurality of fourth sensing patterns, a fourth bridge line, a fourth bridge pattern, and a second connection pattern, the plurality of first sensing patterns, the plurality of second sensing patterns, the plurality of third sensing patterns, the plurality of fourth sensing patterns, the first bridge line, the second bridge line, the third bridge line, and the fourth bridge line are disposed on the same layer, and the first bridge pattern, the second bridge pattern, the third bridge pattern, the fourth bridge pattern, the first connection pattern, and the second connection pattern are disposed on the same layer.

15. The electronic device of claim 14, wherein the plurality of first sensing patterns comprise a plurality of (1-1)-th sensing patterns and a plurality of (1-2)-th sensing patterns spaced apart from the plurality of (1-1)-th sensing patterns in the second direction, the plurality of (1-1)-th sensing patterns are connected to the first bridge line, the plurality of (1-2)-th sensing patterns are connected to the first bridge pattern, and the first bridge line and the first bridge pattern are electrically connected, and the first bridge line is disposed between two second sensing patterns spaced apart in the second direction among the plurality of second sensing patterns.

16. The electronic device of claim 14, wherein the plurality of third sensing patterns comprise a plurality of (3-1)-th sensing patterns spaced apart in the second direction and a plurality of (3-2)-th sensing patterns spaced apart from the plurality of (3-1)-th sensing patterns in the first direction, the plurality of (3-1)-th sensing patterns are connected to the third bridge pattern, the plurality of (3-2)-th sensing patterns are connected to the third bridge line, and the third bridge line and the third bridge pattern are electrically connected, the first connection pattern overlaps the first bridge line or the second bridge line, and is connected to two third sensing patterns spaced apart with the first bridge line or the second bridge line therebetween among the plurality of third sensing patterns, and the third bridge line is disposed between two fourth sensing patterns spaced apart in the first direction among the plurality of fourth sensing patterns.

17. The electronic device of claim 1, wherein the sensor layer further comprises a plurality of auxiliary electrodes overlapping the plurality of first electrode groups, respectively, and a connection trace line connecting the plurality of auxiliary electrodes.

18. The electronic device of claim 17, wherein the sensor layer further comprises a plurality of first trace lines electrically connected to the plurality of first electrode groups in one-to-one correspondence, and the plurality of first trace lines are spaced apart from the connection trace line with the plurality of first electrode groups therebetween.

19. The electronic device of claim 17, wherein the first cross electrode comprises a plurality of first sensing patterns, a first bridge line, and a first bridge pattern, the second cross electrode comprises a plurality of second sensing patterns, a second bridge line, and a second bridge pattern, each of the plurality of first electrode groups comprises a plurality of third sensing patterns and a connection pattern, the plurality of first sensing patterns, the plurality of second sensing patterns, the plurality of third sensing patterns, the first bridge line, and the second bridge line are disposed on the same layer, and the first bridge pattern, the second bridge pattern, the connection pattern, and the plurality of auxiliary electrodes are disposed on the same layer.

20. The electronic device of claim 19, wherein the plurality of third sensing patterns overlap one corresponding auxiliary electrode among the plurality of auxiliary electrodes, and at least one hole surrounding the connection pattern is defined in the one auxiliary electrode.

21. The electronic device of claim 17, wherein the sensor layer further comprises a plurality of loop trace lines electrically connected to the plurality of auxiliary electrodes, the second mode comprises a charging drive mode and a pen sensing drive mode, the sensor driver is configured to apply a first signal to at least one of the connection trace line or the plurality of loop trace lines and to apply a second signal to at least another one in the charging drive mode, and the plurality of loop trace lines are all configured to float in the pen sensing drive mode.

22. The electronic device of claim 17, wherein the sensor driver comprises a differential amplifier, and in the first mode, an inverting terminal of the differential amplifier is electrically connected to the first cross electrode, and a non-inverting terminal of the differential amplifier is electrically connected to the second cross electrode.

23. The electronic device of claim 17, wherein the sensor driver comprises a differential amplifier, and in the first mode, an inverting terminal of the differential amplifier is electrically connected to the first cross electrode and the second cross electrode.

24. The electronic device of claim 17, wherein in the first mode, the sensor driver provides in-phase signals to the first cross electrode and the second cross electrode, and receives signals provided from the plurality of first electrode groups.

25. The electronic device of claim 17, wherein in the first mode, the sensor driver provides a signal of a first phase to the first cross electrode, provides a signal of a second phase, which is a reverse phase of the first phase, to the second cross electrode, and receives signals provided from the plurality of first electrode groups.

26. The electronic device of claim 1, wherein the first cross electrode comprises a plurality of first sensing patterns, a first bridge line, and a first bridge pattern, the second cross electrode comprises a plurality of second sensing patterns, a second bridge line, and a second bridge pattern, the plurality of first sensing patterns comprise a plurality of (1-1)-th sensing patterns spaced apart in the first direction and a plurality of (1-2)-th sensing patterns spaced apart from the plurality of (1-1)-th sensing patterns in the second direction, the plurality of (1-1)-th sensing patterns are connected to the first bridge line, the plurality of (1-2)-th sensing patterns are connected to the first bridge pattern, and the first bridge line and the first bridge pattern are electrically connected, the first bridge line is disposed between two second sensing patterns spaced apart in the second direction among the plurality of second sensing patterns, and the first bridge pattern overlaps the first bridge line and the two second sensing patterns.

27. The electronic device of claim 1, wherein the first cross electrode comprises a plurality of first sensing patterns arranged in the first direction, and the second cross electrode comprises a plurality of second sensing patterns arranged in the first direction, and a first sensing pattern among the plurality of first sensing patterns and a second sensing pattern among the plurality of second sensing patterns which are positioned adjacent to each other are shaped to engage each other.

28. The electronic device of claim 27, wherein the first sensing pattern comprises a first protruding portion protruding toward the second sensing pattern, the second sensing pattern comprises a second protruding portion protruding toward the first sensing pattern, a first concave edge surrounding at least a portion of the second protruding portion is defined in the first sensing pattern, and a second concave edge surrounding at least a portion of the first protruding portion is defined in the second sensing pattern.

29. An electronic device comprising:

a sensor layer; and a sensor driver for driving the sensor layer, wherein the sensor layer includes:

a plurality of electrode groups, at least one of which includes a first cross electrode and a second cross electrode that together form an elongated structure including a first end and a second end opposite the first end; and a plurality of trace lines electrically connected to the plurality of electrode groups, the plurality of trace lines including a first cross trace line connected to the first cross electrode at a connection point closer to the first end than the second end and a second cross trace line connected to the second cross electrode at a connection point closer to the second end than the first end, wherein the first cross trace line is spaced from the second cross trace line in a first direction.

30. The electronic device of claim 29, wherein the first cross electrode comprises a plurality of first sensing patterns arranged in the first direction, the second cross electrode comprises a plurality of second sensing patterns arranged in the first direction, and at least one of the plurality of first sensing patterns and at least one of the plurality of second sensing patterns are alternately arranged, the first cross trace line is directly connected to one first sensing pattern among the plurality of first sensing patterns, the second cross trace line is directly connected to one second sensing pattern among the plurality of second sensing patterns, at least one second sensing pattern among the plurality of second sensing patterns is disposed between a portion of the first cross trace line and the one first sensing pattern, and at least one first sensing pattern among the plurality of first sensing patterns is disposed between a portion of the second cross trace line and the one second sensing pattern.

31. The electronic device of claim 29, wherein the sensor driver is configured to selectively operate in a first mode for sensing touch inputs or in a second mode including a pen sensing drive mode for sensing pen inputs, the sensor driver comprises a differential amplifier, and in the pen sensing drive mode, an inverting terminal of the differential amplifier is electrically connected to the first cross electrode, and a non-inverting terminal of the differential amplifier is electrically connected to the second cross electrode.

32. A display device comprising:
a sensor layer; and
a sensor driver for driving the sensor layer,
wherein the sensor layer includes:
    a plurality of electrode groups; and
    a plurality of trace lines electrically connected to the plurality of electrode groups,
at least one of the plurality of electrode groups includes a first cross electrode and a second cross electrode, each aligned along a same axis oriented in a first direction,
the first cross electrode comprises a plurality of first sensing patterns arranged in the first direction, the second cross electrode comprises a plurality of second sensing patterns arranged in the first direction, and at least one of the plurality of first sensing patterns and at least one of the plurality of second sensing patterns are alternately arranged, and
one of the plurality of first sensing patterns is disposed at a first end of the at least one electrode group, and one of the plurality of second sensing patterns is disposed at a second end of the at least one electrode group.

33. The display device of claim 32, wherein the plurality of trace lines comprise a first cross trace line connected to the first cross electrode and a second cross trace line connected to the second cross electrode, and the first cross trace line is disposed adjacent to the first end and connected to another one of the plurality of second sensing patterns, and the second cross trace line is disposed adjacent to the second end and connected to another one of the plurality of first sensing patterns.

34. An electronic device comprising:
a sensor layer; and
a sensor driver electrically connected to the sensor layer and configured to selectively operate in a first mode for sensing touch inputs and a second mode for sensing pen inputs,
wherein the sensor layer includes:
    a plurality of first electrodes extending along a first direction; and
    a plurality of second electrodes extending along a second direction crossing the first direction, at least one of the plurality of second electrodes including a first sub-electrode and a second sub-electrode,
wherein in the second mode, the sensor driver senses the pen inputs based on a first signal received from the first sub-electrode and a second signal received from the second sub-electrode.

35. The electronic device of claim 34, wherein the sensor driver includes circuitry for removing substantially equal amounts of noise from the first signal and the second signal.

* * * * *